United States Patent [19]

Radebold

[11] 4,381,462
[45] Apr. 26, 1983

[54] CONVERSION OF AVAILABLE ENERGY

[76] Inventor: Reinhart Radebold, Quastenhornweb 14 a, 1 Berlin 22, Fed. Rep. of Germany

[21] Appl. No.: 941,406

[22] Filed: Sep. 11, 1978

Related U.S. Application Data

[62] Division of Ser. No. 545,133, Jan. 29, 1975, Pat. No. 4,127,453.

[30] Foreign Application Priority Data

Jan. 30, 1974 [DE] Fed. Rep. of Germany ....... 2405134

[51] Int. Cl.³ .................. G21D 7/02; H02K 44/00
[52] U.S. Cl. .................................................. 310/11
[58] Field of Search ................................. 310/11; 204/63

[56] References Cited

U.S. PATENT DOCUMENTS

| | | | |
|---|---|---|---|
| 3,450,904 | 6/1969 | Bidard | 310/11 |
| 3,453,462 | 7/1969 | Hsu et al. | 310/11 |
| 3,636,389 | 1/1972 | Petrick | 310/11 |
| 3,792,293 | 2/1974 | Marks | 310/5 |

FOREIGN PATENT DOCUMENTS 1448059  6/1966  France ................... 310/11

*Primary Examiner*—F. C. Edmundson
*Attorney, Agent, or Firm*—Smyth, Pavitt, Siegemund & Martella

[57] ABSTRACT

Solar energy (called energy to the extent it is thermodynamically useful) is focussed by an inflated, buoyant reflector for heating lithium circulating through an MHD conversion system. Hydrogen and nitrogen are added to the heated lithium, finely divided iron serving as catalyst to obtain lithium amid. The hydrogen has been produced by electrolysis of water. The lithium-lithium amid mixture (liquid) is mixed with pressurized nitrogen to obtain a two phase flow in which the liquid is accelerated; focussed into a jet passing through the MHD converter to obtain hydrazine and additional electrical energy e.g. for the hydrogen electrolysis; and returned to the solar heater. The gas ($N_2$) is separated; subjected to recuperative heat exchange with itself; and low temperature isothermic compression under direct contact with a liquid which in turn is, ultimately, air cooled. The entire assembly is of elongated construction wherein the main active elements are arranged along a center axis e.g. as part of a central tubing surrounded by smaller tubing which section-wise runs various fluids to their appropriate destinations while serving as support frame. The entire process runs on the basis of self-sustaining fluid circulations without moving parts; the thermo and hydrodynamics as well as the electromagnetic interactions are explained and mathematically analyzed. The use of hydrazine as universal fuel is explained on the basis of compatibility with the biosphere. Alternative modes of hydrazine synthesis including using nuclear reaction as primary heat source is discussed.

39 Claims, 42 Drawing Figures

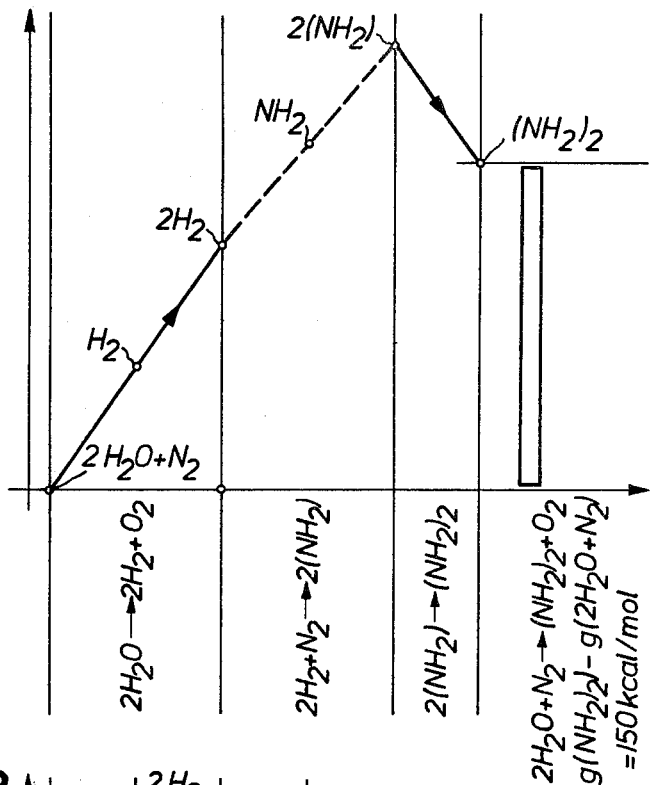
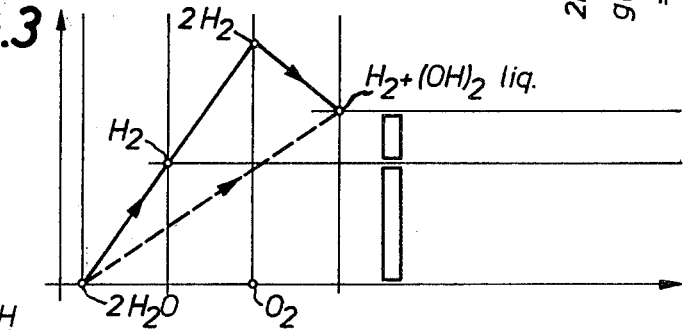
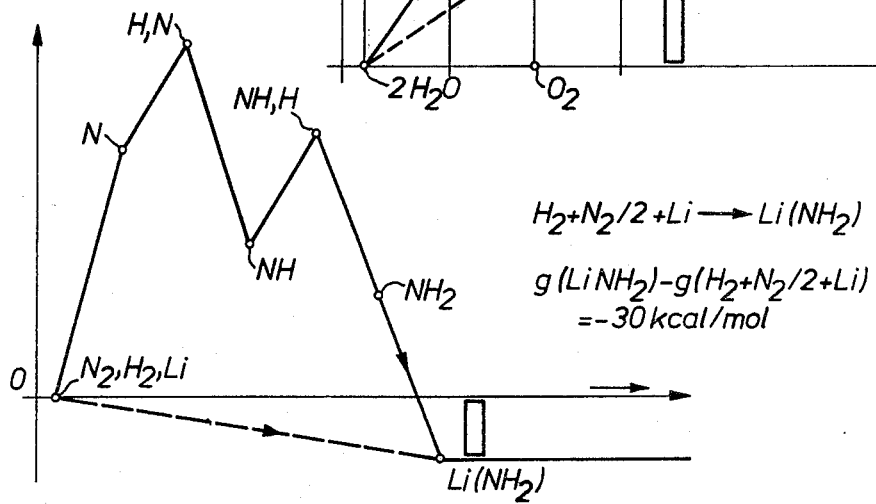

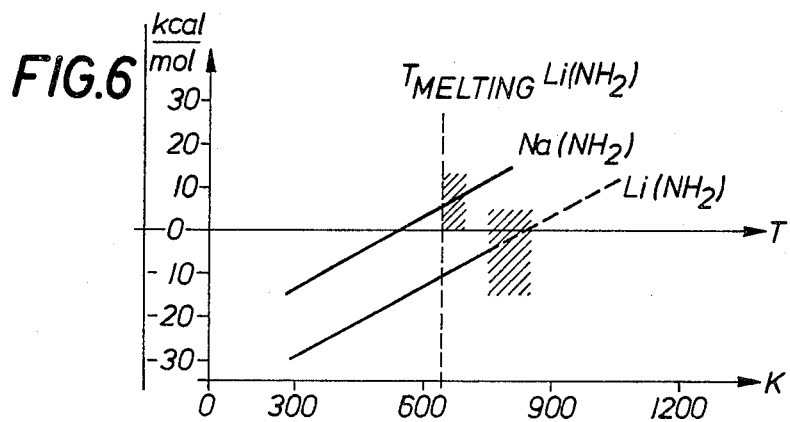
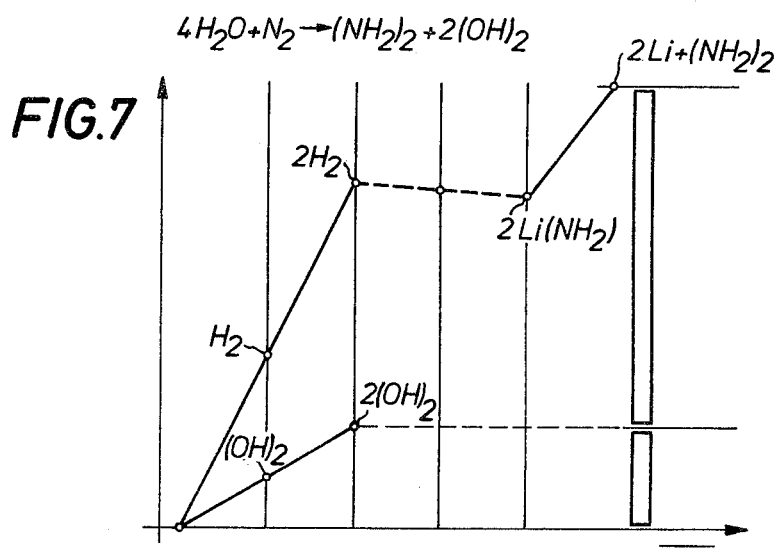
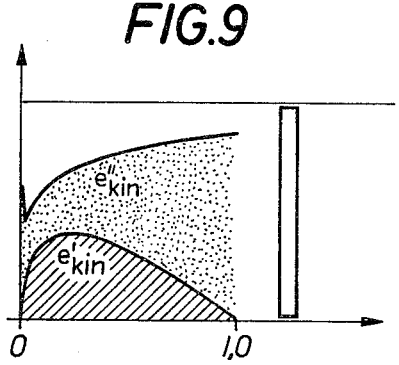
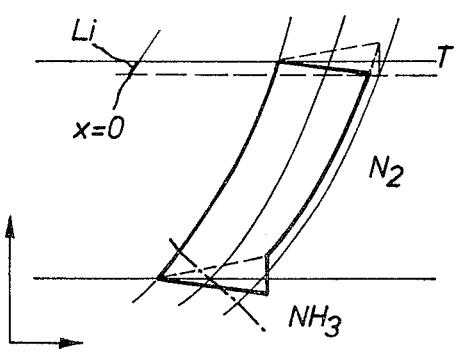

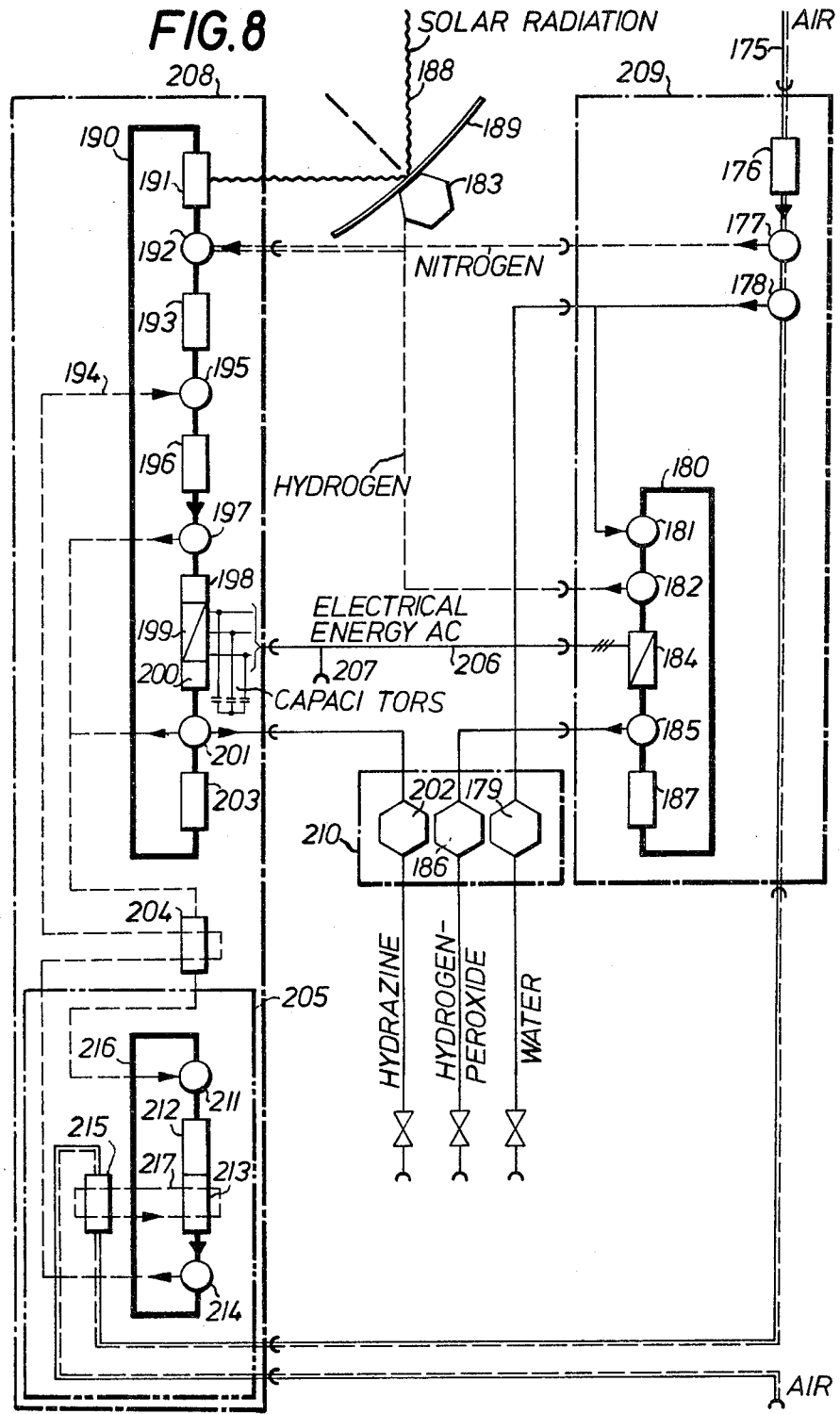

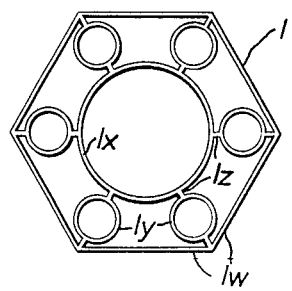
FIG.12
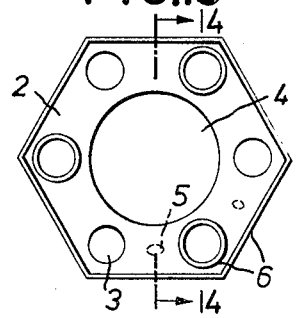
FIG.13
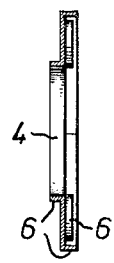
FIG.14
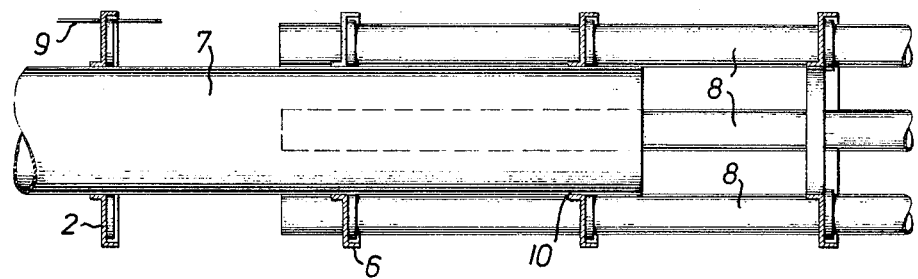
FIG.15
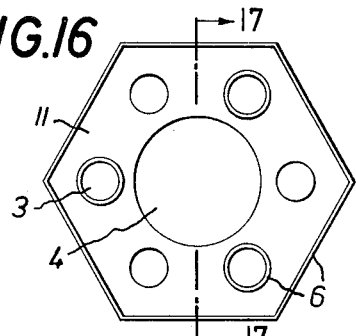
FIG.16
FIG.17
FIG.18
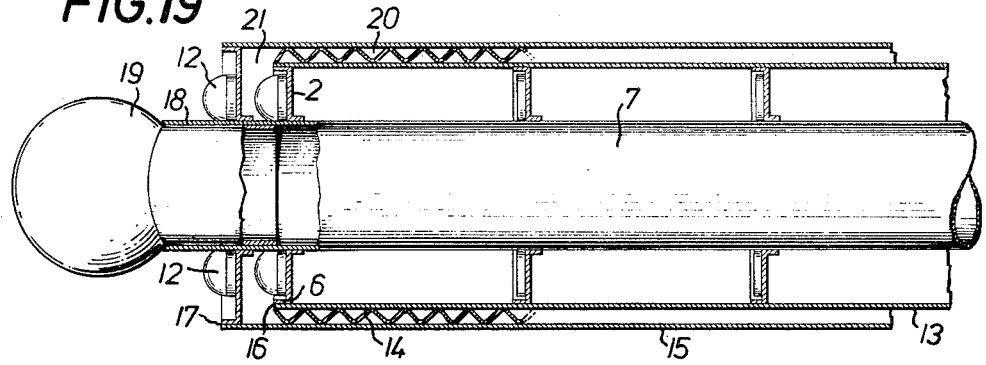
FIG.19

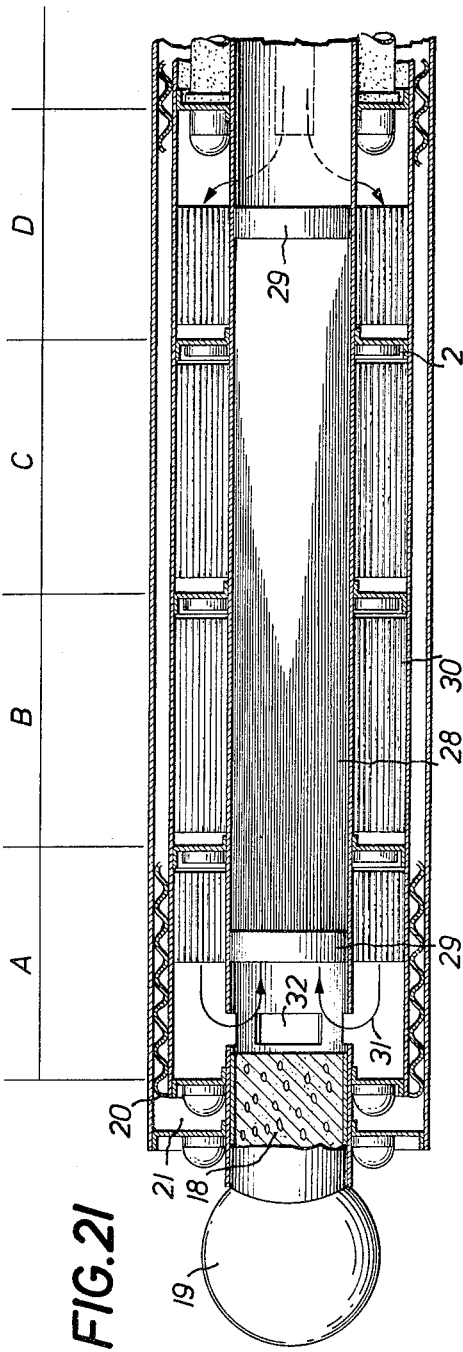
FIG.21
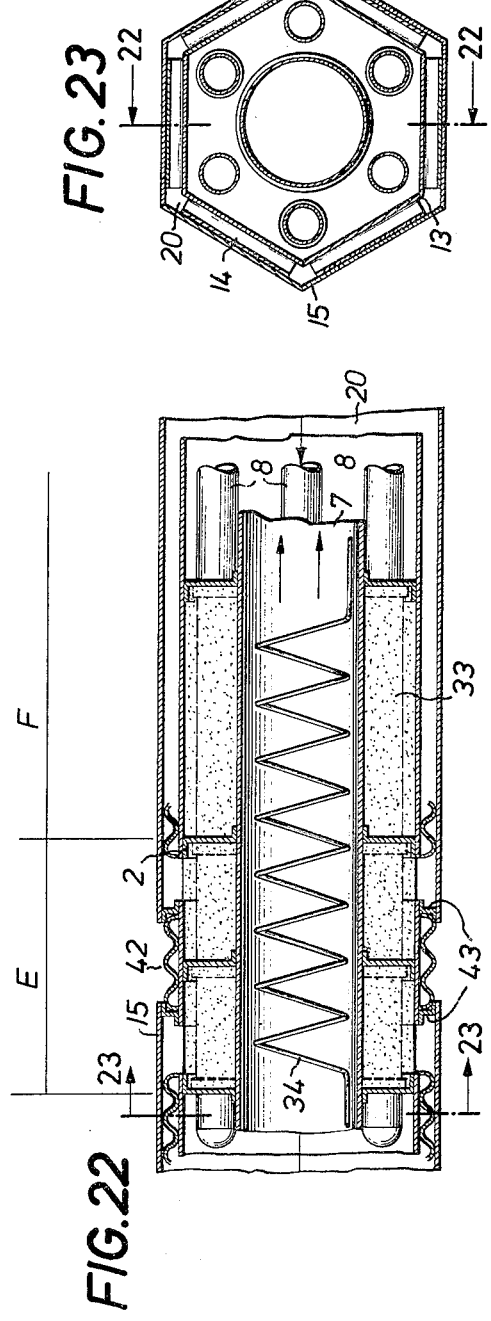
FIG.22
FIG.23

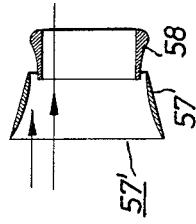
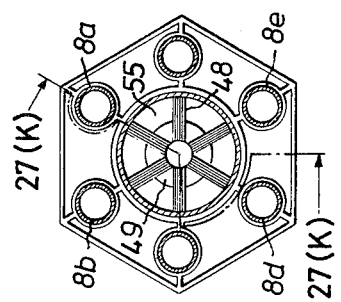
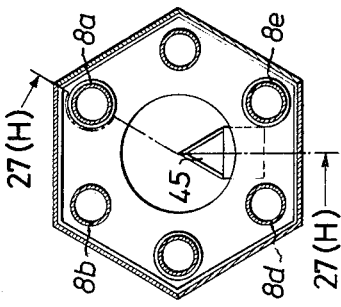
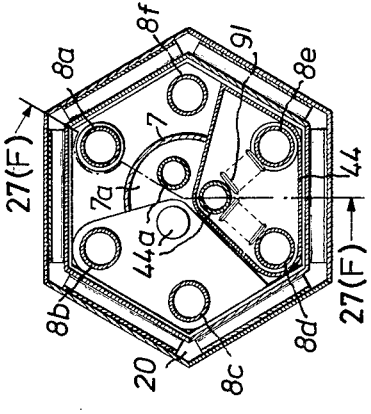

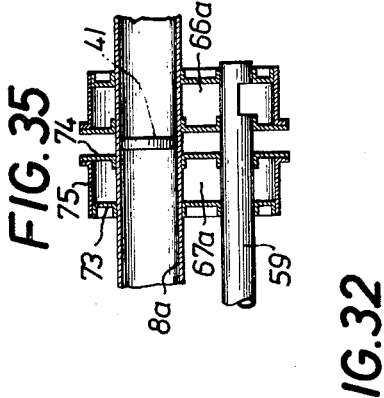
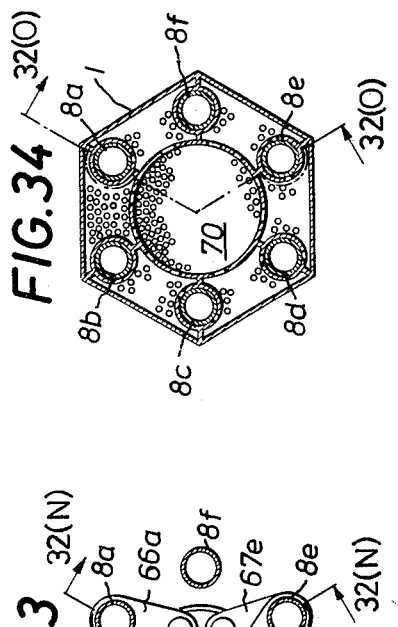
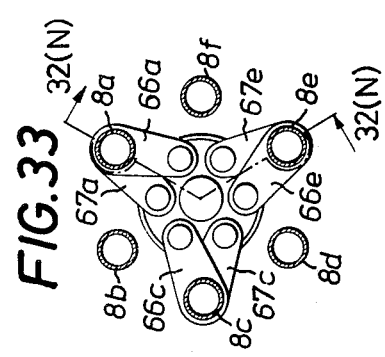
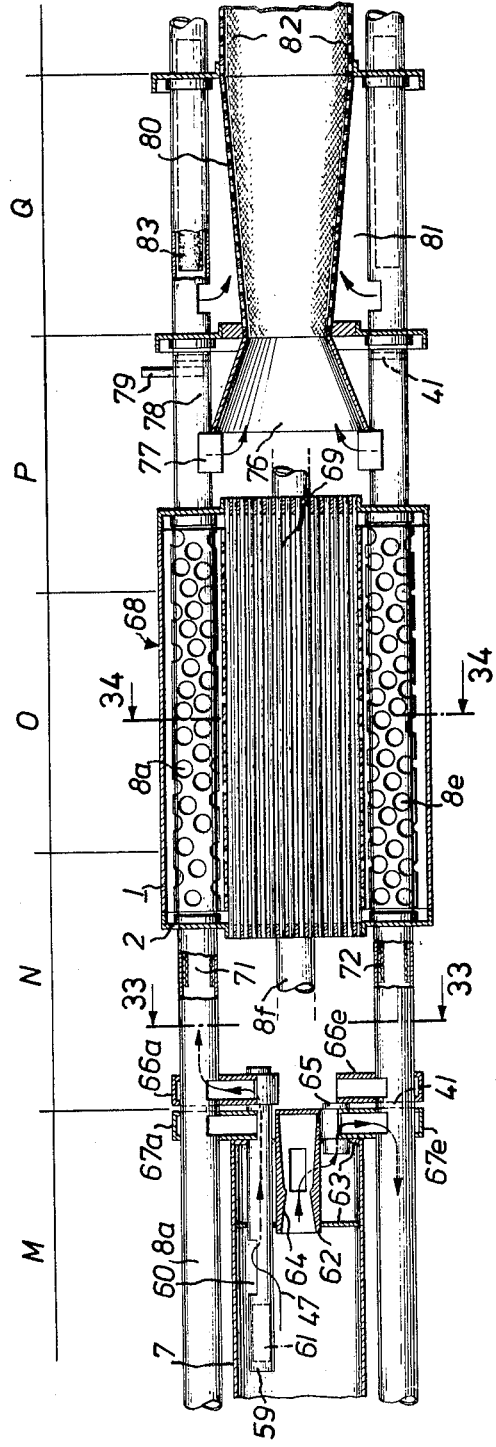

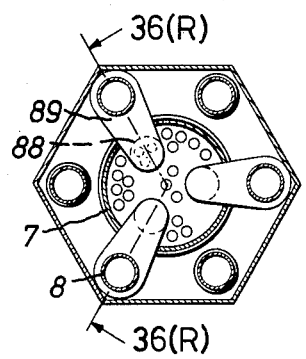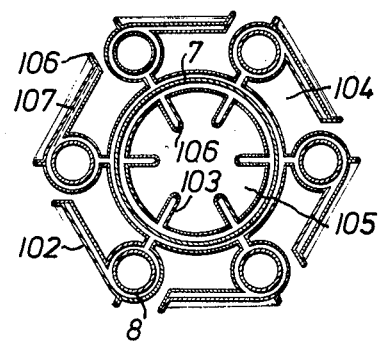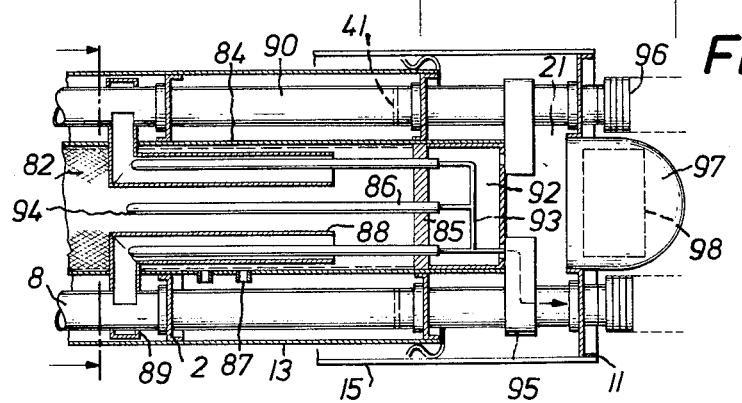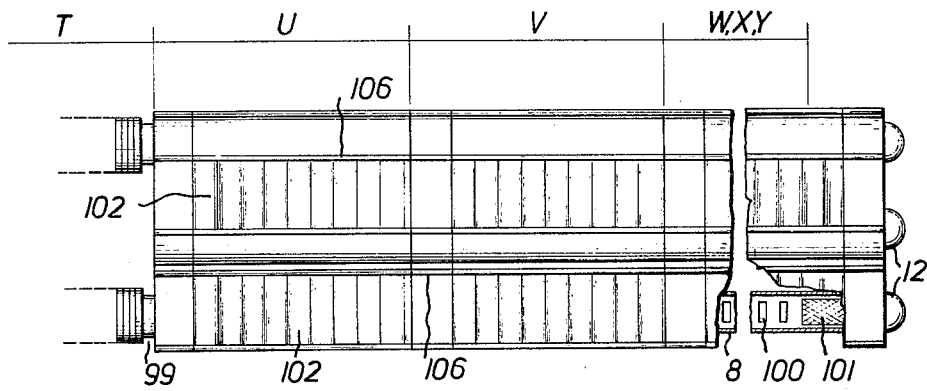

CONVERSION OF AVAILABLE ENERGY

This is a division, of application Ser. No. 545,133, filed Jan. 29, 1975, now U.S. Pat. No. 4,127,453.

BACKGROUND OF THE INVENTION

The present invention relates to the transformation of available energy resulting ultimately from nuclear reactions into free enthalpy of mestastable chemical compounds. Energy which can be made available will hereinafter be called exergy. Specifically, exergy is that portion of energy or heat which can (potentially) be extracted and used in any form of work. Exergy is, therefore, defined under observation of the second law of thermodynamics. The residual energy is called anergy. Exergy is in any instance dependant upon the environmental temperature. Exergy can be latent if stored in a chemical compound and made available by a chemical reaction.

This invention is an attempt to find a solution to the following problem: is it possible to continue operation of all technical power producing and heat generating systems, and to increase such systems with a supply of such available energy, i.e. exergy, that is independant from consumption of the terrestrial stock of chemical (fossil) and nuclear fuels and does not require depositing of useless or even dangerous reaction products.

Technical systems, therefore, have to be designed in analogy to botanical organism, which are able to absorb exergy radiated from sun and to store it in matter as its carrier. The storage of exergy should be carried out under development of functions similar to those performed by ATP (adenosine-tri-phosphate) in all living organisms. Following, therefore, the biological model a steady state of dynamic equilibrium between the exergy consuming technical systems, on the one hand, and their supply systems transforming available energy from the sun should be reached and, must be reached, to obtain a steady state in regard to production and technically useful consumption of the material carrier. Specifically here, the same quantities of carriers should discharge their exergy in technical power and heating systems on the average, as are being recharged by the transformation of solar exergy. Moreover, the storage and discharge of exergy by and for all technical power producing and heat generating systems should not interfere with the various biological cycles or disturb the steady states of all organisms. In other words; the production and consumption of technical exergy carriers should coexist with the biosphere. Most present day fuels do not.

The reasons for the energy crisis of technical systems, their consequences in the long range as well as the possibilities to overcome the crisis will be explained in the following. At first I proceed to present an introduction into the energetic principles of biological organisms. Thereafter I shall describe the dependance of evolutionary development from exergy supply, followed by considerations which lead to this invention.

To secure life, evolution and reproduction of any organism, two conditions in regard to its ambience have to be fulfilled: First, the ambience has to contain the materials necessary to compose the organism's structure, to repair and to reproduce it; second, the ambience has to provide the work which enables the organism both to compose, repair and reproduce its structure as well as to overcome external mechanical or chemical forces.

Both conditions are met in the case of zoological organisms, such as men and animals, in the way, that these organisms do not receive and take up work proper from their ambience but withdraw energy therefrom which is stored as exergy as a potential source for work performed by and in the organism. Exergy is transferred to the respective organism in the form of free enthalpy of chemical compounds which are used to be food. Food has essentially two functions. In accordance with one function, it serves as the material carrier of exergy, the other function is that it serves as raw material for regeneration of the structure. On the other hand, and just as one example, warm blooded organisms loose heat to the usually color environment and, by this exergy. Animals and man however receive energy by way of non-material carriers (i.e. radiation) only to a neglible extent. In terms of thermodynamics, any organism which can receive (or loose) exergy on non-material energy carriers as well as on material carriers is, an open system.

In contrast to open systems such as man or animals, their living space, the earth, is not an open system. The transfer of matter between earth and the outer space is negligibly small; exergy, therefore, will be transferred to earth due to lack of material carriers practically exclusively on non-material energetic carriers, which are electro-magnetic fields, emitted by the sun in the form of radiation. A certain equilibrium exists here as to radiation from the earth and storage of such radiation in the form of latent energy.

It is a problem of primary importance how the zoological organisms, being open systems as defined, can actually exist on and coexist with earth (i.e. within a closed system) for a very long period of time, independant from any open ended source for a material carrier (matter) of exergy. This problem has been solved by nature through the existence of a second category of open systems known as plants. Plants being botanical organisms can transfer exergy from a non-material energetic carrier, to matter as carrier; they do store solar radiation (or exergy of the electro-magnetical field) in form of free enthalphy of chemical compounds by photosynthesis, mostly using atoms of C (carbon), of O (oxygen) and of H (hydrogen), which they withdraw from air and water to complete this basic cycle within the biosphere.

This exergy storage is possible only due to the fact, that hydro-carbons synthesized are metastable in regard to $O_2$; exergy has to be provided to initiate their reactions. Open system requirements of zoological organisms can be satisfied, if in fact, exergy is continuously transferred by radiation from the outside, i.e., the sun. The zoological and botanical organisms can coexist under these conditions if for an unlimited period of time, a stationary state is being maintained and kept constant. It has to be observed however, that the internal exergy consumption typical for all organisms (as an example, to organize metabolism) reduces the amount of exergy which can be used under optimal conditions to feed men and animals, because plants have their own exergy requirements which are consumed irreversibly and cannot be recaptured.

While the exergy radiated from sun will be lost gradually during the numerous transformations-thus causing the one-way dependence of men and animals from plants-matter cannot be lost. It is the matter as carrier of exergy, not the exergy itself, which determines the steady stationary state of coexistence in form of a dynamic equilibrium. In such a case only so many $CO_2$— and $H_2O$— molecules can be charged per unit time with exergy, serving as building blocks for hydrocarbons as well as for the generation of $O_2$, as are discharged from exergy by reacting under formation of $CO_2$ and $H_2O$, caused e.g. by men, animals or other causes.

The stationary state in the coexistence and interaction of zoological and botanical organisms is related to the biosphere as a whole; this state does not include a dynamic equilibrium between individual organisms and its environment. It is, indeed, in general, a non-equilibrium which can be found normally amongst the different biological organisms. Consequently, each organism has a need to participate optimally on the limited exergy supply. As was stated above, individual organisms are open systems and a condition of equilibrium between an organism by itself and its environment cannot be expected to occur but the organism is more or less actively engaged in establishing or maintaining an approach to a dynamic equilibrium with its environment, resulting in a state of coexistence among the species and participants of the biosphere as a whole. On the other hand, this condition of non-equilibrium is the driving force of evolution. Evolution, therefore, is at least to some extent, the result of the fact that the state within the biosphere is not truely stationary, but, so to speak, quasi-stationary only, and coexistence is true only temporarily.

Evolution can be characterized by the rise of organisms that have an increasingly complex (i.e., more adaptable) structure. There are two limiting possibilities for evolutionary development. The phylogenetic evolution means the reproduction of a structure in a slightly modified and (at least) better form caused by changes in pattern. By this method do not the individuals but species or races evolve from generation to generation. In case of ontogenetic evolution the pattern of structure, but not its (natural) disorder remains unchanged. Any progress is now determined by the individual; for the individual is able (in principle) to pass through a large number of stages of development during his life. Mostly humans (less animals) are involved in the ontogenetic development; that part of their structure, which might be changed in the direction of higher degress of order and complexity is located mainly in the brain.

Two different phases of human development are to be recognized the first ending at the middle of 18. century. During this phase mankind constituted a subgroup of zoological organisms within the biosphere; human existence was limited in general by all the factors given by the requirements to coexist with botanical and zoological organisms. Decisive here was that the attempts of humans to exist, did not disturb noticeably the coexistence between the human race and the biosphere, nor did it disturb the coexistence among other species of the biosphere. In the second phase, however, a small group of human individuals was able to overcome some of these limitations in countries which lead up to what became known as the industrial revolution and created what can be called the techno-sphere. This group succeeded not only by improving the heat producing systems known so far, but has been able to develop technical power systems based on fossil fuels. Use of these fuels multiplies the forces available to humans by many orders of magnitudes, but the use of these fuels and this discharge of exergy carriers which have discharged their exergy for the benefit of the techno-sphere has begun to interfere with the biosphere.

There are two consequences essentially: On the one hand a very small group of humans started to accelerate its own evolutionary development (mostly on technological-economical areas) in a way not known before. The non-equilibrium in regard to other groups and inbetween this group resulted in world-wide conflicts. On the other hand, the quasi-stationary state of coexistence of the biological organisms has been discontinued, not only as between the man made techno-sphere and the biosphere, but also among other members of the biosphere, including the human race as a member of that biosphere.

The technical power systems so far developed are designed to consume exergy stored in matter as carrier. The supply of these systems seems to be organized, therefore, in analogy to zoological organisms. While, however, the zoological systems coexisted in a stationary state with the botanical systems, this situation does not hold true for the technical systems. Today the technical systems consume at about 95% exergy of fossil fuels, which is exergy stored from botanical organisms in form of hydrocarbons and $O_2$; the technical systems are fed with this exergy from sources of supply, which have been accumulated during some millions of years. As a consequence, this kind of exergy supply is limited in time necessarily.

The totality of botanical organisms needs and receives a solar exergy flux for the production of hydrocarbons and $O_2$ of about $40.10^{12}$ W. Compared to this, the technical systems consume today (1974) an exergy flux of about $6.10^{12}$ W. If, however, the entire world population of about $4.10^9$ individuals were to consume in the average, the same amount of exergy of about 10 kW consumed per capita in the U.S., technical and botanical systems would have the same demand for exergy. Considering the rise in population, increasing industrialization etc., this may occur in the near future. In this case, and, due to the low efficiency of photosynthesis of about 10%, ten times more of $CO_2$- and $H_2O$-molecules will be released than plants can reconstruct into hydrocarbons and $O_2$. Thus, the steady state in regard to exergy carriers has been destroyed, and the discharged exergy carriers, $CO_2$ and $H_2O$ accumulate in the atmosphere and elsewhere.

The supply of fossil fuels, such as coal, oil and natural gas are estimated to be about $200.10^{21}$ Ws (or approximately 200 Q). This quantity is enough to cover a continuous demand of $40.10^{12}$ W for a period of time of $5.10^9$ s, equivalent to about 158 years. If, however, mankind increases up to about $15.10^9$ individuals by the year 2050 (as indicated by reasonable extrapolation), and if, in addition only half of the fuel can be made available for actual consumption, then the time period will be reduced from 158 to 21 years!!

In order to continue human evolution with the assistance of technical heating, power and other work producing systems, as well as information systems, the dynamic equilibrium in the biosphere has to be restored and the exergy supply of technical systems must be ensured on a longterm basis but in an entirely different manner.

Nuclear carriers of exergy such as uranium, plutonium and deuterium, cannot be used to reach both targets. The deuterium available within the closed system earth is inexhaustible if compared to uranium; the problem, however, is that all discharged carriers (and their by-products) such as tritium as well as the fission products of uranium and plutonium have to be stored, because they cannot be recharged (which is the principle difference between carriers of chemical and nuclear energy). The accumulation of these highly radioactive and long-lived materials is accompanied with an increasing probability for radioactive contamination of the biosphere with the result of a deadly interruption of all steady states.

The only solution for this problem seems to lie in a technical system for exergy supply, which is designed in accordance with the principles of botanical organisms and can coexist with the biosphere! Solar exergy must be stored on a material carrier which can be used as universal technical fuel and which in turn can be recharged following use without interferring the biological steady state. Even a population of $15.10^9$ individuals consuming 10 kW per capita will claim only a very small fraction of the solar exergy flux of about $173.10^{15}$ W. A solar based technical exergy supply system following the rules mentioned above is the object of this invention.

The present day exergy utilization in the technosphere should be considered in some detail. Presently, the zoological organisms as well as the technical power and heating systems are both fed with exergy transferred almost exclusively by means of material carriers, and their internal organization is developed to make available the exergy to the various organs and subsystems respectively; these are the consumers of the exergy. Both the zoological as well as the technical systems have developed two identical principles for this work; on the one side exergy, which is stored on a material carrier, will be distributed and made available for consumption by the consumers wherever required; on the other side, exergy is made available and transmitted in form of electrical energy ready for immediate consumption along conduction paths. A material carrier of exergy is (in some respect) like a storage facility, whenever work has to be performed the storage facility must be tapped. As an example, a hydrocarbon of higher degree is an exergonic chemical compound, which appears to be metastable in regard to $O_2$ under normal conditions. However, work for obtaining the discharge of the stored exergy of such a carrier has to be exerted and even be accumulated in many cases until a trigger level has been reached, which is equivalent to the exertion of activation exergy to overcome the metastable threshold and being necessary also to increase the capacity for the reaction. In the presence of a catalyst the activation exergy is diminished.

Electro-magnetic fields are used as non-material, energy carriers in both biological and technical systems. These carriers transmit exergy in technical systems at low frequencies, guided by metallic conductors available for immediate consumption at any place without any activation. There is a trade off here between the limited possibilities for storage of exergy of electromagnetic fields and the immediate availibility of field exergy; the access time for exergy stored in a non-material energetic carrier is essentially zero.

At the present stage of development the technical power and heating systems are fed with different hydrocarbons, which have almost the same specific exergy, but which differ in regard to phases (solid, liquid, gaseous). Also, the activation exergy differs in dependance upon the $H_2$-content. Coal has the lowest $H_2$-content, less than 7.5% and, therefore, requires the highest activation exergy. Oil, which is a liquid with a $H_2$-content of about 15% exceeds natural gas with a $H_2$-content of 33% in regard to the activation exergy. About one-third each of all technical systems use coal, oil and gas respectively (Example: U.S.A. 1970).

Thermal activation is the only possibility known so far to make available this exergy in a technical scale; the stationary combustion of fossil fuels requires about 35% of their exergy stored for activation. This means that activation cannot be performed without accumulation of external exergy. Coal requires, therefore, the longest ignition period, while natural gas has the smallest period and its exergy is available rather immediately.

In highly developed countries, about one-third of the material carriers of exergy will be discharged in power stations. Specifically, about 35% of the exergy stored and transported in some fashion to the power station will be consumed for the thermal activation of carriers, and an additional 35% will be used in the subsequent transformation into electrical energy; the (so-called thermal) efficiency of power stations, therefore, will not exceed much about 30%. As a consequence, about 10% of the total energy transmitted to all the technical power and heating systems will be available directly in the form of electrical exergy in a distribution network however, only about 43% of this energy, arriving at the consumer, are actually available for the various non-electrical consumers.

The cost for the transport of electrical energy and of gaseous, liquid and solid hydrocarbons are estimated to follow the ratio 20:5:1:10, while the capacities of the usual transportation devices in accordance are related as 1:25:500:1. Both, the medium activation exergy and the extremely high amenability of liquid exergy carrier to transportation, when compared to the others, have greatly influenced the evolution of technical power and heating systems predominantly towards liquid exergy carriers: The word-wide shift in regard to these systems from solid to liquid exergy carriers (partially to gaseous carriers) as universal fuels cannot be reversed. This however, has produced a direct and increasing dependance from oil, but oil constitutes only about 5% of the supply of fossil fuels. Consequently one must analyze proposals to replace oil by other liquids, which aspect is the principle concern underlying this invention.

Since the coexistence of the techno-sphere and of the biosphere must be regarded as an absolute prerequisite for the continuation of both spheres, it is reasonable and appropriate to match the former to the latter. Thus, it is worthwhile to note the fact, that all living organisms have developed the identical organization to distribute and make available the exergy which has been received even though they developed along very different lines of evolution. The principle of this organization is apparently optimal and further development may not be necessary or even possible. This principle can be characterized (as far as known today) by the following rules:

1. Higher hydrocarbons are used both to store exergy on a long-term basis and to transfer exergy from the botanical to the zoological organisms.

2. ATP (adenosine-tri-phosphate) is the carrier which is being used exclusively within all living organisms for both storing exergy on short-term basis, and for distributing it internally.

3. Exergy of hydrocarbons and of ATP will be released in form of electrical energy; in the reverse, hydrocarbons, ATP and other carriers when used to perform non-electrical work are synthesized by means of electrical energy. The blocking of the first (exergonic) process is overcome by special catalysts.

The transformation of solar exergy in botanical systems and (indirectly) in zoological systems as well as the coupling between both kinds of systems with the help of hydrocarbons can be explained by these rules as follows:

ATP plays the decisive role by being the universal fuel transported in liquid phase within all organisms. The exergy of ATP will be transformed reversibly and directly into electrical energy (which appears to be one of the long-term targets of development of technical systems, realized in a first step by fuel-cells). The exergy stored in ATP is also being used to perform mechanical work in muscles or chemical work by "pumping" ions in the cells of the nervous systems.

Hydrocarbons, however, not ATP do couple the zoological to the botanical organisms in regard to exergy transfer due to the fact, that the atmosphere has to be used for recycling of all discharged carriers in nature! The reaction-products of ATP, however, which are ADP (adenosine-di-phosphate) and P (free phosphate) cannot exist within an ambience containing gaseous $O_2$ in contrast to $CO_2$ and $H_2O$ which are different. The external exergy carriers for biological organisms are at the same time the raw material for the construction of the organisms structure; it seems to be necessary, therefore, to offer a broad spectrum of different hydrocarbons.

OBJECTS AND PURPOSE OF THE INVENTION

It is the object of the invention presented here to describe a technical system for exergy supply on a solar basis, to which the present technical power and heating systems can easily be adapted. The basic idea is to find a technological analogon to the internal organization of biological organisms as characterized by the three rules mentioned above.

In the present stage of technical development exergy carriers do not serve also for the construction of the systems to be supplied with exergy. Therefore, technical, work producing and energy consuming systems should be coupled directly with a new fuel supply system via a universal liquid fuel which has to some extent analogous functions as ATP.

This universal fuel must have the property that its reaction-products can be recycled through the atmosphere (for rule 1 is still not applicable to the present technical systems); the reaction-products should not interfere with the biological cycles and should not disturb coexistence with biological systems. $N_2$ which is nitrogen is the only one component of air, except $CO_2$, which can be considered as a basis for the contemplated technical exergy carrier due to its dominating abundance. Hydronitrogens, therefore, seem to be best suit to bear the role of a universal technical fuel. The simplest compound $(NH_2)_2$ here is hydrazine or di-amide; it is a liquid under normal conditions, has a high specific exergy but is metastable and reacts with $O_2$ or $(OH)_2$, which is hydrogen-peroxide, forming $N_2$ and $H_2O$ as required fundamentally.

Hydrazine is a compound which can be used favorably in fuel cells due to the electron transfer when reacting with $O_2$ or $(OH)_2$ in order to transform its exergy into electrical energy directly. In the case that this transformation can be realized in a technical scale, then the analogy between this fuel and ATP might be perfect; as a technical consequence the transmission of electrical energy via extended networks can be dispensed with. The following relation describes this particular electron transfer:

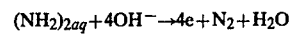

$$(NH_2)_{2aq} + 4OH^- \rightarrow 4e + N_2 + H_2O$$

Hydrogen-peroxide can actually be used in a turbine even without hydrazine due to the relatively large exergy released during decay into $O_2$ and $H_2O$ when in contact with catalysts. The requirement to feed conventional systems with the new universal fuel and its liquid oxidant without larger adjustments is, therefore, realizable on a technical scale and has been realized in the past.

Hydrazine is today raw material for the production of a large number of chemical compounds, such as drugs and nitrogen polymers, and especially poly-amides are of great importance in the chemistry and technology of synthetic plastics. It might be useful to consider hydrazine as the substitute for oil in the chemical industry. This, however, presupposes that hydrazine can be made available for example under direct utilization of solar exergy!

All biological organisms do replace continuously large parts of their structure; by this the reliable functioning of the structure is secured twice: The continuous reconstruction is equivalent to a replacement of used parts before the rapid increase of probability for failures, while on the other hand, the continuous production of identical parts lowers deterministic failure rates substantially. An extended nervous system provides continuous supervision of the organism.

The present technical power and heating systems and especially the exergy supply systems (power stations) are organized and designed in a manner which is quite different from both the biological organisms and the modern technical information systems. Power and heating systems as well as power stations are mostly produced from parts designed for long life terms; it is hardly possible even to define probabilistic failures. The methods used to avoid deterministic failures include supervision during production and sufficiently large proportioning. Failsafe devices, standby equipment and some redundancy have been introduced to reduce failure and dropout probability as far as overall operation is concerned. But cost considerations have more or less left this concept in rudimentary stages.

The rapid increase of exergy demand for exergy in the future will apparently result in serious production gaps (for power stations) due to this design and safety philosophy provided that nuclear energy will be chosen to overcome the crisis in the near future. In order to keep up with the needs for power just in the European community, an additional 1000 MW nuclear power station has to be installed twice a week.

The exergy transformer for converting solar exergy into hydrazine due to this invention is designed and supervised following the principles of biological organisms.

This invention to be described in the following gives an example of how to realize the solutions of problems mentioned in the foregoing. The specific object of the invention, therefore, is a method and system to transform exergy in order to supply the technical work producing, power and heating systems, and also systems converting chemical energy directly into electrical energy, with exergy on a material carrier. More specifically, it is an object of this invention to use solar exergy for producing a fuel which when discharging its stored exergy results in decomposition products and waste which is compatible with the biosphere and will not destroy the coexistence between plants and animal on the earth. It is, therefore, an object of this invention to provide for a techno-spheric cycle which can coexist with the biospheric cycle particularly with regard to inherent mutual traversion of these cycles by each other because of common use of the atmosphere.

It is another object of the present invention to provide for a method and system for the synthesis of chemical endergonic compounds. An endergonic compound is one in which the free enthalpic after formation of the compound is larger than the free enthalpic prior to that formation; in contradistinction to an exergonic compound in which the relation as to free enthalpic is reversed.

It is a further object of the present invention to convert solar exergy into different forms of exergy which is or includes electrical energy using a novel process under utilization of MHD-principles.

It is a still further object of the invention to provide a new method for obtaining electrolysis in an MHD fluid process energized by means of externally applied thermal energy.

It is a still further object of the invention to provide for a system which permits the large scale production of hydrazine from solar energy as an endergonic compound using largely self-contained modules which can be clustered.

SUMMARY OF THE INVENTION

In accordance with the preferred embodiment of the invention, a device, called exergy transformer, absorbs exergy, preferably in the form of solar radiation and converts this exergy first into electrical energy, and stores this energy on the components $N_2$ and $H_2O$ in the way to obtain a liquidous chemical compound $(NH_2)_2$ serving as the material carrier of this exergy proper and which may serve as the supply for the technical work producing power and heating systems as well as fuel cells, to make this exergy available in form and manner which is compatible with the biosphere and coexists therewith fully.

The production of the preferred oxidizer, $(OH)_2$ may accompany the process of forming $(NH_2)_2$ while producing $H_2$ as raw product needed for the $(HN_2)_2$ synthesis. $N_2$ and $H_2O$ will serve as the raw materials of the exergy transformation system as producing $(NH_2)_2$ and $(OH)_2$, and these products are in turn the products of the reaction of $(NH_2)_2$ and $(OH)_2$ or $O_2$, and can, therefore, be characterized to be the discharged carriers of exergy, which are recycled within the atmosphere from the exergy consuming technical systems and fuel cells to the exergy transformers, in a far-reaching analogy to $CO_2$ and $H_2O$ as the discharged external carriers of exergy supplied to biological organisms.

Specifically, it is most significant, that the biospheric carbon/$CO_2$/water cycle and the techno-spheric hydronitrogen/nitrogen/water cycle do not interfere with each other. The steady states of technical systems as using $(NH_2)_2$ and $(OH)_2$ and as discharging $N_2$ and $H_2O$ as exhausted carriers of exergy, including any equilibrium with production of $(NH_2)_2$ and $(OH)_2$, will coexist with the analogous steady state of biological organisms functioning with energy charged hydrocarbons and $CO_2$ and $H_2O$ as discharged carriers. In view of the fact that only limited amounts of $N_2$ (and, possibly but not necessarily, as water) are only temporarily extracted from the earth's atmosphere, changes of the climate at earth's surface are not produced. Also, absorption of solar radiation and rejection of the waste heat (of transformation) for very large scale production will not result in climate changes due to the fact that the solar exergy absorbed will be taken mostly from that fraction which is re-radiated into space and will be replaced partially by the waste heat of the transformation process anyway.

If $H_2O$, as well as $N_2$, are separated from the air by physical methods charged with exergy within the transformer and conversion systems, in principle, three different processes are involved in order to synthesize $(NH_2)_2$, $(OH)_2$ and/or $O_2$. The first process is the conversion of solar radiation, reflected and focussed by mirrors, into electrical energy based on magneto-hydrodynamics with liquid metals serving as the working fluid; the second process might overlap with the first one because the same liquid metal is used in this second process for the synthesis of $(NH_2)_2$ and consumes a portion of the electrical energy generated. The remainder of the electrical energy is taken from the transformer system proper and fed to the third process producing both $H_2$, as an intermediate product for the $(NH_2)_2$ synthesis by the second process, as well as $(OH)_2$ and/or $O_2$.

More specifically, solar exergy will be transferred to a working fluid in the first process and converted in parts, into kinetic energy of the working fluid. Preferably Li and Li($NH_2$), i.e., lithium and lithium-amide are used as the liquid phase of the working fluid. The solar exergy thus transferred is made available in the form of electrical energy for and in the other two processes, using interaction of the liquid metals with an external travelling magnetic field. About one-third of the electrical energy generated will be consumed directly within a free, magnetically guided Li—Li($NH_2$)—jet for the second process which is the electrolysis of Li($NH_2$), using finely dispersed Fe, which is iron, to act as bipolar electrodes (in this step) in order to obtain the separation of $(NH_2)_2$-groups from the lithium, followed by combining of respective twos of groups to $(NH_2)_2$; the residual solution of metallic Li and Li($NH_2$) is recycled in the process.

The remaining two-thirds of the electrical energy will be coupled out from the exciter coils of the external magnetic field and transferred to another system, apart from the system described in regard to the working fluid, in order to run the third process outlined above and which takes place chemically in a far reaching analogy, and which is comprised of the electrolysis of Li(OH) (or other alkali-hydroxides), possibly using bipolar electrodes, in order to generate OH-groups which can combine to $(OH)_2$ in a further step, thus producing metallic Li (or other alkali-metals) at least ready for reaction with $H_2O$ releasing $H_2$ and $(OH^-)$ within a closed cycle.

The first process (converting solar exergy into electrical energy) by itself should require and consume a small amount of exergy. This high internal efficiency will be achieved by a proper development of the different steps compared to those of the well known liquid-metal-MHD-processes. Specifically, not only are liquid and gaseous phases of the working fluid chosen as different media, to obtain maximum efficiency of acceleration by optimization in the choice of quality and densities, but the liquid phase is also mixed with finely dispersed iron to make it behave like a ferro-magnetic fluid, thus permitting to exert body forces upon the various droplets at the end of acceleration in order to cause the droplets to conglomerate and to form a compact, free jet, concurring with separation of the residual gaseous phases. This way, jet guidance and (radial) jet compression during deceleration is simplified.

As stated above, Li and Li(NH$_2$) is used as liquid phase for the working fluid. N$_2$ is the preferred gaseous phase in the working fluid, because N$_2$ is, on the one hand, inert in regard to the mixture of Li(NH$_2$) and the powdered iron, while, on the other hand, N$_2$ leads to a density ratio of about $10^{-2}$ of gaseous to liquid phase at 800 K, which ratio causes an acceleration efficiency in the jet forming nozzle about 0.7 at qualities about 0.5, as has been found emperically. N$_2$ circulates in a separate circulation through the system.

As stated, the working fluid includes ferromagnetic liquid droplets, which, when leaving focussing nozzles following expansion, enter a radial symmetric, but strongly inhomogeneous magnetic field just before the focussing point of the two-phase flow, given by nozzle configuration. Therefore, these droplets are forced to move in the direction of decreasing field strength like a diamagnetic body until they form a compact liquid jet, due to the magnetic momentum induced opposite in the direction to the external field within the droplets. A similar effect, however, can be achieved by another device, composed from a ring-shaped separator upstream of the focus of two-phase flow, with a Coanda-lip at its lower end, and used to separate a portion of liquid phase from the two-phase flow, which flows along a separator surface, leaves the separator by passing the Coanda-lip, and thus, forms a hollow-cored liquid jet, which enables an electric current to flow in axial direction from the ring-shaped separator, serving as the upstream electrode. The hollow-core jet is used here as a metallic conductor for the generation of a focussing (or radially compressing) theta-pinch.

In both of these cases as outlined in the preceding paragraph, the gaseous phase, has accelerated the liquid phase in expansion nozzles, but has decoupled from the droplets at the end of expansion due to its very low density. The gaseous phase will diffuse from the converging droplets when flowing from the nozzle exit towards the device for jet generation, even if expansion is not continued here. The decoupled gaseous phase is caused to enter a heat exchanger. Any residual portion of the gaseous phase will be extracted during magnetic compression of the liquid phase, until a compact, ferromagnetic free jet with high specific kinetic energy has been formed.

This jet has a high magnetic Reynolds-number. An external magnetic, preferably radial-symmetric, travelling field is applied to that jet to obtain energy extraction by deceleration. This field is generated by solenoid cells and should guide and compress the jet following the betatron-principle, forcing the jet into the place of minimum potential energy in the coil axis. This jet must also enter a jet capture device at the end of energy extraction in order to make use of its residual kinetic energy for the compression of the liquid (following bernoulli-equation) to obtain its recirculation as working fluid (liquid phase) to the heat source, which is possible only if the jet retains a compact configuration; this jet can be compressed radially by the field lines passing through the liquid jet in axial direction, thus compensating the forces which, under certain circumstances, tend to blow the jet in radially outward direction, particularly when the field lines are distorted by the increase of cross-section of liquid jet due to its deceleration.

As a feature of the invention it is suggested to provide for three linked circulations. The first circulation involves basically lithium and lithium amid as the liquid phase in a two phase flow for the preparation for the MHD process. The lithium serves additionally as working fluid for that process concurring with the function as carrier fluid in which electrolysis for the final formation of hydrazine takes place. Still furthermore the lithium is the fluid which is initially heated i.e. which undergoes the primary heat exchange with externally applied and/or developed thermal exergy. This liquid phase will, in the following be termed more generally the first magneto-hydro-dynamic fluid or mfd #1 fluid for short.

The gaseous phase in the two phase flow is established by a second circulation of a fluid called thermofluid dynamic fluid or tfd for short. This fluid has been pressurized and enters into heat exchange with the liquid phase for isobaric heating, followed by immediate expansion and acceleration so that in turn the liquid phase is accelerated in a manner known per se. The gaseous phase is separated from the liquid phase and does not participate in the electrolytic process, instead it enters into recuperative heat exchange with itself and being isothermically pressurized inbetween. Specifically, the tfd gas is isothermically pressurized and that gas when still having low pressure gives off thermal exergy to the gas following repressurization so that this compression can be carried out at lowest possible temperature without wasting the thermal energy.

The third circulation is the mfd #2 fluid enters into heat exchange with the gaseous phase (second circulation) for obtaining the isothermic low temperature compression so as to reduce the work needed for that pressurization of the tfd-gas. The tfd fluid may at some point actually be liquified.

The mfd #2 fluid serves, basically as heat exchanger but should have mfd characteristics so that it can be pumped e.g. by an auxiliary MHD-pump. This mfd #2 fluid will be cooled externally by means of air. This cooling may be carried out indirectly through interpositioning of another heat exchange circulation, if for various reasons the mfd #2 fluid became "contaminated" with reaction residue of the mfd #1 fluid and has to be cleaned during its circulation.

The process that is carried out in accordance with the present invention can also be understood on a more generalized basis. One begins with a concentration of solar energy as preferred source of heat. That heat is used (together with a catalyst) to synthesize an amid of an alkali metal by adding nitrogen and hydrogen. The amid is then caused to give off the NH$_2$ under conditions which permit ready and direct formation of hydrazine, while the metal is caused to recycle. The hydrogen is produced separately and the nitrogen is taken from air. In one form of practicing the invention, the hydrazine is generated by way of electrolysis as mentioned and on the basis of an MHD conversion process deriving its exergy from the solar energy in that a two phase system is operated and energized by the solar energy for moving the liquid phase through the MHD device. That liquid phase is or includes metal-amid, while the gaseous phase is the thermo dynamic working fluid and circulates separately. The hydrogen needed for this process is produced for example by a separate, electrolysis of water but powered by excess electrical energy from the MHD conversion, wuile $(OH)_2$, a suitable oxidizer results as bi-product. Alternatively, (as to hydrazine production) the metal amid is chemically treated to give off $NH_2$ for the production of hydrazine. This is accomplished by adding water to the metal amid so that metal-hydroxide, diamid and hydrogen is formed. The production of hydrogen is, therefore, a direct part of the hydrazine synthesis and can be used to obtain the metal amid. The MHD conversion process is used also here to reconstitute the metal by electrolytically decomposing the metal hydroxide. Water and hydrogen is used in this process as the gaseous phase for the two phase system necessary to produce the movement of the liquid phase through the MHD system. Recuperative heat exchange and recompression of the gaseous phase is used in either case, as thermo-dynamic process steps.

In any of these methods kinetic energy of a liquid phase is extracted from solar energy and electrolysis is obtained by induction in that liquid phase as it moves through the MHD conversion system. The non-coulombic electric field as induced therein strips off electrons from the negative $OH^-$ or $NH_2^-$ ions and shifts them to the positive metal ions while iron particles serve as bi-polar electrodes responsible primarily for a strong electric current in the liquid phase which sustains the electrolytic electron transfer in the liquid between and adjacent the iron particles. The current within the fluid interacts with the magnetic field as applied (external or through self-excitation) and as increased by the ferromagnetic properties of the iron particles, to thereby guide, focus and decelerate the free flowing fluid thus taking care of the energy balance.

The transformer system is designed and constructed to permit the raw materials $H_2O$ and $N_2$ of the processes as well as the intermediate product $H_2$ to enter, and the products $(NH_2)_2$, $(OH)_2$ and/or $O_2$ to leave, without impairing the reliability of the total transformer system. On the other hand, the system must be designed to satisfy the needs of the logistics of the entire exergy transformer system as to reduction of probabilistic failure due to a modular concept and due to an on-line production in a factory (not on site) with very stringent quality checks. Additionally, redundancy should be introduced, and modules should be exchanged frequently after a relative short operation time. All of the subsystems as well as the characteristic states of processes should be continuously supervised. A basic condition must be met namely, that bottlenecks are to be avoided as much as possible as far as production and installation are concerned as that would hamper meeting any rapidly increasing demand.

The contemplated synthesis of $Li(NH_2)$ using metallic Li, $H_2$ and $N_2$ as raw materials, will be based on forces typical for thermodynamics of irreversible processes, in other words, processes are run by non-equilibria without requiring moving mechanical parts (which are necessary when making use of the ammonia-synthesis as intermediate step). Running the process on the basis of disturbing or preventing locally a thermo-dynamic equilibrium can be realized for example if $N_2$ and $H_2$ are introduced directly into the Li as passing through the heat source and are made to react with Li with the aid of the finely dispersed Fe serving in this instance as catalyst. In a different part of the system, any $(NH_2)_2$ that has been produced must be evacuated from the free jet, passed through the space between the jet and the coils of the magnet system, condensated elsewhere and discharged.

The transformer systems proper, in which exergy storage takes place, are constructed for production in very large numbers, following the principles of modular light weight techniques, and thus, reducing the components to parts of very simple geometry, for instance, to tubes, coils and stamped out sheets; this idea can be realized if the principles of construction of vertebrates are adapted, which are based on a skeleton, carrying the various organs and enveloped by multiple elastic skins, for example, by using a skeleton like frame made from parallel tubes and stiffened and partitioned by equidistant sheets equivalent to bulkheads. Such construction takes up on the one hand, all internal and external forces, but transports internally, on the other hand, the various fluids. The skeleton or frame is manteled by at least two skins; the inner skin is stiffened, in addition, by another, corrugated sheet, and encloses the working fluid. The outer skin, due to its lower temperature, compensates the internal pressure of the system, which is transmitted by the corrugated sheet; the space between both skins is maintained by the corrugated sheet, and is filled with a gas at very low pressure in order to serve for thermal insulation as well as to permit leak detection of either skin. Cables, heaters and sensors (as an example thermo-couples, pressure-transducers, microphones) are located within that space between the envelopes providing continuously inputs for supervision and control of operation of all the modules e.g., by the computer analysis of stochastic signals. In the case of probabilistic failures, indicated quite early, an immediate replacement of the module by a new one from store can be arranged.

The light weight modules, as well as all other subsystems except the mirrors, are produced on line, tested thereat and operated within the factory in order to eliminate any assembling on site. As a consequence, total weight and dimensions due are reduced, permitting air transportation. The mirrors are made from foils, which are cut, formed and prefabricated, also in a factory, in order to minimize installation site including welding, foaming of structure, stressing foils by gas pressure and initially filling buoyant storages with $H_2$.

Finally, it has to be mentioned, that the storage of solar exergy is understood to be the long-termed target and presents the preferred example of invention. However, the exergy transformer according to this invention can be coupled directly to nuclear fusion and/or breeder reactors or to other heat sources, mirrors can be omitted in that case.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1 to 7 describe some details of the scientific basis of this invention, here in regard to the chemical process of exergy storage;

Figure 10:
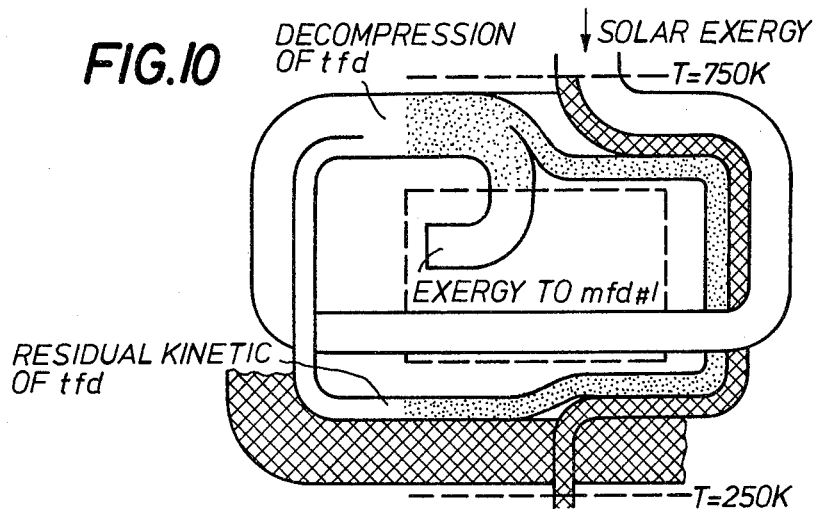

while the FIGS. 9 to 11 describe some details of the scientific basis of invention, here in regard to problems of physics of exergy storage;

FIGS. 12 to 39 include the principal informations in respect to the engineering design of the MHD-modules of the exergy transformer system total, given by different sectional views and details of embodiments, whereby particularly longitudinal section views, in overlapping illustration, of FIGS. 24, 25, 27, 32, 36 and 38 show one module, and concatenated FIGS. 21, 22, 27, 32, 36 and 38 show an alternative module.

Figure 1:
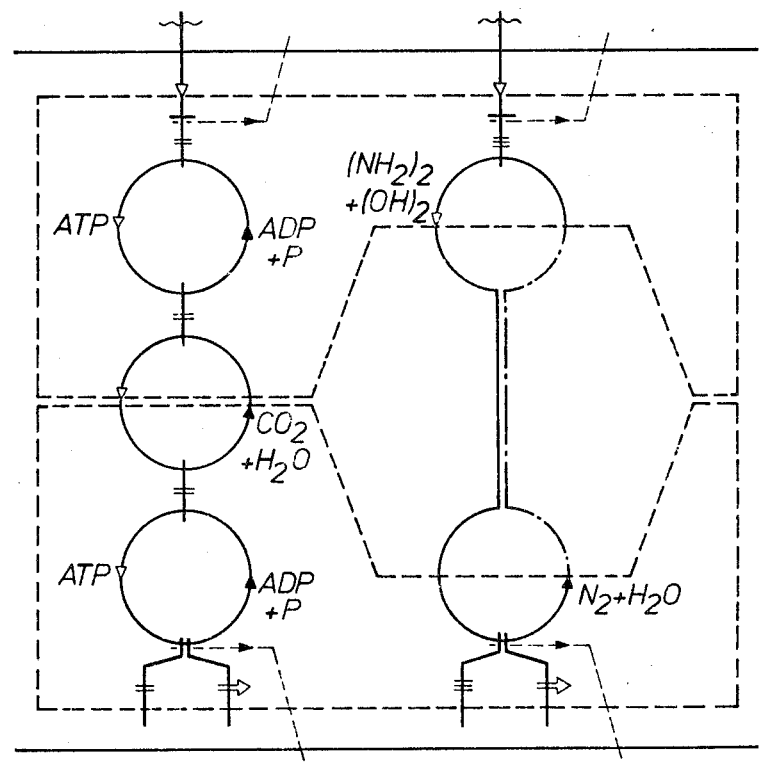
Figure 4:
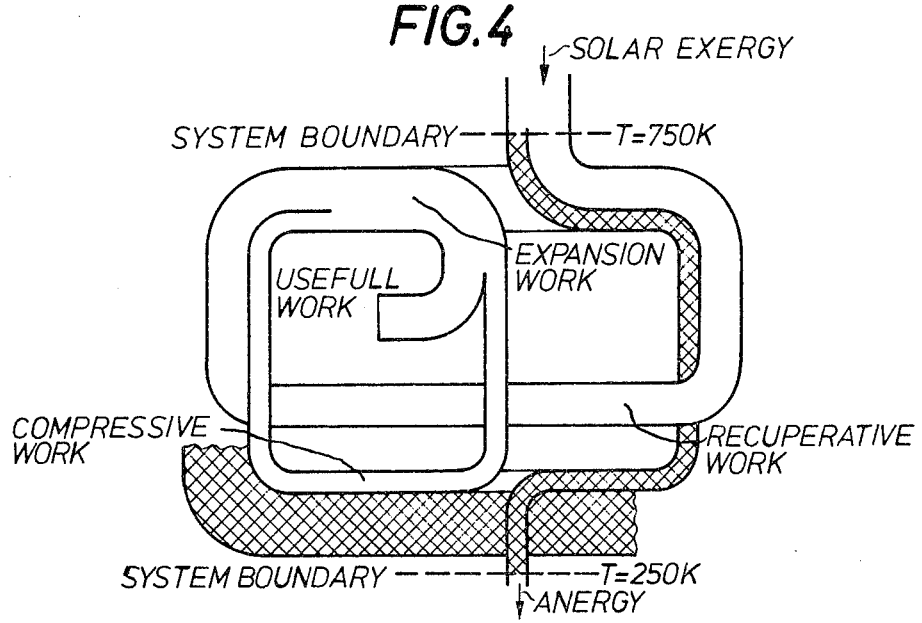
Figure 20:
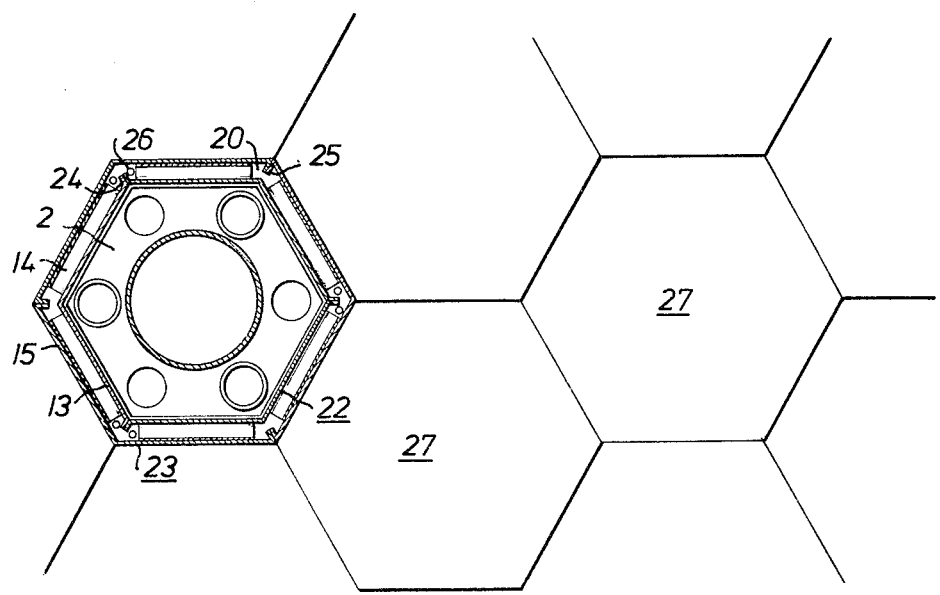
Figure 24:
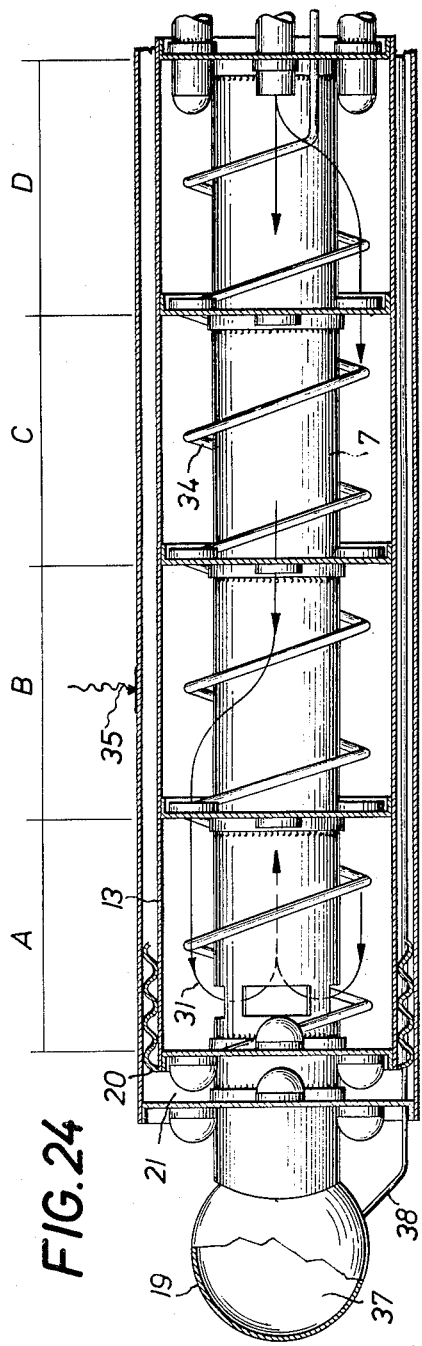
Figure 26:
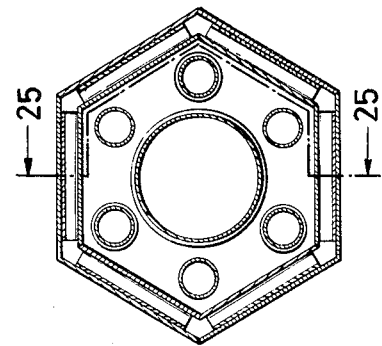
Figure 25:
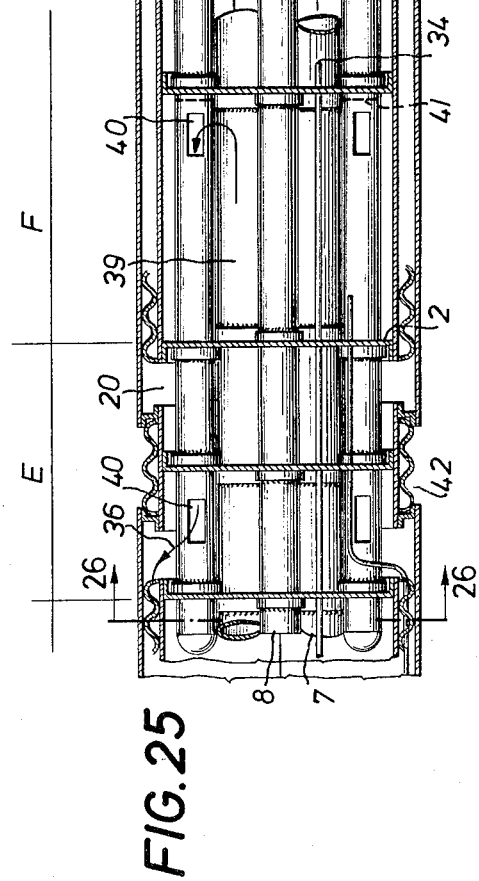
Figure 40:
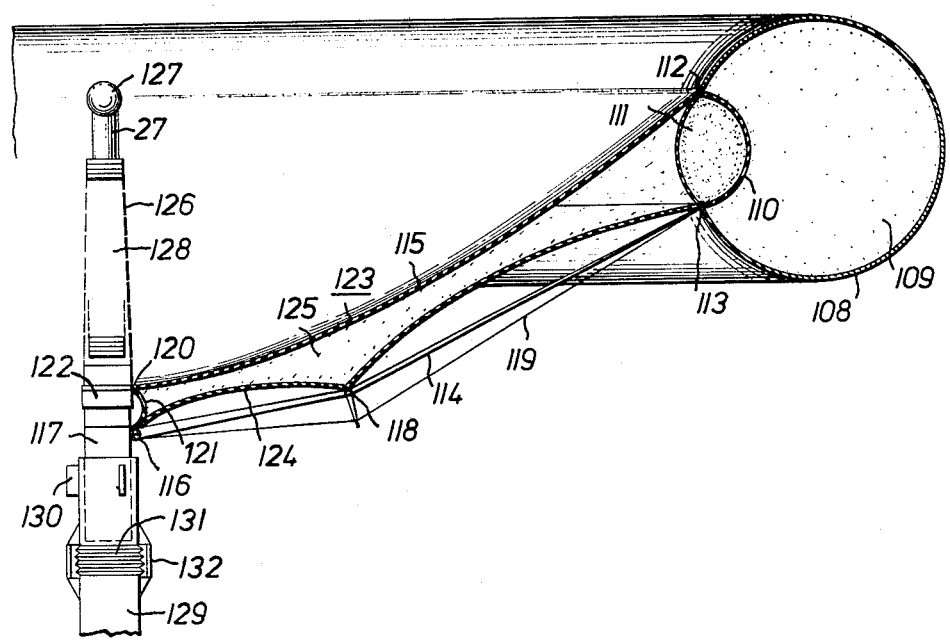
Figure 41:
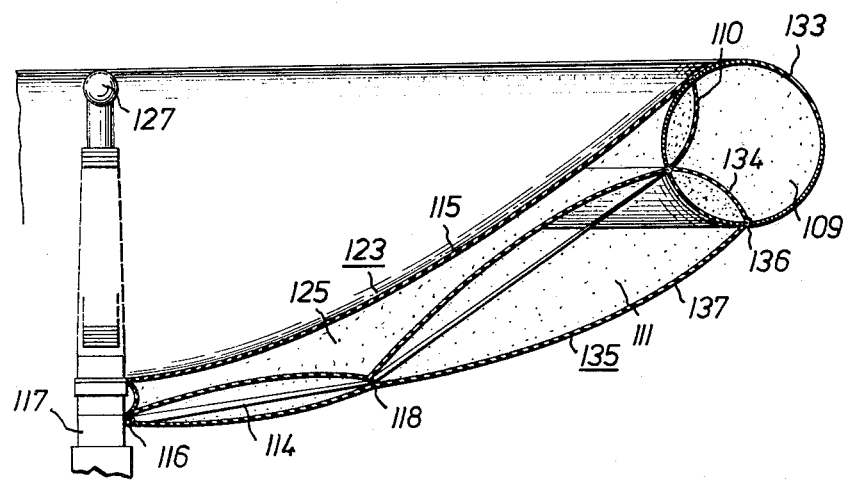

FIG. 1 is a demonstrative illustration for comparing the biological exergy transformations with future technical exergy transformations on solar basis due to this invention;

FIG. 2 is a graph showing the exergy required for the synthesis of hydrazine, subdivided into the steps formation of $H_2$, formation of amide and combination of amides to di-amide;

FIG. 3 is a graph showing the exergy required for the production of hydrogen-peroxide, subdivided into the steps formation of $H_2$ and formation of hydrogen-peroxide;

FIG. 4 is an exergy-flux diagram of the isenthalpic-isobaric process in regard to the thermo-fluid-dynamic working fluid;

FIG. 5 is a graph showing the exergy required for the synthesis of Li-amide from elements using a catalyst;

FIG. 6 is a graph in which free enthalpy for formation of alkali-amides is plotted as a function of temperature;

FIG. 7 is a graph in which the free enthalpy of formation of both hydrazine and hydrogen-peroxide is plotted in units of process steps;

FIG. 8 is a flow and function diagram for the complete process in accordance with the preferred embodiment of practicing the invention in a system;

FIG. 9 explains the transmission of exergy during acceleration of multi-phase fluids in the system of FIG. 8;

FIG. 10 is an exergy flux diagram of the isenthalpic-isobaric process in regard to the thermo-fluid-dynamic working fluid of the MHD-system of the exergy transformer in accordance with the system of FIG. 8;

FIG. 11 presents the MHD-process of the exergy transformer in a temperature-entropy diagram;

FIGS. 12, 13 and 14 are drawings of details of the MHD-module presenting the transverse and the longitudinal bulkheads or partitions;

FIG. 15 is a drawing of details of the MHD-module explaining the construction of the supporting skeleton;

FIGS. 16, 17, 18 show details presenting an additional type of transverse bulkhead;

FIG. 19 is a longitudinal section view for explaining the principle of manteling the supporting skeleton of an MHD-module;

FIG. 20 is a sectional horizontal view of a manifold of MHD-modules;

FIG. 21 is a longitudinal section view of the compartments A through D of a MHD-module using nuclear energy;

FIG. 22 is a continuation section of additional compartments of such a module;

FIG. 23 is a cross-section along lines 23,23 in FIG. 22;

FIG. 24 is a longitudinal section view of the compartments A through D of a MHD-module using solar energy;

FIG. 25 is a continuation of the section view of FIG. 24;

FIG. 26 is a cross-section along lines 26,26 in FIG. 25;

FIG. 27 is a sectional longitudinal view of the compartments F, G ... L of the MHD-module and continuing either FIG. 22 or FIG. 26;

FIGS. 28, 29 and 30 are correspondingly labelled sections taken from FIG. 27;

FIG. 31 is a drawing of details explaining the ring-shaped separator with a Coanda-lip for multi-phase flow in FIG. 26;

FIG. 32 is a longitudinal section view of the compartments M, N ... R of the MHD-module and continuing FIG. 27;

FIG. 33 and 34 are correspondingly indicated cross-sections in FIG. 32;

FIG. 35 is a drawing of details of FIG. 32 explaining a transfer mains made from stamped sheets welded together;

FIG. 36 is a longitudinal section view of the compartments Q, R ... U of the MHD-module and continuing FIG. 32;

FIG. 37 is a cross-section along lines 37,37 in FIG. 36;

FIG. 38 is a longitudinal section view of the compartments S, T ... Y of the MHD-module and continuing FIG. 36;

FIG. 39 is a cross-section along lines 39,39 in FIG. 38;

FIG. 40 is a sectional radial view of a mirror made from foils and stabilized by pressure differences;

FIG. 41 is a sectional radial view of a different type of mirror; and

Figure 42:
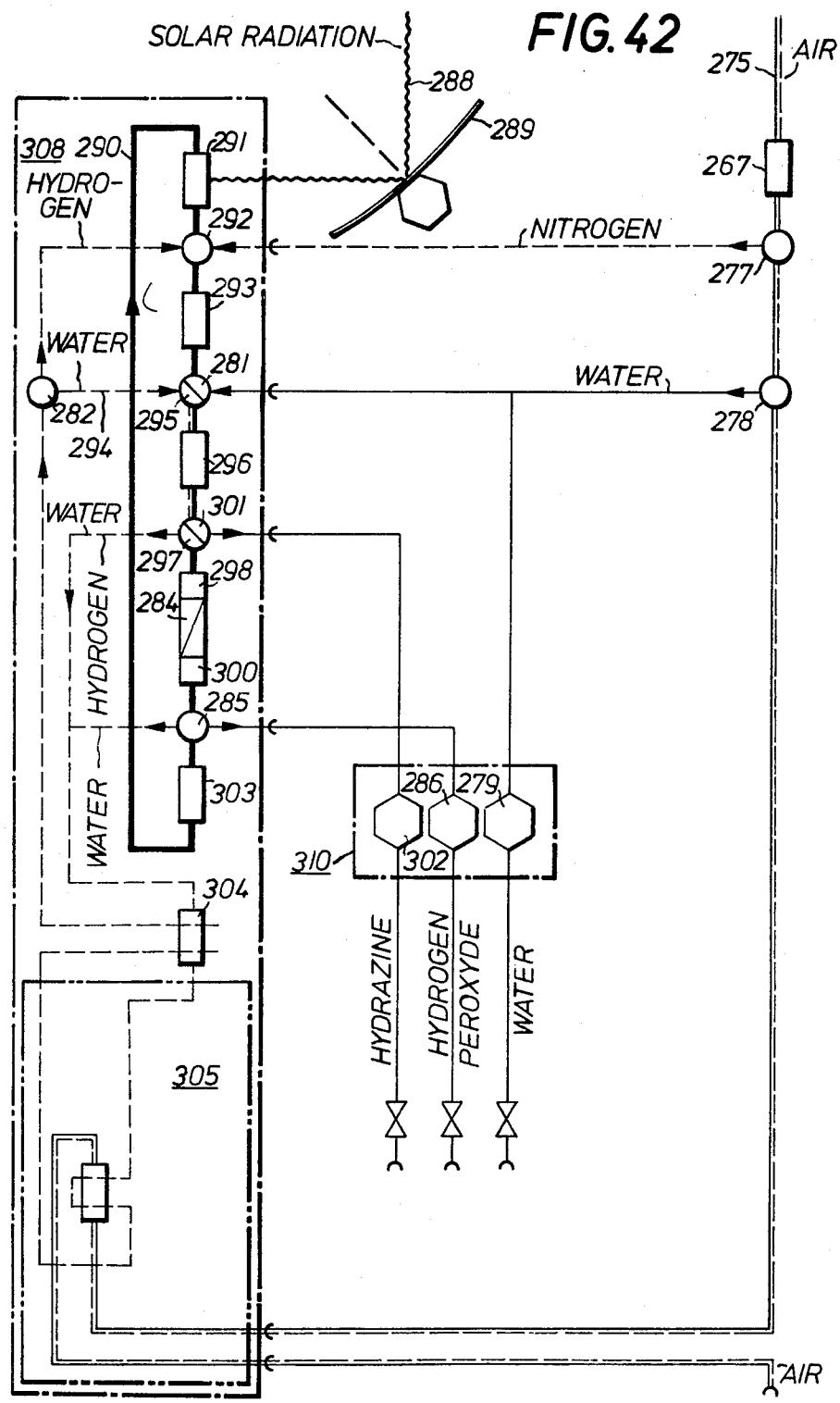

FIG. 42 is a flow chart and system diagram, similar to FIG. 8 but combining hydrazone and peroxide synthesis in a single fluid flow system.

DETAILED DESCRIPTION OF THE PREFERRED EMBODIMENT

The preferred example of the exergy transformer system is based on utilization of solar energy; the solar exergy is released by nuclear reactions on the sun, and stored in the form of free enthalpy of two metastable liquid compounds $(NH_2)_2$ and $(OH)_2$, bearing in mind that $(OH)_2$ is generated only as a by-product of the generation of $H_2$ which is needed for the $(NH_2)_2$ synthesis.

Both, the process of exergy transformation as well as the design of the transformer system are determined by the physical quantities at the entrance or input and the exit or output of the transformer. Quantities at the entrance are the specific exergy of solar radiation spectrally distributed as well as the flux density of radition; quantities at exit are the specific free enthalpies of the two compounds synthesized in the transformer and the ratio of both mass flows, respectively of exergy stored. The transformer yields additionally electrical energy over and above the energy needed to maintain operation of the transformer system.

The specific process envisioned here particularly as far as the hydrazine synthesis is concerned, is to be seen in that hydrazine is formed by an electrolytic process specifically by forming $(NH_2)_2$ out of $LiNH_2$. The energy needed to sustain that process is taken ultimately from the sun. The solar energy is used to obtain the production of that electrical energy needed to sustain the electrolysis using lithium as or as part of a circulating fluid system. The electrolysis will be produced within an MHD conversion process in which kinetic energy of a fluid is converted into electrical energy, including the energy to obtain the electrolysis.

The kinetic energy is the result of a two-phase process in which solar exergy absorbed by a liquid phase is transferred to an isothermally expanding gas as it accelerates the liquid phase, and the electrolysis is carried out in that liquid phase, while the movement of the liquid phase is used to generate the magnetic field causing the electric field in the liquid phase to sustain electrolysis therein. Liquid and gaseous phases complete separate but temporarily linked circulations, whereby the liquid phase absorbs the solar energy, heats the expanding gaseous phase while being accelerated by it, serves as carrier for the electrolysis and returns. The gaseous phase of the two-phase flow is alternated between low temperature compression and high temperature expansion with recuperative heat exchange inbetween.

Turning now to details of certain aspects of this basic process, the specific exergy of radiation depends on its wave length; it is continuously distributed over the spectrum between the limits of about $\lambda = 0.8 \cdot 10^{-6}$ m in the infrared and of about $\lambda = 0.3 \cdot 10^{-6}$ m in the ultraviolet. The specific exergy $e_s$ of radiation, therefore, covers the range of $$150 < e_s < 400 \text{ kWs/mol}$$

if related to the unit mol of particle quantities. This quantity is calculated from the equation $$e_s = N_A \cdot hc/\lambda$$

with $N_A = 6.02 \cdot 10^{23}$ 1/mol (Avogadro's constant), $h = 6.63 \cdot 10^{-34}$ Ws$^2$ (Planck's constant), $c = 3 \cdot 10^8$ m/s (speed of light). The fluxdensity $\dot{q}_s$ of radiation is defined to be the exergy, which passes through a surface unit, in normal direction within unit time, and is approximately, without taking into consideration any additional absorption in the atmosphere;

$$\dot{q}_s = 1.4 \text{ kW/m}^2$$

The process of synthesizing $(NH_2)_2$ and $(OH)_2$ can be explained, in principle, as being subdivided into the following step:

Synthesis 1 [$(NH_2)_2$ from $H_2O$ and $N_2$]

1.1: "Formation of $H_2$ and $O_2$ from $H_2O$"
  $2 H_2O \longrightarrow 2 H_2 + O_2$ 1.2: "Addition of $N_2$ to $H_2$ to obtain amide"
  $2 H_2 + N_2 \longrightarrow 2 (NH_2)$ 1.3: "Combination of two amides to di-amide"
  $NH_2 + NH_2 \longrightarrow (NH_2)_2$ altogether:

$2 H_2O + N_2 \longrightarrow O_2 + (NH_2)_2$ 

Synthesis 2 [$(OH)_2$ from $H_2O$]

2.1: "Formation of $H_2$ and $O_2$ from $H_2O$"
  $2 H_2O \longrightarrow 2 H_2 + O_2$ 2.2: "Addition of $O_2$ to $H_2$ to obtain peroxide"
  $H_2 + O_2 \longrightarrow (OH)_2$ altogether:

$2 H_2O \longrightarrow H_2 + (OH)_2$ 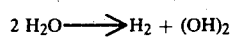

The steps 1.1 and 2.1 are similar and $O_2$ appears to be a rest product of synthesis 1 (though not to be produced directly), while $H_2$ is a rest product of synthesis 2, which both can be combined according to step 2.2 to hydrogen-peroxide. The two synthesis can be coupled in an overall exergy transformer system performing the following steps:

Synthesis 1 + 2 coupled:

(1) $4 H_2O \longrightarrow 4 H_2 + 2 O_2$ "$H_2$" 

(2) $2 H_2 + 2 O_2 \longrightarrow 2 (OH)_2$ "peroxide" 

(3) $2 H_2 + N_2 \longrightarrow 2 (NH_2)$ "amide" 

(4) $NH_2 + NH_2 \longrightarrow (NH_2)_2$ "di-amide" 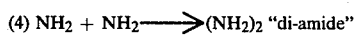

altogether:
  $4 H_2O + N_2 \longrightarrow 2 (OH)_2 + (NH_2)_2$ 

Herein, steps (1) and (2) are only listed separately, in reality free oxygen is not produced. The FIGS. 2 and 3 present the change of free enthalpy g of formation of $(NH_2)_2$ and $H_2 + (OH)_2$. Generally speaking, if the difference in enthalpie after and before the reaction is positive, the step is endergonic, because the reaction can take place only by supply of exergy; exergy can be stored by this reaction, if the reaction can be reversed. If the enthalpie difference is negative, however, the step is exergonic, due to the release of exergy, and reaction takes place spontaneously.

A brief estimate will clarify the principles of operation of the exergy transformation: the formation of $H_2$ according to step 1 of the coupled processes 1+2 needs the supply of specific exergy of at least 56.5 kcal/mol = 235 kWs/mol; the formation of hydrazine requires at least a specific exergy of 630 kWs/mol. If the exergy of solar radiation were used directly for a photosynthesis of these compounds, only the ultraviolet radiation could be employed, while the remainder of solar spectrum could not be used; in addition, the different reactions needed in that case will be multiquanta processes.

The exergy conversion and transformation system as per this invention absorbs actually the total exergy of solar radiation it receives and transfers it as heat to an inert gas ($N_2$). This gas is the thermo-fluid-dynamic working fluid, or tfd for short, of the MHD process and synthesis and is used thermodynamically to drive a liquid phase whose resulting kinetic energy can be used in an MHD conversion process and which can sustain an electrolytic process due to interaction with the magnetic field it generates.

In order to capture sufficient exergy by absorption, it is deemed necessary to increase the flux-density of solar radiation by a factor of about 1000, cooperating directly with an exergy absorbing surface at the entrance of the exergy transformer for the transfer of heat into the transformer. Therefore, the input portion of the exergy transformer will include a focussing reflector, described by way of example with reference to FIGS. 40 and 41, see also FIG. 8.

I now proceed to describe certains aspects of the thermodynamics involved here. The tfd-working fluid of the exergy transformer expands isothermally to accelerate the liquid phase and imparts upon it the expansion work as kinetic energy; by this the tfd working fluid performs work to overcome internal forces, and ultimately that work is used in the electrolytic process, conceivably even for both electrolytic processes. Conversely the radiation as absorbed by the liquid phase itself, prior to that acceleration will replenish continuously the enthalpy of the gas that was converted into work in the transformer. As a result, the enthalpy available (i.e. exergy of enthalpy) will not change during the expansion and will be constant even at the end of expansion. This enthalpic exergy must be withdrawn from the gas (tfd fluid), which has expanded, before the gas will be recompressed for circulation within the transformer system, and transferred to the gas which is recompressed already. Therefore, this exergy transfer will be performed by a recuperative heat exchange between the decompressed gas and entering the heat exchanger at the lower pressure $p = p_{low}$, but at the upper temperature $T = T_{upper}$ of process, and the gas that has already been compressed again, and entering the heat exchanger (again) now at the higher upper pressure $p = p_{upper}$, but at the lower temperature $T = T_{low}$.

The process of the thermo-fluid-dynamic working fluid is determined by these two conditions for isenthalpic expansion as well as for the introduction of recuperative heat exchange. FIG. 4 shows the exergy flux diagram of this process. The specific work of expansion, $a_{exp}$, performed by the tfd gas with a mass flow rate $\dot{m}_{tfd}$, must be balance by the heat flux supplied $\dot{Q}_{in}$:

$$\dot{Q}_{in} = -\dot{m}_{tfd} \cdot a_{exp} \tag{1}$$

The specific work is given by:

$$-a_{exp} = R\, T_{upper} \cdot \ln \overline{\pi} \tag{2}$$

$\overline{\pi} = p_{upper}/p_{low}$ (pressure ratio of process), $R = 8.3$ Ws/mol K (gas constant of $N_2$).

$\pi = p_{upper}/p_{low}$ (pressure ratio of process), $R = 8.3$ Ws/mol K (gas constant of $N_2$).
The specific work of compression is given by:

$$a_{comp} = R\, T_{low} \cdot \ln \overline{\pi} \tag{3}$$

Compression should, therefore, take place at as low temperature $T_{low} < T_{upper}$ as possible, in order to limit the work to be supplied, for the difference of expansion- and compression work is the net useful work provided by the process:

$$-a_{net} = -(a_{exp} - a_{comp}) \tag{4}$$

$$= R\, (T_{upper} - T_{low}) \ln \overline{\pi}$$

The requirement of recuperative heat exchange results in a limiting condition for the maximum of pressure ratio, because the available energy of gas which has to be transferred within the heat exchanger, cannot exceed the net work of process:

$$c''_p (T_{upper} - T_{low}) \geq R\, (T_{upper} - T_{low}) \ln \overline{\pi} \tag{5}$$

$$\ln \overline{\pi}_{max} = c''_p/R = \kappa/\kappa - 1 = 3.5 \tag{6}$$

$c_p'' = 39.1$ Ws/mol K (specific heat at constant pressure of $N_2$), $\kappa = 1.4$ (adiabatic exponent of $N_2$)
As a result, the maximum pressure ratio $\pi_{max}$ is:

$$\overline{\pi}_{max} = e^{\frac{\kappa}{\kappa - 1}} = 33 \tag{7}$$

The efficiency $\eta_{th}$ of this process is given by the Carnot-factor $\eta_C$ (if internal and external exergy losses are not considered), the latter depending on the temperature ratio $T_{low}/T_{upper}$ exclusively:

$$\eta_{th} = -\frac{\dot{m}_{tfd} \cdot a_{net}}{\dot{Q}_{in}} = \left(1 - \frac{T_{low}}{T_{upper}}\right) \tag{8}$$

$$= \eta_C \tag{9}$$

To give an example: for $T_{upper} = 750$ K and for $T_{low} = 250$ K is according to equation (8) $\eta_{th} = \eta_C = 0.666$. The maximum specific net work is in this case according to (4) about 14 kWs/mol and is, therefore, lower by a factor of about 50 than that required for the different steps of synthesis. The net work of the thermo-fluid-dynamic working fluid will be converted ultimately into electrical energy, which is obtained by the introduction of a second working fluid, namely the liquid phase being accelerated by the expansion of the tfd gas and serving also as a fluid dynamic medium (mfd #1) that performs mechanical work in that an MHD conversion process converts the kinetic energy of that mfd #1 fluid into the electrical energy needed for the electrosynthesis. Moreover, the substance to be electrolytically decomposed must become a part of the liquidous phase of the MHD working fluid, as will be discussed shortly.

The hydrazine (and peroxide) electrolysis requires a voltage of a few volts. Details of this MHD conversion process and the generation of the necessary electrical energy will also be described below. Presently it should be discussed what energy is actually needed for the electrolytic synthesis of hydrazine and peroxide and what electrochemical reactions are involved.

The specific work expended on an electric charge, after having traversed a voltage difference of n-volts is:

$$a_{elect} = n \cdot e \cdot v = n \cdot 1.6 \cdot 10^{-19} Ws \tag{10}$$

or, if one uses mols to define particle quantities, that value $a_{el}$ is given by $n \cdot N_A \cdot e \cdot v = 100$ kWs/mol. The work a is the one needed to obtain the electrolytic process; n is the voltage that will in fact produce that work. The MHD process is designed to furnish that value n; it is but a few volts.

The electrosynthesis of $(NH)_2$ and $(OH)_2$ by means of the above mentioned four steps depends on the fact that there is a similarity in structure in these two components, namely two groups or radicals are interconnected, OH and $NH_2$ respectively. Moreover, the groups are chemically rather similar. In order to develop the desired reactions and the means of obtaining them, the follow step by step analysis is helpful.

The OH groups and the $NH_2$ groups both can be generated as negatively charged ions in that specifically $H_2O$ as well as $NH_3$ molecules can appear as hydrogen donors as well as hydrogen acceptors in accordance with the following two reactions, occurring of course in different carriers for solutions.

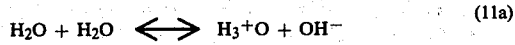
$$H_2O + H_2O \longleftrightarrow H_3^+O + OH^- \qquad (11a)$$

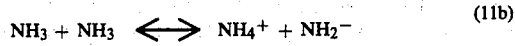
$$NH_3 + NH_3 \longleftrightarrow NH_4^+ + NH_2^- \qquad (11b)$$

Since the hydrogen transfer in both reactions is strongly endergonic, they are quite improbable. On the other hand, if a one-valued metal is present, e.g. K or Li these reactions become exergonic and appear spontaneous (with a probability of almost unity).

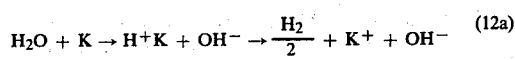
$$H_2O + K \rightarrow H^+K + OH^- \rightarrow \frac{H_2}{2} + K^+ + OH^- \qquad (12a)$$

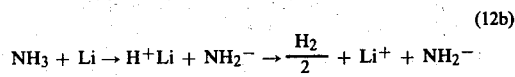
$$\qquad (12b)$$
$$NH_3 + Li \rightarrow H^+Li + NH_2^- \rightarrow \frac{H_2}{2} + Li^+ + NH_2^-$$

In both cases, an electron transfers from the negative ion to the positive ions i.e. from $OH^-$ to $K^+$ and from $NH_2^-$ to $Li^+$; respective two groups will in fact combine into hydrogen peroxide (di-hydroxide) and hydrazine (di-amid) resp. This is possible because the $OH^-$ groups as well as the $NH_2^-$ groups have a completed electron shell of eight electrons. It is, therefore, merely necessary to provide for an electric field by means of which this electron transfer can in fact be enforced.

It can thus be seen that only the combination of two neutral OH and NH$_2$ groups leads again to a complete electron shell in either case due to a co-valent combination by means of an electron pair that is common to both groups in a molecule.

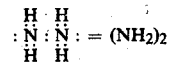

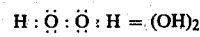

Both compounds are metastabil, thus exhibiting the tendency of giving off H-atoms to revert to double compounds

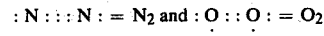

Since $H_2O$ is a raw material for the storage of exergy in the exergy transformer, the first two steps of the synthesis require the electrolysis of $H_2O$ but without the usual decay of $(OH)_2$ by means of catalytic effect of impurities

$$(OH)_2 \rightarrow H_2O + O_2/2 \qquad (13)$$

Both steps furnish the $H_2$ for the hydrazine synthesis (step 3+4 in the above mentioned combined method).

Very significantly, the exergy transformer as per this invention avoids the step of using $NH_3$ as per relation 12b because $LiNH_2$ is used as an intermediate product which on the one hand can be decomposed electrolytically and, on the other hand it can be synthesized directly from the elements Li, $N_2$ and $H_2$ as the reaction is exergonic. This is significant, as Li is used as mfd #1 fluid, and $LiNH_2$ can readily become a part thereof. FIG. 5 shows the step 1 to generate catalytically Li-amid as an intermediate product. The exergy which is generated by the reaction if carried out at 300 K is quite high and that reaction cannot really be used successfully for and as the last step in an electrosynthesis running at such a low temperature. However, as shown in FIG. 6, the free enthalpie approaches zero for high temperatures at about 900° Kelvin. Thus, the electrosynthesis of Li-amid should be carried out at these temperatures. The solar energy capturing process, therefore, should heat the components for that process to that temperature which in turn becomes the upper temperature for the isenthalpic production of the necessary kinetic energy for the MHD process.

FIG. 7 shows a diagram for the entire process as far as the energy consumption is concerned. The solar conversion and MHD conversion process run on solar energy produces a certain amount of electrical energy. About 75% of that electrical exergy is stored by means of the electrosynthesis of $(OH)_2$ and $H_2$, the remainder of the electrical exergy (25%) are used for the electrolysis in which $(NH_2)_2$ is made out of Li-amid.

The solar exergy transformer system depicted in FIG. 8 has the following primary objectives:

1. Solar exergy is to be absorbed covering a continuous spectrum as wide as possible and amplifying the radiation flux density by a factor of, say, 1000.

2. Electrical energy is to be produced at two descrete voltages, each in the order of a few volts, which actually increases the specific exergy of the radiation received.

3. $H_2O$ and $N_2$ is to be separated from air, essentially the cooling air, for use as primary raw material for the exergy storage on a material exergy carrier.

4. $(OH)_2$ is to be synthesized electrically for both, storage of exergy and producing $H_2$ as a raw material for the hydrazine synthesis.

5. Electrosynthesis of $(NH_2)_2$ as solar exergy storing fuel, preceded by the formation of Li-amid, using $N_2$ and $H_2$ as per process steps 3 and 4 and using Li as an intermediary circulating carrier.

The flow diagram of FIG. 8 depicts and explains these functions of the exergy transformer and as a complete system. However, the main portion is contained in block 208 and provides for the synthesis of hydrazine as principle output with solar energy serving as input. Block 209 depicts the formation of hydrogen peroxide as the preferred but not exclusively usable oxidizer for hydrazine. Moreover, auxiliary fluids are needed for and consumed in the process of forming hydrazine, namely nitrogen and hydrogen which can be produced as by-products in the formation of hydrogen peroxide. Accordingly, block 209 depicts the auxiliary process for providing for these additional materials, and the entire process needs only air as material input (without the oxygen).

The block 208 contains basically three circulations, a first circulation for a thermo fluid-dynamic work fluid or tfd fluid established basically by nitrogen. The second circulation is provided by the magneto fluid-dynamic work fluid or mfd fluid #1 which is established by lithium, mixed with $LiNH_2$ and always mixed with finely dispersed electrically conductive substances such as iron. The third circulation can be provided by a second mfd fluid, i.e., mfd fluid #2 which is a solution of Li and $NH_3$. Mfd fluid #2 provides primarily for cooling and can be replaced. Details of block 208 will be described shortly.

Reference numeral 210 may denote intermediate storage of products wherein 202 refers specifically to storage for hydrazine made as per process block 208. 188 denotes the storage for hydrogen peroxide made in block 209. Block 179 denotes water storage.

I now turn to the production of the raw products needed in the hydrazine synthesis, namely $H_2$ and $N_2$. Block 209 denotes this process. It is assumed that the only "true" raw material to be used is air 175. The air is sucked into the process at 176, whereby excess electrical energy generated at 199 pursuant to the hydrazine synthesis can be used to run the blower.

Nitrogen is separated from air at 177 by known process (such as the Ericson process) and passes to a nitrogen injection at 192 for the Li-amid generation. Moisture is separated from the air at 178 by precipitation and injected at 181 in a flow of a mfd fluid #3 circulating along a path 180 for an $H_2$ producing electrolytic process. Excess water as separated may be stored and/or discharged at 179.

Hydrogen is separated from circulation 180 at 182 i.e. it sucked out of the system for injection at a point 192 into the flow of mfd fluid #1 of the hydrazine synthesis process 208.

An MHD conversion process with hydrogen peroxide synthesis takes place at 184 whereby electrical energy for the electrolytic process is furnished by the solar MHD conversion system 208 via line 206. The process 184 therefore, runs as MHD motor under electrolytic generation of $H_2$ and $(OH)_2$. The peroxide is extracted from the circulation at 185 by evaporation (using e.g. excess heat from unit 208) and after condensation of the $(OH)_2$ will pass for storage to 186.

FIG. 8 is actually drawn for illustrating functional separation; the physical $H_2$ separation i.e. the outflow of hydrogen as a gas from the mfd #3 fluid occurs right in and from the converter 184, so that 182 should actually be superimposed upon 184. The situation is different, however, as to $(OH)_2$. This peroxide is flushed out of the converter 184 and rapid physical separation from the $H_2$ is essential, because otherwise $(OH)_2$ will separate again into $H_2O$ and $O_2$. The $(OH)_2$ separation from the mfd #3 liquid at point 185 is carried out by evaporation.

The mfd fluid #3 with hydrogen passes through a prime mover 187 for sustaining the circulation (that may be a MHD pump) to complete the circulation.

The fluid circulating through path 180 is a watery solution of potassium hydroxide. The MHD motor 184 sets up a circular electric field in that solution. Specifically, the coil system in the converter 184 is excited by electrical energy extracted from the hydrazine generator and solar energy converter 208. The watery solution of KOH with finely dispersed iron interacts with the field generated with a slip $S > 0$ as between phase and liquid velocity to originate toroidal current which are ultimately instrumental in the generation of the electrolysis. The Reynolds number (see definition below) is low due to the low electrical conductivity of $H_2O$ and the interaction is rather weak.

The negative OH ions and positive potassium ions sustain the current flow through the mfd liquid as a result of the electric field set up in $KOH + H_2O$ liquid as pumped through unit 184. Electron transfer results in the generation of electrically neutral potassium as well as in the formation of $(OH)_2$. The metallic potassium combines with the water to form (i.e. to restore) KOH with the result of formation of $H_2$.

It should be noted, that the finely divided iron particles serve as principle electron conductors within the circular electric field set up in the liquidous mfd #3, so that throughout current conduction is carried out predominantly by electron flow within the iron particles and through ion flow inbetween the particles bearing in mind that the external energization is an alternating field and the passing solution of KOH, water and $(OH)_2$ will not undergo electron exchange with the electrodes so that $(OH)_2$ will not separate again into $H_2$ and $O_2$.

The primary function of the exergy transformer 208 is to convert specific exergy of the thermo fluid dynamic working medium (tfd) into electrical energy under utilization of the liquidous magneto-fluid-dynamic work medium (mfd #1) which is basically a liquidous metal and which includes finely divided iron so as to assume a certain electric conductivity and ferromagnetic characteristics. This second medium when moved in an external magnetic field interacts therewith electromagnetically by means of the so called Lorentz-force. These two media can additionally interact fluid mechanically by operation of their viscosity, for one fluid drags the other. Together they constitute the two phase MHD-work fluid wherein the tfd fluid is the gaseous phase and the mfd #1 fluid is the non-gaseous (predominantly liquidous) phase.

An MHD process operates as follows: the tfd work fluid (gas) performs work when expanding, that work is not expended against external forces but on the mfd #1 work medium. Rather than moving turbine blades, pistons or the like, work is expended on the basis of local imbalances, and specifically for the case of viscous interaction work is performed by one medium on the other by operation of speed differentials and by the tendency to equalize such speed differentials as between the two media. The mfd work fluid works against external forces, but not mechanical ones with varying system boundaries; rather the accelerated mfd #1 liquid works against a retarding, outer magnetic field (across rigid mechanical boundaries) which field in turn results from the movement of the electrically conductive liquid adjacent energizing coils.

There is a certain lack in consistency in the known MHD processes, namely that the compressing work performed on the tfd gas is carried out by means of compressors having mechanically movable parts and system boundaries. The novel process avoids this approach.

Proceeding now to details of the hydrazine synthesis as outlined in FIG. 8, solar radiation 188 is collected by a reflector 189 and focussed for absorption and heating at 191 of the mfd fluid #1 which is lithium mixed with finely divided Fe and moves in a circulation flow path 190. The heating process 191 may be carried out via a separate circulation of sodium, the latter absorbing thermal energy more readily and heating the lithium to a temperature in excess of about 750° Kelvin. Nitrogen and hydrogen are injected into the mfd #1 fluid at 192 to obtain $LiNH_2$ in 193 by catalytic reaction, the Fe particles serving as catalyst and at a sufficiently high temperature. The functions 191, 192, and 193 are carried out in compartments A to D of FIG. 24.

The tfd working fluid (gas—$N_2$) is mixed with the mfd #1 fluid at 195. The tfd gas circulates along a separate path 194, but the mfd fluid #1 circulation as well as the tfd fluid circulation are temporarily combined at that point 195. The tfd fluid is pressurized at that point and upon mixing with the mfd fluid assumes its temperature, (compartment G in FIG. 27).

The combined fluids constitute a two phase flow, whereby the mfd fluid #1 is predominantly the liquid phase and the tfd fluid is the gaseous phase. The gaseous phase is decompressed isothermally at 196 so that a portion of its enthalpie is converted into kinetic energy which in turn is imparted upon the droplets of the liquid mfd phase. The decompressed tfd fluid is separated from the mfd #1 fluid at 197, and the mfd #1 fluid is focussed at 198. In reality, the focussing of the liquid phase is part of the separation from the gaseous phase—tfd fluid, $N_2$ (compartment J of FIG. 27). The focussed liquid continues as a free flowing liquid jet riding on a gaseous cushion and being subjected to an MHD conversion process 199. In particular, the jet passes through a self-exciting coil-capacitor system, connected electrically analogous to an asynchronous motor with capacitor load for self-excitation. The interaction of the fast moving conductive-ferromagnetic jet with coils produces a travelling magnetic field and interaction of the latter with the jet on the basis of the Maxwell equation curl $E + \dot{B} = 0$ produces an electric field so that the $LiNH_2$ in the jet is subjected to electrolysis. The iron particles serve as bipolar electrodes in the electrolytic process which sustain a current flow in the liquidous jet as a whole. Any electrical energy not consumed in the electrolysis is externally available at 206, 207, driving, for example, the MHD converter 184 in which the water electrolysis takes place as outlined above.

Following the electrolysis the mfd #1 fluid is passed through an emergency jet spoiler 200 (jet shut off) and block 201 represents the hydrazine separation from the lithium, the residual $LiNH_2$ and the iron particles. The liquid jet is captured and recompressed at 203 (diffusor action), so that it can be returned via circulation 190 to the zone of heating (191) completing the path for Li and Fe, including residual $LiNH_2$. Please note also here, that the functionally separated steps 200, 201, 203 are realized in a combined structure (compartment M—FIG. 32).

The decompressed gaseous tfd fluid was separated from the two phase flow at 197 and passes through a recuperative heat exchanger 204 in which it gives off thermal exergy to the tfd gas as leaving an isothermal compression stage 205. A recuperative heat exchanger is shown in FIG. 32, Compartment O.

The cooled tfd fluid enters 205 and is mixed with a second mfd (or mfd #2) fluid at 211, to undergo heat exchange so that the subsequent compression of the tfd fluid, box 212, is carried out under isenthalpic conditions (compartment Q in FIG. 32). The mfd #2 fluid is condensed at 213 and separated from the tfd fluid ($N_2$) at 214 from which it is returned to the recuperative heat exchanger to receive thermal energy from the tfd fluid before the latter is recompressed. The pressurized and reheated tfd fluid is now returned to point 195 for mixing with the mfd fluid. About 10% of the pressure is needed to sustain the return flow of the tfd gas to the mixing point 195.

The mfd #2 fluid following separation from the tfd fluid is returned to mixing point 211. The condensation of the mfd #2 fluid as per function box 213 is actually part of the separation of function box 214 as far as implementation is concerned (compartment R in FIG. 36). The condensation is the result of heat exchange with a fluid in function box 213 circulating along path 217. That heat exchange fluid is cooled by ambient air (box 215), whose flow is indicated by 216.

FIG. 8 demonstrates the central position of the tfd work fluid and the interaction of it with the two fluids mfd #1 and mfd #2. These interactions are limited in time and space and concern exclusively isothermic and isenthalpic processes. One is the isothermic decompression of the tfd fluid in 196 under acceleration of the mfd #1 liquid and carried out at the upper working temperature $T = T_u$, the other process is the isothermic compression in 212 at the lower working temperature, $T = T_{low}$, with mfd #2 serving as coolant, while being at least in parts caused to circulate by the decelerating tfd gas as it is being compressed.

The gaseous tfd work medium circulates through the system without receiving or expending any work via movable system boundaries. Both liquidous media, mfd #1 and mfd #2 are driven by means of dragging forces exerted by the tfd gas upon the two liquids whenever being mixed or combined therewith. The tfd gas does not have any access to any heat exchange with the environment, except through the mfd #1 and #2 fluids.

The interaction between the tfd gas and the two mfd fluids (liquids) is predominantly but not exclusively based on viscosity. Rather, a generalized thermodynamic force is effective being in the nature of a temperature difference between the tfd gas and either of the mfd liquids. This temperature differential enforces the heat flow needed respectively for isenthalpic decompression and compression.

In particular, the mfd fluids both serve additionally as heat transfer and storage media. The mfd #1 liquid stores solar energy and heats the tfd gas upon mixing and during decompression thereof. The mfd #2 fluid ensures low temperature isothermic recompression of the tfd gas. This function dominates as to mfd #2, a MHD pump keeps only the circulation going for that liquid. The mass flow is lower by about a factor of 50 as compared with mfd #1 due to evaporative cooling of that mfd #2 fluid.

As a consequence, the technical system does not only have rigid system boundary but the size of the system boundaries have no influence on the process and work performed by the tfd work medium. In either case, tfd and mfd fluids mix almost homogenially so that very large surface areas are available for the heat transfer, and the average depth of heat penetration is very very small, so that this transfer occurs almost instantaneously on contact and mixing of the fluids.

As stated above, mfd #1 is a solution of Li and $LiNH_2$, the latter being in effect an intermediate product for the synthesis of $(NH_2)_2$ from $N_2$ and $H_2$. The heat capacity and thermal conductivity of this solution (which includes some iron particles), permits full utilization of the concentration of solar flux density by means of reflector 189 up to 125 W/cm$^2$. The mfd #2 fluid is fully analogous thereto and tuned to a lower operating temperature of, in cases, $T_v = 250$ K. It is a solution of Li and $HNH_2$ having a high electric conductivity even at such low temperatures. Moreover, an $LiNH_2$ residue (from mfd 190 1) that may have been carried over by the tfd gas to the mfd 190 2 liquid, can go into solution to permit chemical regeneration, recovery and return to the mfd #1 fluid. Mg and Ca are suitable reactants to separate the $LiNH_2$ from the mfd #2 fluid.

Before describing construction and layout of the MHD system 208 in greater detail, I refer to an important feature of this system, namely the reflector which is used for focussing the solar radiation. The radiation density must be increased by about a factor of 1000. A rigid reflector may prove to be impractical and expensive. Moreover, it is advisable to provide a reflector which is in fact buyontly supported. Such a feature facilitates the orientation of the mirror including following the sun and a buyont construction may even permit the mirror with centrally disposed MHD transformation unit to be positioned at some distance from ground.

FIG. 40 shows a modular MHD system (=208), shown as an elongated tube 27. One of the units shown in detail in FIGS. 24 through 39 may be contained in or constitute module 27, or a cluster thereof will be arranged as shown in FIG. 21 and may be contained in unit 27. The front portion of each such module (compartments A to D of FIG. 24, or portion 191 of FIG. 1) is contained in the focus 127 established either by the exposed outer skins 15 of the modules or by a "black" absorber covering that skin. The modules or tube 27 is held via tube 126 for support and protection. Reference numeral 128 refers to the air gaps through which air can enter into heat exchange at the low temperature side of the modules (see compartments S through Y, FIG. 38).

The reflector is established by a reflecting foil 115 which constitutes the inner surface of the concave mirror as well as the top foil of a buoyoncy support structure. The periphery of the reflector is established by a hollow toroidal bead, hose or tube 108 with a diameter of 200 meter of the annulus and 30 m diameter of the circular cross-section of the toroid. Tube 108 is filled with hydrogen 109 for establishing the main buoyoncy. Tube 108 is strengthened on the inside by a chamber 110 filled with $H_2$ under higher pressure. Welding seam 113, between the wall of chamber 110 and tube 108 serves as anchoring points or line for the outer ends of support arms 114. A seam 112 is the boundary and connect point between mirror foil 115 and hose or bead 108.

Support arms 114 are pivotally mounted on a central support tube 117 by means of pivot joints 116. A second joint 118 of each arm is provided in about the middle thereof and is connected to a bottom foil 124 which connects also to joint 113. Arms 114 center the bead and are tensioned by cable 119.

A welding seam or connecting line 120 fastens the coil 115 to an annulus, ring or sleeve 122, a foil 121 is also fastened thereat. Annulus 122 is slidable positioned on tube 117 and can be moved up and down e.g. by means of a suitable drive and positioner for adjusting the reflector 115 in relation to the outer tube 108.

In order to compell reflector foil 115 to assume the desired contour (parabolic), foils 115, 121 and 124 together constitute a cushion and pneumatically elastic backing 123 for the reflector foil. The connections 116, 118 and 113 support this cushion 123. Relatively low pressure therein sucks the foil 115 towards the inside. Points 120, 116, 118, 113 and 112 are all fixed position points in relation to which the foils curve inwardly.

As stated, central pipe 117 holds the MHD system 27 in a holder 126. The air exit and thermodynamic low temperature of the MHD system is established through air conduction through slots 128 of central pipe 117. Pipe 117 is placed into a pipe 129 to which one can connect the several inlet and outlet ducts for the fluids needed to operate the generator, e.g. water and/or hydrogen, while hydrazine is discharged therethrough.

The connection between 117 and 129 is a releasible one, so that the mirror can be collapsed and for example replaced by a different one, in case of damage and for repair or replacement. Bolts 130 permit the release. In order to orient the reflector towards the sun, tube 129 has a bellow like section 131 interposed. Spindles 132 bias the bellows axially but to a different extent thereby causing the entire assembly to tilt.

The reflector assembly including annulus 122 will be placed in position over the pipe 129, but central pipe 117 (to which the joint 116 and lower foil 114 is fastened) is inserted into and secured to pipe 129 by means of the bolts 130. Next, tube 108 is inflated by introducing $H_2$ whereby the arms 114 are unfolded and the cushion 123 is deployed. The final contour of reflector foil 115 is established by means of adjusting ring 122.

FIG. 41 shows another version of the reflector construction which is actually preferred. Features common to both assemblies have been omitted. The difference arises from utilizing a smaller tube or hose 133 while a tensioning cushion 135 rather than the cable 119 of FIG. 40 are provided. Thus, one does not need mechanical operation of such cable.

The cushion 123 is deployed by inflating cushion 135 through injection of hydrogen 111. Since that cushion adds buyoncy, bead-hose 133 can be made smaller indeed. The tensioning cushion 135 is established on its upper side by lower foil 124 of the reflector cushion, while a tensioned foil 137 forms the lower side of cushion 135. Foil 137 is connected to tube 133 along a jointseam 136. Cushion 135 is stabilized additionally by a compartment 134, and as to central pipe 117 the connection to foils 124 and 121 is made thereat. Pivot joints 118 are still needed in arms 114; the latter run through the inside of cushion 135 and are protected by the $H_2$ therein.

After having described the reflector in which the MHD unit or units as mounted, I proceed to the description of construction details of the MHD modules. A unit 208 as per the system and method diagram of FIG. 8 is designed to be for elongated construction. Such an MHD unit should be amenable to mass production and easy to transport; light weight construction is preferred. Thus, the essential structure parts of a MHD unit constitutes similar pipes, tubes, and preshaped and punched sheets of about 3.0 mm gauge or less to be interconnected by welding.

An MHD unit has uniformly hexagonal cross-section throughout its extension (see FIGS. 22 et seq, particularly the several cross-sections). This way, they can be clustered in honeycomb fashion (FIG. 20) to permit parallel operation of many units.

Each MHD unit is, as far as construction is concerned, comprised of a supporting frame; the specific components for the MHD generator proper not being part of that frame; and an outer skin structure with as small a leakage rate as possible. If the MHD unit is not run on solar energy, nuclear fission and breeder materials must be included.

The frame is the basic support structure into which are reacted all forces that are not transmitted to the outside or act from the outside onto the unit. The support frame is set up by six parallel tubes 8 and by partitioning and stiffening sheets traversed by and secured to these tubes. A central, but sectionalized tubing 7 traverses these sheets and constitutes also a part of the support frame. The skin structure is secured to the partitions.

FIG. 12 shows a first partition 1 which is more in the nature of a subframe having a central sleeve 1x (opening 4) surrounded by six small sleeves 1y (opening 3) and held by struts 1z, while bars 1w provide for an outer hexagonal frame. This construction is provided primarily for transmission of forces. The length (transverse to the plane of the drawing) can be variable. This subframe 1 provides for maximum free cross-section of flow in axial direction.

FIGS. 13 and 14 show a transverse partition 2 with a central opening 4, peripheral openings 3, and, optional, openings 5. The openings 3 receive tubes 8 (FIG. 15) and opening 4 may receive sections of the central tubing 7. If such tubings are inserted, a partition 2 provides for a true dividing partition as to the space outside of tubing 17 and around inserted tubes 8. The edges 6 of sheet-partition 2 are flanged and the openings may be beaded to obtain stiffening and to serve as welding flange.

FIG. 15 shows by way of example a plurality of partitions 2 and central tubing 7 while being also traversed by the tubes 8. In addition, this Figure shows a small pipe or tube 9 (traversing an opening 5) serving as auxiliary fluid duct without, however, constituting a portion of the basic support frame. For this, partitions 2 are either seated on and welded to tubing 7 or partitions 2 receive and hold the light tubes 8, or both as shown in the central portion of the Figure. The Figure shows also that a partition sheet 2 when not on a tube 7 permits flow of the same medium in the central area or zone (not occupied by tube 7) as well as in the zone around the pipes 8. Reference numeral 10 denotes welding seams.

FIGS. 16 and 17 show a modification of the partitions to be used in those cases where the MHD unit is to be partitioned beyond the inner skin so that the radial dimensions of this end wall 11 are enlarged. FIG. 18 shows a plug element 12 for closing any of the openings that receive tubes 8, or the tubes themselves, are to be closed and partitioned. These plugs are also welded and their cap like configuration permits placement of sensors and/or adjustment and actuating equipment.

FIG. 19 shows by way of example placement of such plugs as well as the enveloping of the frame by a double skin. The inner skin 13 is made of sheet metal which is corrosion-proof as regards contact with the several materials e.g. lithium, particularly for the quite elevated temperatures that will occur. This inner skin is stiffened by means of welded-on corrugated sheet material 14 which transmits also any forces to the outer skin 15 seated thereon. The gap between skins 13 and 15 is denoted 20 and performs important functions to be described shortly.

The inner skin 13 is, so to speak, continued at the one ends by a partition 2 and also inwardly, wherever compartmentalization of the interior space, outside of tubes 8 is desired; the partitions are welded to the skin at flanges 6. The welding seam will be removed if the inner skin has to be removed for access to the interior thereof. The same or other skin material is welded on, following e.g. repair, replacement or the like. The caps 12 close out openings 3. The other partitions 2, not serving as true space dividers for compartmentalization need not to be welded to the skin 13.

The outer skin 15 is loosely seated on the corrugated sheathing 14, the latter being welded only to skin 13. The outer skin is axially terminated by connection to a (larger) partition or axial end wall 11. The respective welding seam 17 is also removable and restorable for access and its openings 3 are also plugged by caps 12.

The central tubing 17 can be closed e.g. by means of a cylindrical plug 18. This plug 18 carries a ball 19 at its end, serving e.g. as suspension element, for adjustment particularly when the unit is combined with others, and as storage space.

A module as such is identified by numeral 27. FIG. 20 shows a plurality of such units in honeycomb assembly. One of them is shown in cross-section next to a partition 2. One can see inner and outer skins 13, 15 as well as the corrugated stiffening 14. Specifically, each of the skins is made from three segments such as 22, 23 which are welded together. The welding flange 24 of the inner skin 13 projects into the axial gap 20. Flange 24 is intrumental in adjusting the disposition of outer skin 15 as well as for mounting control and sensor lines or heating cable 26. These lines and cable run to the several caps 12. The welding flange 25 of outer skin 15 is shown in inward extension but could project outwardly. In the case of butt welding, no such flange is needed.

The gap 20 between the two skins as well as the space 21 at one front end serve for enhancing reliability of the system. For example, space 21 may be held under low pressure which can be monitored and supervised to detect any leakage. Space 21 communicates with gap 20. In parts the gap will serve as duct for circulating a heat exchange medium, such as liguidous metal. If the unit is run on nuclear energy with fission and breeding sustained inside of the unit, gap 20 serves as thermal insulator.

As stated, the basic elements for the construction of the supporting frame are sheets, used for its transversal stabilization, and tubes. In detail, there are sheets, extended in longitudinal direction, thus forming longitudinal partitions or subframes 1 as well as sheets extended in vertical direction, thus forming vertical or transverse partitions 2; there are, in addition, the central tube 7, the tubes 8 of smaller diameter located outside of the central tube as well as the small tubes 9 of lowest diameter used for internal connecting piping.

All these elements are also used to construct the main components of the MHD-module, enclosed the various compartments F, G, H . . . S and T, U, V . . . X, Y, infra, and connected with the supporting frame and construction as described. As a rule for supporting frame, it is a rule also for the components, that only punched, deformed (shaped) and flanged sheets are used but major lathe work is not required; the aim is to permit the one-line production of MHD-modules with a very high output capacity.

The MHD-converter, however, is the one exception from this rule; for this component coils have to be wound, stator blocks to be assembled and coils must be insulated as well as inserted into the stator blocks. The MHD-converter, however, is installed as a single unit in a central tube (7) section and can thus be removed or replaced easily in case of module replacement, which might be necessary when the permissible number of operations hours was reached (due to corrosion, for example). This central, MDH converter can be reused in the same way nuclear fuel pins or the MHD-working fluid, composed from both the tfd- and mfd-working fluids, can be reused in another module.

The first step of production is the construction of the supporting frame, while the second step consists in the leak detection of the skeleton; in the third step, therefore, the various components have to be fixed and are connected with the supporting frame. It is a useful approach to assemble the modules on turntable which in turn is mounted on a carriage. Normally the module is positioned horizontally on that carriage; in the fourth step, however, when the module is jacketed by means of the inner skin, the module on the turntable should be shifted into an upright position. This upright position is needed also for the fifth step of production including leak detection of inner skin, fixing of sensors, cables and heaters. During the sixth step, when the outer skin has to be attached, the horizontal position is preferred. (This car for module assembling is not shown in any drawing).

FIGS. 21, 22 and 23 show the entrance section (in regard to the exergy) for an MHD-module with an internal nuclear power reactor as heat source. The space between any two adjacent partitions of the supporting frame of the skeleton construction, is named a compartment, and these compartments are respectively identified by A, B, C . . . . Nuclear fuel elements 28 as provided in the form of the well known fuel pins or rods are located inside of a central tube 7 of the skeleton and supported therein in the usual way by means of a grid 29. The breeding material 30 is located outside of the central tubing 7 within the compartments A, B, C and D thus forming the blanket, fixed at the partitions 2.

The coolant, which is at the same time the mfd-working fluid, passes first through the blanket 30 and will be reversed in its flow direction while entering slots 32 in the central tube 7 and flows along the fuel pins 28 thus passing through the grid 29. For radiation shielding in axial direction a neutron absorber 33 forming layers of small pebbles and preferably being flooded by the coolant, is located within a large plug 18 as well as in the central tube 7 and in the free space between the external tubes 8 in compartments E and F.

The gap 20 and the cavity 21 covering over the entire length of compartments, are filled with a protective gas of low pressure for thermal insulation. The outer skin 15 is discontinued within the compartment E and substituted by a relatively short segment 42 of the inner skin. Both of the welding seams 43 can be removed easily in order to facilitate any partial dismanteling of the module, especially for purposes of replacement of the nuclear material. The compartment E is, for this reason, subdivided in a nuclear and a non-nuclear half-compartment by the additional partition 2, serving for a distinct reliability control. Details concerning the circulation of the mfd fluid will be discussed shortly when explaining the preferred embodiment.

FIGS. 24, 25 and 26 shows the, in the alternative, input part of an MHD-module wherein energy input is provided from an external heat source, such as, in this preferred example, from the sun. The gap 20 between outer skin 15 and inner skin 13 is, therefore, used in daytime for the transmission of heat from the outer skin. Skin 15 is directly exposed to solar radiation 35 over the entire length of compartments A, B, C and D, and absorbs the radiation. The gap 20 adjacent compartments A to D is filled by a circulating heat exchange medium such as a liquidous alkali metal, e.g. sodium which is heated through direct contact with the outer skin and heats the inner skin 13, which in turn is in direct contact with the non-gaseous phase of the mfd-working fluid composed from Li, Li(NH$_2$) and Fe-particles. At nighttime, gap 20 has to provide the thermal insulation.

In the daytime, the circulation of the mfd-working fluid for purposes of heat exchange and receiving solar energy is as follows. The non-gaseous phase of the mfd-working fluid 31 returns from its magnetohydrodynamic work functions and arrives at compartment D through tubes 8a, 8c and 8e, after having traversed compartments M, L, K etc. The fluid leaves the three tubes 8a, c and e at compartment D and enters the free space between the central tube 7 and the axial, inner skin 13 in order to undergo heat exchange with an alkali metal such as sodium which circulates in gap 20 between skins 13, 15. The circulating sodium absorbs solar energy, or, more accurately is heated by the outer skin which has absorbed the solar radiation 35 adjacent to compartments D, C, B and A.

The mfd-fluid coolant then enters the central tube 7 via the slots 32, and the central tubes guide the fluid through tube 7 towards compartment G and to further components of the MHD-module located in the compartments G, H . . . . At night, the central tube 7 is the main heat reservoir of the module as far as the mfd-fluid is concerned.

As one can see from compartment D in FIG. 25, the space outside of tube 7 is closed by one of the partitions 2, and that space receives mfd fluid through the exits of tubes 8a, c, e as stated. The chamber to the right of the partition 2 separating compartments D and E is filled with sodium 16. The same is true with regard to the space or chamber around central tube 7 in compartment F, denoted 39 and being separated on both sides (i.e. from compartments E and G) by means of partitions 2. Tubes 8b, d, f transport the sodium between these chambers in compartments E and F outside of central tube 7.

The sodium enters the gap 20 of compartments A through D through slots 40 in tubes 8b, d, f in compartment E and through an annular slot 20a in skin 13 in the same compartment. The sodium advances all the way to the left of the lefthand partition 2 of compartment A to fill space 21. This way, sodium surrounds the mfd fluid in compartments A through D for transferring absorbed solar energy to that mfd fluid. It should be mentioned that chamber 39 (space around 7) is filled predominantly with pressurized N$_2$ during daytime to force the sodium in the chamber in compartments E and F into the gap 20 of compartments A to D.

During daytime operation, the righthand portion of compartment E i.e. the chamber around tube 7 and to the right of the central partition 2 of that compartment as well as to the left of the partition 2 separating compartments E and F is under vacuum (or low pressure N$_2$). The same is true always with regard to the portion of gap 20 adjacent to compartments F, G, H etc., for purposes of thermal insulation of these compartments. The purpose thereof will be described shortly.

As can be seen from FIGS. 24 and 25, a helical tube 34 loops around tube 7, traversing the space occupied in the other compartments by tubes 8 (the latter terminate adjacent the dividing line between compartments D and E). This tube 34 has small lateral openings to disperse a mixture of N$_2$ and H$_2$ into the mfd-fluid within the annular space between skin 13 and tubing 7. As stated above, this liquid is composed of Fe, Li and Li(NH$_2$). The Li(NH$_2$) content thereof has been lowered (and the Li content has been increased) by process to be described as that fluid returns to compartments A to D via tubes 8a, c, e.

The solar-heated lithium reacts with the N$_2$ and H$_2$ as supplied via tube 34 and as dispersed into the fluid to form Li(NH$_2$) under catalytic reaction, using the dispersed Fe particles as catalyst. The chemical process has been described above, presently I describe the physical set up as to how to obtain that reaction. Tube 34 actually ends in compartment A, it enters compartment E as straight tube of small dimensions and is run to that point as straight tube from compartment S, traversing all the compartments inbetween. The connection of tube 34 to external supply for $N_2$ and $H_2$ (see FIG. 8) is made at that compartment S.

At night, due to the lack of solar radiation, the gap 20 at compartments A to D has to be emptied from the liquid metal (sodium) for obtaining thermal insulation of these compartments. In this preferred example given here, flooding of the gap 20 with a liquid metal and emptying takes place automatically by making use of the ball-shaped reservoir 19. During daytime, ball 19 is also exposed to solar radiation pressurizing the protective gas 37 ($N_2$) therein. The reservoir 19 is connected by a thin pipe 38 with the reservoir 39 for the heat exchange liquid metal 36 (sodium) located at compartment F. In case the gas pressure in reservoir 19 decreases due to lack of radiation heating, the gas contracts and sucks the liquid metal 36 out of gap 20, through the slots 40 within the three tubes 8 $b$, $d$, $f$ of compartments E, F and will enter the reservoir in compartment F. Both, the three tubes 8 as well as the space 39 of compartment F are hermetically separated from the other compartments and from the corresponding parts of tube 8, respectively, by welding the partitions to the inner skin 13. Additionally, plugs 41 are inserted into the three tubes 8 $d$, $d$, $f$ in the level of the righthand partition 2, separating compartment F from compartment G. These plugs permit utilization of pipes 8$b$, $d$, $f$ to the right as conduits for other fluid (namely, high pressure $N_2$).

It should be mentioned, that upon emptying space 21 and gap 20 adjacent to compartments A to D from sodium, an insulative gas may be used as replacement. Also, some of the openings 40, either those in E or those in F may be closed by means of valves to confine the sodium to chamber 39 in compartment F.

The gap 20 surrounding compartments F, G, etc. is always used for thermal insulation, and, therefore, filled with a very low pressure protective gas; this section of gap 20 is separated from the gap 20 at compartments A through D by the additional (central) partition 2 in compartment E. The respective subcompartments around tube 7 communicate separately with these gap 20 portions respectively, to the left and to the right of compartment E. The outer skin 15 is interrupted here but there still is present a short segment 42 of the inner skin isolating the annular gap 20$a$ and 20$b$ from the two chambers of compartment E into the portions of gap 20 to the left and to the right. The welding seams thereat can be removed easily to permit partial dismanteling of the module when needed.

The FIGS. 27, 28, 29 and 30 show the compartments F through L as continuing compartments A, B . . . F. Compartments F and G, shown again in FIG. 27 and to be taken in conjunction with FIG. 28, depicts the connection, so to speak of two major components. The one major component is the solar energy absorber, mfd fluid heater and Li($NH_2$) synthesizer as established by compartments A through F and as described in the preceding paragraphs. The other major component is the two phase fluid portion of the system as continued in the MHD device. The linkage between these major components is as follows:

The partition 2 separating the space around tube 7 and of compartment F from the analogous space of compartment G, separates therewith the sodium reservoir 39 from space occupied by low pressure $N_2$ (compartment G). That $N_2$ is separated from the $N_2$ supply through tube 34 and is also separated from gas 37 of reservoir 19. In fact, the $N_2$ in chamber G is the decompressed gaseous phase of the MHD working fluid. FIG. 25 shows only the continuation of tubes 8 in compartment G; plugs 41 in pipes 8$b$, $d$, $f$ prevent flow of sodium into compartment G; the same pipes will receive high pressure $N_2$ (tfd) arriving in compartment G from chamber R. Pipes 8$a$, $c$, $e$ continue to pass mfd fluid (Li, Fe and some Li($NH_2$)) towards compartments D just traversing compartments F, G, H etc. on their return path from compartment M. Compartment G in FIG. 25 shows these pipes only, additional equipment for that compartment is shown in FIG. 27.

Central tube 7 feeds hot mfd fluid, enriched with Li($NH_2$) into the end of compartment F. Tube 7 is interrupted in compartments G and F, and particularly closed off by an axial end partition 7$a$ traversed only by three inlet pipes 44$a$ for three mixing chambers 44 being provided for mixing the tfd- and mfd-working fluids. Specifically, chambers 44 combine hot, Li($NH_2$) enriched mfd fluid from tube 7 with pressurized tfd fluid $N_2$ arriving in tubes 8$b$, 8$d$ and 8$f$ (to the right of plugs 41 in the dividing plane between compartments F and G). The mixing chambers intercept these tubes; the sodium flow in these tubes is blocked off by these plugs 41.

Each chamber 44 has two nozzles, there being six nozzles 45 accordingly; only one of the nozzles 45 is shown in FIGS. 27 and 29 for the sake of clarity; the others are disposed in corresponding positions. The nozzles 45 are provided inbetween respective adjacent tube 8; the mixing chambers intercept them as stated above.

These mixing chambers are of course respectively connected to tubes 8$b$, $d$, $f$ to receive high pressure tfd gas $N_2$. They are partitioned and the partition runs right in the plane of the section view of FIG. 28. Pressurized tfd gas ($N_2$) enters the portion of the mixing chambers to the right of that partition while hot mfd #1 liquid is to the left of that partition. Small tubes traverse the partition as well as the chamber portion to the right thereof and run the hot mfd #1 liquid right to the entrance of nozzles 45 (two per mixing chamber). The pressurized tfd gas flows directly to the nozzle entrances. The tubes 8$a$, $c$, $e$ just pass through the chambers 44 without connection as return of the mfd liquid towards compartment D.

The nozzles 45 provide for the acceleration of both of the two working fluids as they mix in the entrance of the nozzles and beyond. As outlined above, the pressurized tfd fluid (gas) is heated upon being mixed with enriched mfd fluid and expands isenthalpic in nozzles 45 thereby accelerating the mfd fluid (see equations (1) and (2), supra). The mfd liquid is broken up into droplets, being hurled towards and through compartment H, in which two working fluids are decoupled. As a consequence, the entire space of compartments G, H and I inside of skin 13, but with the exceptions of tubes 8, is filled with depressurized $N_2$. This depressurized $N_2$ follows then generally (arrow 47) a flow path along tubes 8 and on the outside of the continuation of tube 7 which contains the MHD generator in compartments J, K, L and M. The liquid phase of the mfd fluid is ejected by the nozzles 45 towards the entrance for the MHD generator in compartment J for being focussed therein to establish a free flowing jet. The kinetic energy of that jet has, of course, resulted from acceleration by the isothermally decompressing tfd fluid in nozzles 45. In the MHD generator the kinetic energy of the mfd fluid jet is converted into electrical energy causing the jet to decelerate.

As already mentioned, the MHD-converter proper is installed in a segment of central tube 7. This segment is connected to a longitudinal partition 1, being a part of the supporting skeleton so as to transmit the large forces from the free jet, due to its deceleration, to the tubes 8 of the system. The central tubing 7 is also used to separate the MHD-converter proper in regard to the tfd-working fluid 47, which flows along the central tube 7, on its outside, after expansion and upon separation from the mfd-working fluid 31.

It should be mentioned, that the magnetic focussing affects the liquid phase only (Li—Li(NH$_2$)—Fe) and is appropriately effective in front of the entrance to the MHD generator. The gaseous phase (N$_2$) upon leaving nozzles 45 experiences a sudden enlargement in cross-section and looses momentum. Sheets (not shown) in compartment N could provide for diffusor effect to slow the flow of tfd-gas. Moreover, this N$_2$ is not affected by the focussing. Hence, the N$_2$ will be separated from the liquid phase in compartments H and J by the dynamics of the process generally, and by focussing of the liquid phase in particular. The nozzles 45 direct generally the flow of fluid towards a focal point 52, but the gaseous phase separates while the liquid droplets are guided towards that focal point. For this, a separator 57 and Coanda lip 58 is disposed ahead of the MHD entrance enhancing fluid-mechanically the coagulation of the liquid droplets as well as focussing thereof; the gaseous phase flows along a different path. Specifically, liquid droplets in the two phase stream hitting separator 57 on the inside form a film on the inner surface. The six jets are in fact combined and the common film continues along the outside of Coanda lip 58 with a radial inward component for leaving the lip as a hollow jet lamina which becomes a "solid" core jet on focussing by the magnetic coils in the MHD device. The hollow core and converging film collects liquid droplets still inside while the residual gaseous phase is squeezed out.

The segment of central tube 7 housing the MHD-converter proper, is deformed conically in compartment J to establish the converter entrance. The MHD-converter includes stator blocks 48, and ring-shaped or annular coils 49 are disposed for magnetizing this stator core. Specifically, the stator blocks are of comb construction being arranged along the center axis, around that axis whereby the teeth of the combs point radially inwardly. The coils 49 are annular coils arranged in the gaps between the teeth, looping around the center axis. The coils are for example interconnected analogous to a three phase asynchronous machine, the connection pattern being repeated along the axis so that upon energization a travelling wave is produced with a flux vector dB/dt in and along the center axis, coinciding with the axis of the jet of mfd-1 fluid.

The inner diameter of the comb-coil structure increases in the axial direction jet flow and the axial spacing between comb teeth decrease in that direction. The arrangement operates at constant frequency, but the jet looses kinetic energy and widens to some extent. As stated above, the stator coils are connected to capacitors to obtain a self-exciting oscillating system tuned to the desired frequency of the travelling wave produced (e.g. 2.5 Khz). Since the machine operates as generator, electrical energy can be taken from the coils e.g. to run the H$_2$ electrolysis (see FIG. 8). Additionally, the jet functions analogous to a short circuited rotor and consumes electrical exergy in the electrolysis for splitting Li(NH$_2$) into Li and NH$_2$.

A particular coil 50 is disposed right at the entrance and is separately energized. Coil 50 energizes particularly pole-shoes 51 for magnetically focussing the the liquid phase in the focus 52 on the central axis of the module. The magnetic field at the entrance and as set up by the coil 50 and pole shoes 51 is strongly inhomogenous but of radial symmetry to cause the droplets to converge towards the center axis. The magnetic field is that of a magnetic lens and induction causes a magnetic field to be set up in the droplets forcing them in direction of decreasing field strength to obtain a compact jet. Any residual gas is forced out of the jet. It should be noted that magnetic focussing and Coanda lip mutually reinforce the focussing. Actually, either device may suffice by itself in principle.

A central, axial duct 53 is formed by the annular arrangement of stator blocks which duct is enlarged in diameter downstream; the duct is sealed hermetically and physically established by a thin walled tube 54, which should have very low electrical conductivity. Tube 54 thus separates the jet from the stator blocks 48, and coils 49 and 50.

The free space 55 between stator blocks and coils or, to put it differently, the annular space between tube 7 of the MHD generator and tube 54 is filled with a coolant, preferably N$_2$, bypassed from the tfd-working fluid after its isothermal compression; the piping necessary is not shown here. This particular coolant leaves the coil space of the MHD-converter at elevated temperature through the slots 56 and pours into the duct 53, along the inner wall of tube 54, between it and the free jet of mfd liquid. Thus, the free compact jet of the mfd-working fluid is guided and held apart from the wall of tube 54 by a residual fraction of the tfd-working fluid to serve as bearing or cushion. The free jet is not directly shown in the Figures, but can be understood to coincide with the axial center line in compartments K and L.

By operation of the movement of a free flowing conductive jet (liquidous Li, Li(NH$_2$) and, primarily the iron particles therein) through the coils 49, the coils are inductively energized. The coils are connected with capacitors as stated above and the interaction with the moving conductive jet acts as stimulus for causing the coil-capacitor system to oscillate and its resonance frequency is e.g. 2.5 Khz. As a consequence of the oscillation, and due to the three phase and periodically repeated connection and disposition of the coils 49 along the jet path a travelling magnetic wave is produced by these coils. Since there is a relative movement between jet and travelling magnetic field, i.e. there is a finite slip s, the oscillation is not attenuated but amplified. The work for this amplification is taken from the kinetic energy of the jet and the latter is retarded.

As a consequence of this magnetic field set up by the coils 49 and interacting with the mfd fluid, a circular electric field vector (looping around the central axis) is established therein, and the resulting voltage in the jet causes electrolytic decompositioning of the Li(NH$_2$), separating the lithium from NH$_2$, whereby the dispersed Fe particles serve as bipolar electrodes. The iron particles should have dimensions of about $10^{-2}$ to $10^{-4}$ cm. Nevertheless these particles readily float and move with the jet.

The electric field vector being closed around the axis of the jet is of course an oscillating one, and the iron particles serving as electrodes move within the jet. Hence, the electrolysis performed is not carried out in relation to fixed electrodes establishing surfaces of constant electro potential vis a vis a potential difference relative to the electrolyte. Rather, the electric field strength is constant along a closed field line and is not a gradient of a potential field. The oscillatory, closed loop field when sufficiently strong causes a displacement of electrons i.e. from the $NH_2^-$ ions to the $Li^+$ ions, everywhere along a field line and per se independently from the existence of these electrode—iron particles.

The Maxwell equation, curl $\vec{E}+\dot{\vec{B}}=0$, yields a voltage by integration along a closed field line, provided of course $\dot{\vec{B}} \neq 0$ which is true due to the oscillatory energization by the resonating exciter coils which produce the time variable inductance B. That voltage is not taken in relation to the electrodes, but is the effective voltage acting on an electron that finds itself on a closed loop field line.

The electrodes have a different function. They provide for electric conductivity in the mfd #1 liquid as a whole which per se is a poor conductor except for the iron particles. The chemically produced electrons (as split off the $NH_2^-$ ions) are moved as far as electron conduction and current flow is concerned, primarily through the metal of these electrode particles. Since the metal of the electrode particles dominates in the electronic conduction, a strong (instantaneous) current will flow indeed in the jet, in effect transporting electrons from $NH_2^-$ to $Li^+$ in the otherwise poorly conductive mfd #1 liquid. That current is of course an oscillating one and is representative of the electron transfer in the liquid from the $NH_2^-$ ions to the $Li^+$ ions. The oscillating nature of that electrolysis producing current does not cause alternation between electrolysis and decompositioning, because the jet flows rapidly as a liquid stream and the $NH_2$ will combine into $(NH_2)_2$ which is an exergonic reaction and occurs spontaneously. There is the possibility of re-separation of the hydrazine into $NH_2$ ions, however, hydrazine is a gas at the operating temperature (800° K.) and will tend to leave the liquidous mfd fluid. Thus, the newly formed hydrazine will separate from the liquid jet and interposes itself as a gas cushion between the jet and the tube 54. The metallic lithium that remains just enriches the lithium content of the mfd #1 fluid.

As we leave FIG. 24, a somewhat expanded Li-Li($NH_2$)—Fe liquid jet leaves along the axis. The lithium content was increased and the Li($NH_2$) content has been depleted. That jet is surrounded by a cushion formed by a mixture of $N_2$ and hydrazine (gaseous), but still flowing in the diverging tube 54. It should be noted, that the field induced in the jet is actually carried out of the MHD coil systems and decays relatively slowly thereby sustaining further electrolysis which is particularly conductive at this point to prevent recompositioning of Li and $NH_2$ in the hot fluid, bearing in mind that catalytically effective Fe particles are still present.

Outside of tube 7 decompressed $N_2$ (tfd) flows parallelly thereto, also to the right. The six tubes 8 of course transport separately returning mfd fluid and pressurized tfd fluid to the left for use as outlined above.

The FIGS. 32, 33 and 34 present the compartment M, which contains the exit of the MHD-converter combined with structure for the jet capture. At this place, a further separation takes place. The residual gaseous phase, which accompanied and cushioned the liquid jet, is at the same time (chemically inert $—N_2$) the protective gas for the hydrazine formed within the jet. The portion of tube 7 in compartment M does not contain any coils. At some point in compartment L a partition between tubes 7 and 54 confines the pressurized $N_2$ gas in the annular space between these two tubes, right at the end of the coil arrangement of the MHD generator in compartment L. That also is the end of tube 54, and tube 7 is now filled with a mixture of $N_2$ and gaseous hydrazine, still surrounding the liquidous but significantly slowed down jet.

The jet is captured in a venturi pipe, jet capture tube 62. This tube is held inside of tube 7 by means of two partitions 63, defining a chamber into which the captured liquid phase—mfd flows, through lateral pots 62a in tube 62. This particular chamber has three outlet pipes 65a, c, e respectively connected to radial connections 67a, c, e which run the liquidous phase, i.e. Li—Fe with residual Li($NH_2$) into the three pipes 8a, 8c, 8e (compartment M) which return this exhausted mfd liquid to the compartment D.

The jet capturing tube 62 is subjected to very large forces which have to be reacted into the skeleton; this will be done by the central tube 7, which supports the capturing tube 62 by the two sheets 63. The free space between the tubes 7 and 62 defines the chamber in which the liquid mfd is collected and has the same internal static pressure as the end of the capturing tube has, which is equivalent to the jet stagnation pressure. In order to approach as much as possible the theoretically maximum stagnation pressure, which results from the residual kinetic energy of the free jet when leaving the magnetic field, the capturing tube 62 is contoured by an insert to reach optimal diffusor function. Accordingly, diffusor tube 62 repressurizes the mfd fluid for its return to the heat absorption chambers of compartments A to D.

The three pipes 8a, c, e returning the pressurized mfd fluid to compartment D are provided with plugs, i.e. internal portions 41 right in the dividing plane for compartments M and N (actually establishing this division). These same three tubes or pipes, 8a, 8c, 8e, receive the mixture of hydrazine and $N_2$ from the interiolr of tube 7 as surrounding the jet, but not having entered capture tube 6. The $N_2$-hydrazine mixture is evacuated from the interior of MHD tube 7 via the suction type tubes 59 which connect to tubes 8a, c, e via tubes 66a, c, e. The slots 60 in the suction tubes can be closed by movement of (internal) pistons operated by servo-mechanism 61. The suction closing device is powered by an internal pressurized gas system and rendered operational if the non-gaseous phase in form of the free jet does not meet completely the jet capture tube 62 or fills the MHD-duct 54 to such a degree, that liquid overflow could cause mfd liquid to enter the ducts 49. This may occur, for example, during exergy transformer start up procedure.

It should be mentioned that valves are provided in the connection between tubes 8b, d, f and chambers 44, which can be closed whenever the two phase-operation is to be interrupted. This may occur in an emergency when, for example, power is not extracted (for reasons of output failure) from the liquid jet in the MHD converter so that the jet would hit with its full impact the baffle 7a. That would produce a dangerous shock. However, upon interrupting the flow of pressurized tfd gas into the chambers 44, the acceleration of the liquid phase is interrupted. Please note that this emergency equipment was termed jet spoiler 200 in the block diagram of FIG. 8. Closing of slots 60 by mechanism 61 takes also place in this case and the latter equipment is part of the jet spoiler 200.

As stated, the tubes 59 lead through the jet capturing chamber (in sealed relation) established by partitions 63 and into compartment N. Radially extending connecting tubes 66a, 66c, 66e discharge tubes 59 into pipes 8a, 8c, 8e as they extend to the right from the partititions 41 in these pipes along the M/N dividing line to run the hydrazine—$N_2$ mixture out of the MHD generator portion. The low pressure $N_2$—tfd which separated in compartments H and J from the mfd liquid and flows along the outside of tube 7 containing the MHD generator, around tubes 8 and enters compartments N, surrounding here all of the pipe and tube sections 66 and 67.

The high pressure tfd gas passes through pipes 8b, 8d, 8f and through and along the MHD generator without participation until reaching the mixing chambers 44 in compartment G as described, except that a small portion may be tapped to feed the annular space between tubes 54 and 7 in the MHD generator chambers J, K, L. The pressurizing of the decompressed tfd fluiding arriving in N so as to close the circulation of the gaseous phase of the MHD system is carried out in the compartments to the right of N.

It should be noted that the jet capturing function is actually reinforced by the tubes 59 for the hydrazine and residual tfd-working fluid suction as well as by the tubes 65 for the mfd-working fluid leaving the capturing device. The radial fluid transfer means 66, 67, which are used in mixing chambers 44 are, in principle, the same as used here to conduct the exhausted mfd and tfd fluids to the tubes 8 of the supporting frame of skeleton construction. The transfer means 66 and 67 for both fluids are arranged in two's and are designed to compensate, in addition, the jet's thrust.

The compartment N could best be described as the transition connection and isolation zone between the MHD generator (and hydrazine synthesizer), and the equipment for recuperative heat exchange and repressurization of the tfd fluid. The recuperative heat exchange is contained basically in compartment O with input/output sections in compartments N and P. The repressurization of the tfd gas—$N_2$ occurs in compartment Q.

The heat exchange in heat exchanger O occurs between the low pressure tfd gas before compression, and the same but compressed gas ($N_2$). The heat exchanger serves additionally to serve as hydrazine condenser. The heat exchange chamber 70 proper is established inside of skin 13 with a particular internal jacket 68 and between two partitions 2. These partitions run, of course, the tubes 8 through the chamber, whereby particularly, tubes 8b, 8d, 8f have a certain section plugged by plugs 41a, b while ahead and behind of the plugs, but still inside chamber 70 openings discharge the pressurized tfd gas, $N_2$, into chamber 70 and collect it again. The high pressure tfd gas arrives in pipes or tubes 8b, 8d, 8f in compartment P, enters chamber 70 and circulates therein as indicated by the helical line, while leaving chamber 70 into pipes 8b, 8d, 8f through the lefthand openings to the left of the lefthand plug 41a.

While circulating in chamber 70 the high pressure tfd gas $N_2$ undergoes heat exchange, i.e. is being heated by the low pressure tfd gas $N_2$ which has arrived in compartment N and is run through heat exchange chamber 70 by a multitude of thin tubes 69, only one being shown in FIG. 32, the multitude is denoted by dotting in FIG. 34. That low pressure tfd was separated from the liquid phase ahead of the MHD generator and flowed around tube 7 thereof until reaching the compartment N. The high pressure tfd gas $N_2$ thus flows around tubes 69 in chamber 70 to receive thermal energy from the low pressure tfd gas before the latter is compressed.

The three tubes 8a, 8c, 8e are normally used to conduct the mfd-working fluid, but not in the compartments upstream of the compartment M. A plug 41 to the left of compartment N closes these tubes; so that these tubes, 8a, c, e, can be used downstream of compartment M for other purposes, the one of which is to conduct the hydrazine and residual tfd-working fluid as already described. That residual tfd fluid served initially as cushion between the liquid jet and the tube 54 in the MHD generator. By passing through the heat exchanger section 70 in tubes 8a, c, e, both gases will also be cooled. These three tubes are, therefore, to be understood to serve as hydrazine condensers and are, therefore, covered at the inner surface with a wick-like structure 72 for sucking the hydrazine already condensed as well as for enlarging the condenser surface. The heat exchanger will be fixed on the supporting frame by welding.

The liquidous hydrazine as caught by the wick-like layer 72 is thereby prevented from following the flow of the residual $N_2$ in tubes 8a, c, e and is collected in reservoirs 78 at the righthand border of compartment P. From there it can be withdrawn via tube 79 for flowing into a collection tank (not shown). The residual tfd gas $N_2$ which also arrived in pipes 8a, c, e in compartment P is passed through connectors 77 into the central portion of compartment P in which end also the tubes 69 following heat withdrawal in chamber 70.

Compartment P is, therefore, provided for (a) hydrazine collection and withdrawal and (b) collection of the cooled low pressure tfd gas $N_2$. The additional function, namely feeding the high pressure tfd gas into the heat exchange chamber 70 from tubes 8b, d, f was described earlier.

Before continuing with the functional description and particularly the pressurization of the tfd fluid, it should be mentioned, that FIGS. 32, 33, 34 show further examples for the application of the three standard tubes 7, 8 and 9 as well as of the two standard partitions 1 and 2 within the compartments N, O, etc. Both, the recuperative heat exchanger as well as the MHD-converter are units, have been integrated into the supporting skeleton which includes tubes 8; the outer jacket 68 of the heat exchanger is made by using two vertical partitions 2 for the front sides, which are welded with a longitudinal partition 1 thus forming a hexagonal prismatic embodiment. Before inserting the six tubes 8 of the supporting skeleton in this embodiment, the numerous small diameter tubes 69 have to be fixed in the vertical partitions 2 thus completing the heat exchanger; the small diameter tubes are the standard tubes 9 normally used for internal connecting piping, and are here used to conduct the low pressure tfd-working fluid through the heat exchanger. The vertical partitions 2, and the bottom plate covering the large middle-opening of the transition are perforated by holes with beaded edges necessary to affixed the small diameter tubes 69 by welding.

In FIG. 35 the construction of module components from punched and deformed sheets is demonstrated in detail at the transfer portions 66 and 67. The same principle is used for the nozzles transfer mains 44, which are, in addition, mixing chambers for both the working fluids. The transverse sheets 73 and 74 are beaded at edges in the same manner the partitions 2 are made, and they will be welded first on those edges which touch the tubes entering and leaving the transfer mains; in a second step the sheet 75, which plays the same role the longitudinal transition 1 does on other place, will be stripped over and connected by weldings.

Continuing now with the system description, compartment P contains also the entrance to the compressor, provided as a nozzle downstream and formed by sheets 76 (shown only in one case). It should be mentioned at this point, that the low pressure tfd fluid when flowing from compartment M to compartment N is subjected to a diffusor action because of sudden enlargement in cross-section. In M, gas $N_2$ flowed around the MHD converter containing tube 7 which ends at the dividing line between compartments M and N. Some sheets, similar to 76 could be provided here to provide a more gradual transition to the larger flow area and cross-section in compartment N.

The nozzle is formed by reducing the cross-section for tfd-working fluid flow in compartment P until the entrance cross-section of the isothermal diffusor 80 of compartment Q is reached. As stated above, the residual tfd-working fluid having accompanied the hydrazine, flows via the discharge outlets 77 into the main flow of the low pressure tfd gas in compartment P. The hydrazine, already liquified, is protected from being carried further by means of the wick-like structure, and as stated, will flow into the reservoir 78 to be emptied through the tube 79.

The diffusor 80 for obtaining at least approximately isothermal compression of the tfd-working fluid $N_2$ is located in compartment Q. In order to obtain isothermal compression of the tfd gas $N_2$, it is caused to undergo heat exchange inside of and while passing through the diffusor. Before however describing that heat exchange, the completion of the circulation of the tfd gas $N_2$ (closing of the loop of the gaseous working fluid) shall be described first.

The low pressure tfd gas $N_2$ as entering nozzle 76 of the diffusor is compressed in diffusor 80 and leaves it for compartment R, inside of a continuation section of central tubing 7. Three suction tubes 88 (FIGS. 36, 37) suck the pressuized tfd gas out of that chamber and transfer pipes 89 connect these three suction tubes to the three tubes or pipes 8$b$, $d$, $f$. These tubes transport the pressurized tfd gas $N_2$ to the heat exchanger where it leaves these pipes temporarily for circulation in chamber 70 around tubes 69, and returns to tubes 8$b$, $d$, $f$ for transport to the mixing chambers 44! This then completes the circulation of the tfd fluid—gas $N_2$.

The particular portion of the tubes 8$b$, $d$, $f$ used otherwise for $N_2$ gas recirculation, are closed with a plug 41 in regard to the compartments S, T, . . . ; this section houses the valves and their servo-mechanisms, not shown here, for shutdown of recirculation. This way these particular tubes 8, reserved otherwise for gas recirculation, can be used at night as reservoir for already pressurized tfd-working fluid. Appropriate valves are installed within the transfer ducts for the gas, coupled in action with the valves of the duct for the mfd-working fluid 1, which is the central tube 7. The FIG. 28 shows bellows 91 of the valve drive mechanism. The internal pressurized gas servo system is not shown here, as this is optional equipment not needed in principle.

The tfd fluid $N_2$ while being subjected to compression in diffusor 80 is additionally chilled through intimate contact with a fluid termed in the following mfd-2. The reason for referring to this fluid as a magneto-fluid-dynamic fluid is to be seen in that it is or at least could be pumped as a coolant by means of a MHD type pump. The mfd-2 fluid is preferably $Li(NH_3)$ and enters the flow of compressing tfd-$N_2$ in diffusor 80 of compartment Q. In particular, the walls of diffusor 80 are porous in order to permit the mfd-working fluid 2 to leak from its reservoir 81 in the back and around the diffusor 80 into the flow of $N_2$, for intimate mixing therewith. Droplets of mfd #2 are actually carried along by the flow of gas, thereby causing this mfd #2 liquid to be accelerated and moved. The inner surface of the diffusor is actually enlarged by a wick-like structure 82 made from wire gauze, and the mfd-2 liquid discharges therefrom into the diffusor interior for evaporative cooling of the compressed tfd gas $N_2$ while intimately mixing therewith. This cooling of the tfd fluid establishes its low temperature so that the compression work is minimized (see equation 3—supra). This cooling process leads to the lowest temperature of the tfd fluid, but involves comparatively little heat transfer in the steady state, as the low pressure tfd fluid has lost recuperatively heat exergy to the high pressure tfd fluid in heat exchanger 0.

The mfd-2 fluid arrives at compartment Q from compartment R via tubes 8$a$, 8$d$, and 8$e$. Please note that these tubes are not used otherwise in compartments Q and R, plugs 41 in the dividing plane between compartments Q and P retain the hydrazine—$N_2$ flow in these pipes 8$a$, $d$, $e$ in compartment P (arriving there from N and O). The mfd-2 coolant will be pumped either by MHD-pumps, not shown here, or moves by capillary forces into these pipes 8$a$, $d$, $e$ and in compartment R.

It will be recalled, that the pressurized tfd gas $N_2$ is collected in the central chamber of compartment R. Actually, the compressed gas $N_2$ is subjected to strong baffle action when entering compartment R and hitting cold wall 85 so that liquidous or condensing components (including e.g. carried along $(NH_3)$) drops off and is not returned. The mfd-2 fluid arrive in the same chamber. This coolant mfd-2 precipitates on the surface of cold fingers 86 and is caught by the wick-like gauze layer 82 and seeps through ducts 87 into the space, outside of tube section 7 around tubes 8 in compartment R. From there, the mfd-2 fluid is pumped, as stated above, by means of MHD pumps or by capillary forces into tubes 8$a$, $d$, $e$ for return to compartment Q. This then completes the circulation of the mfd-2 fluid.

The primary function of the mfd-2 fluid $(Li(NH_3))$ is to provide for isothermic conditions for the compression of $N_2$ in diffusor 80—compartment Q. The mfd-2 fluid receives heat in this process which is to be removed from that fluid in a manner described shortly. Presently however, it should be described that mfd-2, i.e. the $Li(NH_3)$ performs an additional function.

The tfd-gas $N_2$ following its separation from mfd-1 fluid in compartment I and also in compartment M will carry certain portions of the mfd-1 fluid as non-gaseous component, and here particularly, $Li(NH_2)$. That component is carried along, enters even diffusor 80 and will go into solution in the dispersed mfd 2 fluid. Other substances, e.g. may have been removed from the tfd flow by baffle action in compartment R, as the pressurized tfd gas $N_2$ was being returned and any precipitation was collected and removed in the lining 82 in compartment R along the wall of tubing 7 and discharged therefrom through openings 87. All accumulated liquid is then pumped from compartment R back to compartment Q, through tubes 8a, 8c, 8e.

These particular portions of tubes 8a, 8c, 8e in compartment Q are used also to house a regeneration device 83, in which the carry over of mfd-working fluid 1 in form of $Li(NH_2)$ should be eliminated. This device 83 is made from sheets or sintered components of the elements Ca or Mg and absorbs by chemical reaction the $NH_2$-groups dissolved within the mfd #2 coolant $Li(NH_3)$. By the action of this regeneration device the Li-content of the mfd-2 liquid increases continuously.

Preferably at night, when the exergy transformer is not in operation due to lack of exergy supply, the trapping material of regenerator 83 has to be regenerated; for example, by thermal dissociation of the metalamides formed during the daytime operation, into $NH_3$ and $N_2$. In addition, the deposited lithium has to be flushed out. The regeneration device 83 is connected for this reason not only with the reservoir 81 for mfd-2 ($=Li-NH_3$) but connection is to be made also to feed the excess lithium back into the reservoir for mfd 1 fluid. For this, one can use the tube 34 which passes $N_2$ and $H_2$ into the system but is not used in the night time. Thus, tube 34 will be connected with regenerator 83 during the night to feed the Li into compartments A, B, C, D. The regeneration device 83 has to provide both, the recirculation of $NH_3$ formed in excess as well the recirculation of Li accumulated in the coolant mfd-2 liquid ($Li-NH_3$), back into the mfd-working fluid 1 as resting at night. Both components are dissolved at low temperature and will be transported in liquid phase via the line 34 into the mfd-1 reservoir; the reaction of the $NH_3$-component with Li to form Li-amide and $H_2$ takes place at higher temperature, in the morning.

This double use of line 34 does not interfere with the injection of $N_2$ and $H_2$ along the same line 34 for the synthesis of hydrazine, for these processes take place only at daytime.

FIGS. 36 and 37 show the separation-chamber and heat exchange chamber between primary and secondary coolant and contained predominantly within the compartment R; this component, again, is composed from the standard tubes and partitions.

The primary coolant is the fluid mfd-2 and the secondary coolant is provided for external heat exchange, for example, with air. The reason for this separation is to be seen in the necessity of removing spurious components of mfd 1 fluid from the tfd-gas as outlined above and the mixing of the latter with the coolant (mfd-2) necessitates provisions for the cleaning process. This particular circulation of mfd-2 fluid should be held as short as possible to prevent the mfd-1 residue from clogging the circulation ducts. This is the reason for not using mfd-2 also in direct heat exchange with ambient air (requiring large areas and zones for flow). Basically, however, the cooling process undertaken by mfd-2 is the primary one and determinative of the low point in temperature for the tfd gas $N_2$; the other coolant is merely provided as heat transport and decoupling agent due to the aforesaid additional function of the mfd-2 circulation (mfd-1 residue capture).

The recompressed tfd-working fluid $N_2$ (leaving the isothermal diffusor) is reversed in flow direction in the central tube 7 inside of compartment R and distributed into the three tubes 8b, d, f of the main frame. The chamber wall 84 is made of a section of the central tubing 7, and is welded into two vertical partitions 2, constituting therefore a part of the support frame. In addition, the coolant fluid, called mfd-2 and providing for the isothermic compression of the tfd-gas, is separated from the compressed tfd gas $N_2$ as was outlined above and pumped back through the regenerator 83. Still in addition now, the mfd-2 coolant is to be cooled itself by means of the secondary coolant, circulating through compartments R through Y.

In order to obtain immediate heat exchange between mfd-2 (primary coolant) and secondary coolant—hollow fingers 86 are inserted into the chamber defined inside tube section 7 of compartment R. These fingers extend from a bottom plate 85. Fingers 86 are also made from the thin standard tube 9, which were also used in the recuperative heat exchanger (69). The hollow fingers 86 thus penetrate the interior of the said separating chamber in compartment R and are cooled from the inside by evaporation of the secondary coolant flowing therein. The secondary coolant can also be $Li(NH_3)$ or any other suitable coolant which will evaporate on heat exchange with the mfd-2 fluid but can be condensed by heat exchange with ambient air.

It was mentioned above that all surfaces of the separation chamber are covered with a wire gauze 82 of wick-like structure; the primary coolant, when condensed at the cold fingers, leaks within the capillaries of wick to pass through the suction slots 87, and then to MHD-pumps, not shown here, which pump the now liquidous mfd-2 coolant through the regeneration device 83 into the reservoir 83.

The central tube 7, forming the separation and heat exchange chamber in compartment R, is extended into the compartment S and has a cylindrical, hollow insert 92, serving as recipient chamber for the evaporated secondary coolant. This insert 92 is closed by the bottom sheet 85, which in turn is penetrated by the hollow cooling fingers 86 communicating with the interior of insert 92. These fingers are welded onto beaded edges of holes in the bottom plate 85.

Insert 92 constitutes a structural unit and will be shifted into and welded to the central tube 7 at their respective righthand ends. The secondary liquid coolant $Li(NH_3)$ is supplied via the pipe 83 from the compartments T, U . . . and distributed to the various hollow fingers 86 for evaporation therein. As shown for one finger, but is valid for all, an inner coaxial tube 94 in each finger leads the coolant to the tip of the finger 86, where it leaves the respective tube 94 in order to wet the internal surface of the finger for evaporation. The vaporized coolant is collected in the gas chamber of insert 92 and is passed by means of three radial ducts 95 into three of the six tubes 8 in chambers S, T, etc. and running through an air cooler therein.

It should be mentioned at this point that all of the six tubes 8a through f are plugged by means of plugs 41 along the dividing line between compartments R and S. The tubes 8a, c, e hold primary cooling fluid (mfd-$2=Li(NH_3)$) to the left of these plugs, and tubes 8b, d, f pass pressurized tdf fluid —$N_2$. All tubes 8 to the right of these plugs in the dividing plane between compartments R and S are available for passage of gaseous secondary cooling fluid (evaporated $Li(NH_3)$). Only three of the tubes 8 are actually used for feeding the evaporated secondary cooling fluid into the cooler (compartments U et seq); the other three tubes 8 are used as store for liquified secondary coolant, and pipes 93 return the liquified secondary coolant to the fingers 86.

The free space 21 between insert 92 and the vertical partition 11, holding the righthand axial end of outer skin 15 communicates with the gap 20 in axial direction. Due to the fact that the outer skin 15 will not be thermally extended and contracted to the same extent the inner skin 13 will probably be, the vertical partition 11 is not directly welded to the tubes 8, but indirectly through interposed, length compensating bellows 96. The bellows, however, are placed between compartments S and U, and the righthand end of bellows are fixed to the tubes 8 at the end of compartment T by means of welding seams 99. The gap 20 (filled with protective gas at very low pressure) is continued within the bellows.

All parts, including the tubes 8 of compartments T, U ... are not covered by skin and are, therefore, exposed to ambient air. The central opening of a particular vertical partition 11 is normally used for receiving the central tube 7, but that opening is closed in compartment S by means of spherical deformed sheet 97, positioned for exposure to the surrounding coolant air flow. In this half-sphere, the ion-getter-pump 98 is installed, which has to provide the very low pressure for the gas circulating in gap 20 between the inner and outer skins 13, 15 respectively.

The heat exchanger in FIGS. 38 and 39, operating as between the secondary coolant Li(NH3) and ambient air occupies all of compartments U, V, W, X and Y, as well as the air flow outlet in compartment T. The heat exchanger is likewise made from the standard parts employed throughout and will be installed as a unit and connected to the main portion of the MHD-module by the welding 99.

The heat exchange unit is composed from the six standard tubes 8, the central tube 7 and from modified longitudinal frame parts 1. Three of the tubes 8 are used for the transfer of the gaseous secondary coolant; slots 100 permit the gas to pass through and to touch the inner surfaces of the heat exchanger for condensation. The other three tubes 8 are used as a reservoir for the liquified secondary coolant, pumped into by a MHD-pump 101. The tubes 93 take the liquidous secondary cooling from these tubes.

The longitudinal transition 1 is shown slightly modified. It is composed from the segments 102 and 103, which serve here as outer and inner skin, respectively, of heat exchanger; both these segments are deformed in a way resulting in channels 104 and 105 offering a maximum surface area to the coolant air. The segments are, for this reason, as well as for stabilization, corrugated (in the same manner as the corrugated sheet 14 for the reinforcement of inner skin 13). Both segments are joined at lips 106 by weldings. The segments will be covered before assembling on their inner surfaces with a wire gauze 107 with wick-like structure providing enlargement and also wetting of the surface.

The coolant air is supplied from the compartment Z (not shown here), which is coupled to the air duct. The air leaves the MHD-module at compartment T. The hoods 12 house the sensors for control of continuous air flow.

One condition for the exergy transformers operation is to focus solar radiation on the entrance heat exchanger of MHD-module resulting in an increase in flux density by a factor of 1000. A second condition is to supply the MHD-modules with cold air in large quantities for removal of the waste heat of MHD-process; a third condition is to separate both $N_2$ and $H_2O$ from the coolant air (in cases where no water is available at ground level) to be the ducts for exergy storage.

There are two solutions to the problem, depending upon the location of the exergy transformation: if the transformer is to be used in the arid or tropical hot zones between, say 30° and the equator, then the problem is to a lesser degree the availability of solar radiation, due to the climate, but the availability of water if the transformer is to be used in the moderated zones between say 30° and 60° latitude, then the availability of solar energy is the more dominant problem due to frequent clod covers. In either case, the solar exergy must be focussed.

After having described the equipment by means of which to use solar (or other nuclear) exergy for obtaining the synthesis of hydrazine, several of the critical aspects of the operation and of the process as a whole shall be discussed and here particularly the interaction of the fluids and of the magnetic fields as well as the overall MHD conversion process. It will be recalled from the description of FIG. 8, that the gaseous medium tfd-fluid, $N_2$ has a central position. From the description above it can readily be deduced how the gaseous phase and medium called tfd actually drives the two liquids, mfd #1 and 2. In one case (mfd #1) the liquid is accelerated out of the mixing chambers 44 by means of the nozzles 45, in the other case, the tfd gas actually causes the mfd #2 liquid to evaporate and to otherwise mingle with the gas in the diffusor 80 thereby actually driving the liquid (mfd #2) as part of and within its circulation. In both instances there is a generalized thermodynamic force as a result of a temperature difference between the tfd gas and the respective mfd liquid; in both cases there is isenthalpic pressure change, expansion in one instance, compression in the other.

The three essential properties of the interaction between tfd and mfd fluids, particularly the tfd gas and the mfd liquid are depicted in FIG. 9. There is a close analogy with the electromagnetic interaction between the magnetic field as set up by the coils 49 and the self-consist or eigen field of the mfd #1 liquid jet. These interactions are interactions via forces resulting from local non-equilibrium. These forces require certain energy which is lost otherwise. The interactions can be weak or strong which depends on the ratio of transferred exergy by operation of the interaction in relation to the total exergy content of the media (or fields). The strength of the respective interaction is adjustable by means of adjustment of some of the parameters that determine the process.

The work ability $a_{exp}$ (exergy content) of the tfd gas is transferred by means of the viscous interaction with the mfd #1 liquid in mixing chambers and nozzles (44, 45) as follows: kinetic energy as imparted upon the mfd #1 droplets: kinetic energy of the tfd; internal losses to sustain the interaction. The forces $X_i$ of the interaction result from local imbalances or non-equilibrium such as the velocity differences of the two fluids. As a consequence, a momentum I is produced by operation of thermodynamically irreversible processes. The products of forces and flux (of momenta) is the loss of exergy needed to sustain the interaction.

$$e_{eigen, viscous} = \sum_i x_i \cdot I_i = e_{ev} \qquad (14)$$

The exergetic efficiency of the viscous interaction in the two phase nozzles 45 as the sum of the respective efficiencies for either fluid results in $$\phi_{nozzle} = \frac{e'_{kin} - e''_{kin}}{x \cdot a_{exp}} = \phi'_{nozzle} + \phi''_{nozzle} \qquad (15)$$

$$= \left(1 - \frac{e_{ev}}{x \cdot a_{exp}}\right)$$

wherein the single (') refers to the mfd #1 liquid and the double ('') refers to the tfd gas.

The viscous interaction in the exergy transformer as described is adjusted to be strong (in contradistinction to known MHD process) operating with a plasma or a liquid metal-gas emulsion as MHD work fluid. Specifically, the exergy transferred from the (expanding) tfd gas to the mfd #1 liquid is so large that both media assume comparable specific kinetic energy following interaction in the nozzles 45. The decisive parameter in FIG. 9 is the relative proportion X of the tfd fluid in relation to the total mass flow.

$$X = \dot{m}_{tfd}/\dot{m}_{tfd} + m_{mfd} \qquad (16)$$

for $0.2 < X < 0.3$, i.e. to the right of the maximum of the specific kinetic energy $e''_{kin}$ of the mfd #1 fluid, one obtains the strongest interaction. For $X \to 0$ (gas-metal emulsion) as well as for $X \to 1$ (plasma process) the interaction approaches zero.

The two fluids employed here are predominantly Li and $N_2$. They interact in a temperature range between 750° K. and 850° K. One can in fact obtain a ratio of $\phi' = e'_{kin}/x \cdot a_{exp} = 0.5$ and $\phi'' = e''_{kin}/x \cdot a_{exp} = 0.3$ with a total nozzle efficiency $\phi_{nozzles} = 0.8$.

Using $e'_{kin}$ and $e''_{kin}$ separately is the logical result of a strong viscous interaction. Since the tfd gas ($N_2$) has transferred in nozzles 45 the maximum possible exergy and is "exhausted" in this respect, it would not serve any purpose to run both fluids through the MHD converter process. This is quite different from MHD processes with weak viscous interaction. It is for this reason that one separates the fluids in compartment J. This in turn permits the utilization of $e''_{kin}$ of the tfd gas for obtaining the isothermic compression in compartment Q, at low temperature. The specific kinetic energy $e'_{kin}$ of the mfd-working fluid 1 is extracted in form of electrical energy in the course of the electro-dynamic interaction in compartments K and L. FIG. 10 shows the transfer of compression work.

In analogy to the viscous non-equilibrium interaction between the tfd and mfd #1 fluids; I now proceed to the description of the electromagnetic interaction in the MHD generator.

The working fluids of the exergy transformer are separated in compartment I by means of two steps. In the first step the homogenous distribution of both fluids—as can be found within the two-phase nozzles—will be disturbed downstream of the nozzle. This has been achieved by the parallel operation of the several nozzles 45 all oriented towards an axis and to point of convergence 152, common to all nozzles. The non-gaseous phase has a much higher density and, therefore, higher inertia than the gaseous phase; it tends to maintain the initial direction concentrating itself in the neighborhood of the axis common to the nozzle system upstream of the point of convergence, while the gaseous phase expands to fill the empty space of compartments H and J around the free jet being formed. Within the area of jet formation $X \to 0$, outside of the free jet in being $X \to 1$; in both these regions the strength of viscous interaction decreases continuously.

Due to the components of velocity of the converging stream normal to its (desired) flight direction, and due to some residual weak viscous interaction a compact liquid mfd-free jet will not be formed spontaneously; the gaseous phase, at the other hand, will be expanded further as caused by the increase of cross section (compartment N) for flow towards to the suction channels.

The second step of separation results by electro-magnetic interaction. Kinetic energy of the mfd #1 working fluid is extracted and re-supplied in form of electrical energy; by this, forces are exerted on the different droplets performing work to stop motion normal to the bulk (axial) flight direction, causing them to coagulate.

The MHD-converter proper can be defined as that area of the exergy transformer, in which the electrodynamic interaction takes place in order to extract kinetic energy from the mfd-working fluid #1 and to transfer it (via the systems boundary) in form of electrical energy. The MHD-converter is composed from numerous annular coils 49, which surround the mfd-working fluid #1 flowing free, concentric to the center axis of the system. The entrance of the coil system is located near the point 53 of convergence, upstream thereof and in a region, in which the free flowing mfd-working fluid is not yet a compact jet. As stated above, the distance between the different coils 49 decreases in flow direction while their diameter increases. The coils are inserted into statorblocks 48 formed of comb like construction so that, on the one hand, the magnetic field is guided for travelling along but outside of the free jet, and on the other hand forces are transferred from the free jet to the exergy transformer coils.

The coil system is a three-phase system, in general excited with the same constant frequency f, and is coupled with a capacitor bank to be able to oscillate self-excitedly. Electro-magnetic energy is shifted periodically between the coils and the capacitors; the magnetic field generated by the coils forms in total a magnetic wave or travelling field with a phase velocity decreasing in direction of motion:

$$v_{phase} = \frac{\omega}{k} = (2\pi f) \cdot \left(\frac{\lambda}{2\pi}\right) \qquad (17)$$

$\lambda$ is proportional to the distance of coils, $\omega = 2\pi f$, $k = 2\pi/\lambda$ (wave-number).

The electro-dynamic interaction caused by this device, is essentially an interaction between two magnetic fields, which are the field $B_{extern}$ of the coils and the field $B_{eigen}$ carried along with the mfd-working fluid 1 at the velocity of fluid $v_{fluid}$. The exergy transferred during interaction is energy of the electro-magnetic field. The reason for including coils as well as the mfd #1 liquid in the interaction is to be seen in that both of them are the conductors for electric currents which in turn generate the magnetic fields. The mfd-working fluid, in addition, supplies the exergy to be transferred during interaction at the expense of its kinetic energy. The interaction is based—in the same way as does the viscous and thermal interaction—on a local non-equilibrium, given by the relative velocity ($\vec{v}_{fluid}-\vec{v}_{phase}$) between both magnetic fields. At the origin of the second field, within the mfd-working fluid #1, an electrical field $\vec{E}$ is generated (due to the transformation of the homogenous Maxwell-equations for an inertial system in motion):

$$\vec{E} = (\vec{v}_{fluid} - \vec{v}_{phase}) \times \vec{B}_{extern} \quad \times \text{ is vector product} \quad (18)$$

The electrical field exerts a force on the electrical charges within the fluid, and it is this force, which is the generalized force of interaction—not the Lorentz-force. The resulting (generalized) flux is the electric current, given by the electrical conductivity $\sigma$ of the mfd #1 working fluid; the specific current density j is (due to the fact, that the velocity vectors are parallel in this interaction):

$$\vec{j} = \sigma \vec{E} = -\sigma s \, \vec{v}_{phase} \times \vec{B}_{extern} \quad (19)$$

s is the slip defined by—$s = (v_{fluid} - v_{phase})/v_{phase}$.

The specific internal consumption for sustaining the interaction, eigenconsumption of interaction, is given by:

$$e_{eigen\ MHD} = (\vec{j} \cdot \vec{E}) = \sigma s^2 v_{phase}^2 B_{extern}^2 \quad (20)$$

Exergy for extraction is transferred during interaction by the field $\vec{B}_{eigen}$. That field $\vec{B}_{eigen}$ can be calculated from the inhomogenous Maxwell-equation with $\vec{j}$ to be the source-term. $\vec{B}_{eigen}$ is shifted in phase in regard to $\vec{B}_{extern}$ by a phase angle of $\pi/2$. This is the reason, one can calculate the amplitude $|\vec{B}_{eigen}|$ from the other amplitude $|\vec{B}_{extern}|$ without considering the total field $\vec{B}_{total}$:

$$|\vec{B}_{total}| = |\vec{B}_{extern}| + j\,|\vec{B}_{eigen}| \quad (21)$$

($j^2 = -1$) The ratio of both amplitudes is:

$$\frac{|\vec{B}_{eigen}|}{|\vec{B}_{extern}|} = s \cdot \left(\frac{\sigma \cdot \mu \cdot \mu_o \cdot v_{phase}}{k}\right) \quad (22)$$

$$= s \cdot R_m$$

with $R_m = \sigma \cdot \mu \cdot \mu_o \cdot v_{phase}/k$ being defined as magnetic Reynolds-number. $\mu_o = \pi 4 \cdot 10^{-7}$ Vs/Am, $\mu$ = relative permeability of the liquid.

The stability of interaction leads to the condition:

$$\pm s \cdot R_m \leq 1 \quad (23)$$

$\pm s \cdot R_m = 1$ is the condition for maximal strength of interaction; in this case is $|\vec{B}_{eigen}| = |\vec{B}_{extern}|$, and the energy of the field is proportional to:

$$B_{total}^2 = B_{eigen}^2 + B_{extern}^2 \quad (24)$$

$$= 2\,B_{extern}^2$$

The power factor of interaction is given for $\pm s \cdot R_m \leq 1$:

$$\cos^2\phi = \frac{B_{eigen}^2}{B_{extern}^2 + B_{eigen}^2} \quad (25)$$

The maximum value is (in this first order approximation) $\cos\phi = 1/\sqrt{2} = 0.705$.

The exergy for this interaction is used both for internal, i.e. eigenconsumption and, to a much larger extent to maintain the local non-equilibrium which means the continued generation of the field $\vec{B}_{eigen}$ from the current-density $\vec{j}$ within the mfd #1 working fluid. This second part can be calculated from the specific force exerted by the external field via the currents $\vec{j}$ upon the liquid:

$$\vec{k}_{Lorentz} = \vec{j} \times \vec{B}_{extern} \quad (26)$$

To shift the mfd #1 working fluid at the velocity $\vec{v}_{fluid}$ under the (retarding) influence of this force, the specific work $$a_{MHD} = (\vec{v}_{fluid} \oplus \vec{k}_{Lorentz}) \text{ scalar} \quad (27)$$

$$= -\sigma \cdot s \cdot v_{fluid} \cdot v_{phase} \cdot B_{extern}^2$$

has to be performed, and will be taken from the kinetic energy of the fluid. Inertia force of fluid and Lorentz-force have, therefore, to compensate each other.

The net exergy transferred during interaction is:

$$-n_{MHD} = a_{MHD}\left(1 - \frac{e_{eigen\ MHD}}{a_{MHD}}\right) \quad (28)$$

The exergetic efficiency of interaction is given by (the well known formula):

$$\phi_{MHD} = \left(1 - \frac{e_{eigen}}{a_{MHD}}\right) \quad (29)$$

$$= \left(\frac{1}{1-s}\right)$$

This electro-magnetic interaction as described thus far does not include the stabilization of the free jet—focussing of mfd #1 working fluid to obtain a compact jet, guidance and focussing when flowing within the coil system—nor does it include the electro-synthesis of hydrazine. All these different processes consume exergy for the work to be expended on and in the jet; this work must be performed also by making use of the above discussed interaction, because the jet flows freely and is not in contact with any wall! For this purpose, additional generalized forces according to equation (18) have to be generated by local variation of the slip $-s$ and of the external $B_{extern}$. The exergetic efficiency $\phi_{converter}$ of the non-idealized interaction is always lower than $\phi_{MHD}$, for this number is related to an infinitively extended undisturbed field and a constant slip.

It should be noted, that the slip $-s$ of the MHD-converter is not constant (locally) even without stabilization of jet for the following reason. If all the coils 49 were to be excited with the same frequency f, then the phase angle between voltage and current should be the same for all coils. This, however, means that $|\vec{B}_{exter-}$ $n| = |\vec{B}_{eigen}|$ and, hence, $-s \cdot R_m = 1$. Because $R_m$ is proportional to $v^2_{phase}/\omega$ and must decrease along the fluid path, the condition of a constant phase angle, $\phi = $ const. can be met only by increasing the slip in flow direction!

The focussing of flow at the entrance of MHD-converter is achieved by changing the sign of the slip s as well as by proper adjustment of field $\vec{B}_{extern}$ at the entrance section J (which can be supported by a surface separator upstream). The jet as formed thereat runs over a distance of a few wavelengths under-synchronously, not over-synchronously, exergy is supplied to the jet at that point; the distortion of the magnetic field lines at the entrance to the converter results in focussing forces $\vec{k}_{Lorentz}$ acting on the fluid particles in which a current can flow. For this purpose the first coil or the first few coils, adjacent the entrance (compartment J) are not excited together with the other coils; the phase velocity of the magnetic wave and its harmonics can, therefore, be controlled independently.

A similar method can be used for augmenting the synthesis of hydrazine; it is possible, as an example, the last part of the coil system of MHD-converter to operate in the brake-mode by reversing the phase velocity. This method also might be based on a separate excitation of that part of coil system.

After having described viscous and electromagnetic interactions, I now turn to an overview as well as details of the principles of the MHD-process within the exergy transformer and regarding MHD-converter, two-phase nozzles 45, recuperative heat exchanger (compartment O) and the diffusor 80 for recompressing the tfd gas.

It is the advantage of the free jet MHD-converter operating with a radial field, that the jet will be stabilized in the direction of axis of coil system. The currents induced are annular currents and flow anti-parallel to those in the coil for excitation. The problems resulting from the use of side bars and of finite width as known from flat channel type MHD-converter have been avoided. A real problem is posed by the condition that the external magnetic field must be closed by means of and through the jet; the flux density being necessarily very high. This is a reason for limiting the wavelength; this length should not exceed in average 0.1 m. The high velocity of the fluid has as a consequence that the MHD-converter will be operated at a frequency in the kHz-range. Due to the skin effect in Cu, the currents will penetrate no more than 0.5 mm; the coils 49 are actually made from small tubes with a thin wall, cooled inside by a coolant.

For $\lambda_{average} = 0.1$ m, $v_{phase\ average} = 250$ m/s follows $f = 2.5$ kHz. The electrical conductivity of Li is at 750 K about $\bar{\sigma} = 10^7$ $1/\Omega m$; for the Li-LiNH$_2$ solution $\sigma = 10^6$ $1/\Omega m$ is a good estimate. The magnetic Reynolds-number is:

$$\bar{R}_m = \mu \cdot \pi 4 \cdot 10^{-7} \cdot 10^6 \cdot 250 \cdot \frac{0.1}{2\pi} = 5\mu$$

wherein $\mu$ is the permeability of the mfd #1 liquid. That liquid is made to assume a permeability by adding modest quantities of iron to serve as the catalyst for the Li-NH$_2$-synthesis as well as the bipolar electrodes for the Li-NH$_2$-electrolysis. The use of iron can also solve the problem of a strong electro-magnetic interaction even within the free jet MHD-converter of the exergy transformer. The specific work $a_{MHD}$ performed during interaction (27) is related to unit volume while the specific kinetic energy of the fluid $v^2_{fluid}/2$ is related to unit massflow. Therefore, in the steady state of operation, the specific work of interaction, integrated over the volume of the free jet, must be the same as the difference in total kinetic energy of the jet and before and after the interaction:

The first basic condition for the exergy transformer is:

$$\int_{F_{in}}^{F_{ex}} \int_0^L a_{MHD} \cdot df \cdot dl = \dot{m}_{mfd}\left(\frac{v'^2_{in}}{2} - \frac{v'^2_{ex}}{2}\right) \tag{30}$$

The condition (30) can be met under the following assumptions:

1. $\cos \phi = $ const
2. $\omega = $ const
3. $|B_{extern}| = $ const
4. $-s \cdot \bar{R}_m = 1$
5. $-s << 1$ then:

$$\frac{\omega}{\mu \cdot \mu_o} B^2_{extern} = \frac{F_{in}}{F_{ex}}\left(1 + \frac{F_{in}}{F_{ex}}\right) \cdot \frac{v'^3_{in}}{2} \cdot \frac{\rho'_{mfd}}{L} \quad \text{for:} \tag{31}$$

$|B_{extern}| = 10$ kG $= 10^{-4}$ Vs/cm$^2$ $\frac{\omega}{2\pi} = 2.5$ kHz $v'_{in} = 350$ m/s $\rho'_{mfd} = 1.0$ g/cm$^3$ for Li—LiNH$_2$—Fe $F_{in}/F_{ex} = 0.2$ the only free parameter is $\mu$, which is the permeability of the liquid to which iron particles have been added. Under the stated conditions, the parameter is $\mu = 4.9$. Since iron has a permeability roughly between 100 and 1000, rather small quantities of iron particles suffice to obtain that low permeability for the liquid as a whole. Under these assumptions the power density of electromagnetic interaction within the free jet converter amounts to 2.56 kW/cm$^3$, the average magnetic Reynolds-number $\bar{R}_m \approx 25$, the average slip $-\bar{s} = 0.04$, the average slip frequency $-\bar{s} \cdot f = 100$ Hz, the average loss density (in form of heat) is about 100 W/cm$^3$ (equivalent to the power density within the blanket of a fast breeder reactor). The specific kinetic energy of working fluid at entrance is $v'_{in}{}^2/2 = 61.5$ Ws/g. A free jet with an entrance diameter of $d_{in} = 3$ cm has a fluid power of about 15 MW if increased in diameter to $d_{ex} = 6.7$ cm. Due to $-s << 1$ is $\phi_{MHD} \approx 1.0$. Under the assumption of a more realistic exergetic efficiency of MHD-converter of $\phi_{converter} = 0.75$ the net electrical power extraction is $N_{electrical} = 11.2$ MW.

The induced electrical field $\vec{E}_{average}$ is given by equation (18) and for the brake-mode with $s \geq 1$, $|\vec{E}_{average}| \leq 2.5$ V/cm, which is sufficiently high for the LiNH$_2$ electrolysis with its specific exergy consumption of about 2.2 (electron) volts. $S \geq 1$ results from phase inverted connection of the coils more downstream, but excited with and by the same frequency and preferably included in the oscillator coil-capacitor system as a whole.

The residual kinetic energy of both the tfd- as well as the mfd #1 working fluid will be needed for the recirculation of these fluids using diffusors realizing the ram-jet principle. However, about 90% of the recompression is used to bring the tfd gas back up to the operating pressure for isenthalpic expansion in the nozzles 45. The total kinetic energy of both fluids, at the end of viscous interaction (15) amounts to:

$$\dot{m} \cdot e'_{kin} + \dot{m} \cdot e''_{kin} = \dot{m}'' \cdot a_{exp} - \dot{m} \cdot e_{eigen\ viscous} \quad (32)$$

$$= (\phi'_{nozzle} + \phi''_{nozzle}) \cdot \dot{m} \cdot x \cdot a_{exp}$$

Kinetic energy will be extracted from the mfd #1 working fluid within the MHD-converter according to equation (30):

$$\dot{m} \cdot e'_{kin} \cdot \left(1 - \left(\frac{F_{in}}{F_{ex}}\right)^2\right) = \int\int a_{MHD} \cdot df \cdot dl$$

The tfd-working fluid is, of course, not affected by the processes within the converter. The residual kinetic energies are:

$$\dot{m} \cdot e'_{kin} \cdot \left(\frac{F_{in}}{F_{ex}}\right)^2 = E_{residual\ mfd} \quad (33a)$$

$$\dot{m} \cdot e''_{kin} = E_{residual\ tfd} \quad (33b)$$

The principle of ram-jet operation demands, that the residual energy of the respective working fluid covers both the theoretical compression work, the internal, eigenconsumption as well as work for recirculation within the loop. The second basic condition for the exergy transformer is:

$$\dot{m} \cdot e'_{kin} \cdot \left(\frac{F_{in}}{F_{ex}}\right)^2 = \dot{m} \cdot (a'_{comp} + e'_{eigen\ comp} + e'_{eigen\ recirc}) \quad (34a)$$
$$\dot{m} \cdot e''_{kin} = \dot{m} \cdot (a''_{comp} + e''_{eigen\ comp} + e''_{eigen\ recirc}) \quad (34b)$$

The condition (34a) for the mfd #1 working fluid (which is the basis for the project MHD-staustrahl-rohr*) with an one-component mfd-working fluid) has been met without any major difficulties. The compression work is calculated to be $a'_{comp} = (p_{upper} - p_{low})/\rho'_{mfd}$ due to the incompressible fluid. The theoretical stagnation pressure is for the assumptions made before about 28 bar, which is sufficiently high to tolerate high exergy losses by the jet capture in compartment M; the residual energy is 0.04 times the kinetic energy of the working fluid before entering the MHD-converter.
*ram jet tube The condition (34b) for the tfd-working fluid, however, is the critical one and is decisive for the realization of the exergy transformer. In the case of isothermal compression in diffusor 80 according to (2) and (3) one obtains compression work to be equal to:

$$a''_{comp} = \frac{T_{upper}}{T_{low}} \cdot a_{exp}$$

The residual kinetic energy at the termination of viscous interaction is characterized by $\phi''_{nozzle}$ following (15); one can describe the exergy necessary for eigenconsumption during compression in diffusor 80 and recirculation—including friction losses within the recuperative heat exchanger—by introducing the exergetic efficiency:

$$\phi''_{ram\ jet} = \left(\frac{\dot{m}'' \cdot (e''_{eigen\ comp} + e''_{eigen\ recirc})}{\dot{m} \cdot e''_{kin}}\right) \quad (35)$$

using (35), the condition (34b) reads:

$$\phi''_{nozzle} \cdot \phi''_{ram\ jet} \cdot \frac{T_{upper}}{T_{low}} = 1 \quad (36)$$

In case of this exergy transformer the condition (36) has to be fulfilled by controlling the strength of viscous interaction varying the ratio $x/(1-x) = m_{tfd}/m_{mfd}$ of both fluids as well as by choosing proper the ratio of densities $\rho'/\rho''$ (at beginning of expansion).

If $0.4 \geq \phi''_{nozzle} < 0.45$ (see FIG. 9) the parameter x can vary between 0.2 and 0.3. The permissible range, in which $\phi''_{ram\ jet}$ may change is for $T_{upper} = 750$ K and $T_{low} = 250$ K:

$$0.74 < \phi''_{ram\ jet} < 0.83$$

For a temperature of 300 K, the figures vary only by about 20%.

These numbers can be reached by an adequate design. Due to the following relations:

$$\dot{m} \cdot e'_{kin} = \dot{m} \cdot (1-x) \cdot \frac{v'^2_{in}}{2}$$

$$\dot{m} \cdot e''_{kin} = \dot{m} \cdot x \cdot \frac{v''^2_{ex}}{2}$$

the specific expansion work can be calculated; using $x = 0.3$; $\phi'_{nozzle} = 0.4$; $\phi''_{nozzle} = 0.43$ the expansion work is $a_{exp} = 360$ Ws/g; from this the exit velocity of the tfd-working fluid follows to be $v''_{ex} = 557$ m/s according to the specific kinetic energy $v''_{ex}^2/2 = 155$ Ws/g. After separation the tfd-working fluid approaches the velocity of sound $$v''_{ex} = c = \sqrt{\kappa \cdot R \cdot T_{upper}}.$$

In order to reduce the friction losses during recuperation according to the limits given by the second condition (34b) or (36) respectively, the velocity of the tfd-working fluid has to be decreased by adiabatic deceleration within diffusor (compartment N). The eigenconsumption of exergy for the recuperation can be approximated applying the Reynolds-analogy between the specific heat flux and the shear-tension:

$$\frac{\dot{m}'' \cdot e''_{eigen\ recirc}}{\dot{m} \cdot e''_{kin}} = \left(\frac{\sqrt{2}\ v''}{v''_{ex}}\right)^2 \cdot \left(\frac{T_{upper} - T_{low}}{\zeta \cdot \Delta T''}\right) \quad (37)$$

$v''$ is the velocity during recuperation, $\Delta T''$ is the temperature difference between hot and cold fluids, $\zeta$ is a factor describing shape of heater tubes. (37) is the second term of the right side of equation (35) for $\phi''_{ram\ jet}$; this term should not exceed 0.1. For $\zeta=0.81$, $\Delta T''=50$ K must be, therefore, $v''\cong 35$ m/s.

FIG. 11 is an temperature-entropy diagram for both the tfd-working fluid $N_2$ and the mfd #1 working fluid Li-LiNH$_2$-Fe. The tfd-working fluid is decelerated and adiabatically after separation from the mfd 4/ working fluid, before recuperation (compartment N); when leaving the recuperative heat exchanger (compartment P) it will be accelerated again. The rise in temperature caused by deceleration is used for heat exchange in compartment Q.

The pressure ratio $\pi$ can be calculated from the ratio of the expansion work utilized $a_{exp}=360$ Ws/g to the maximum possible expansion work $R \cdot T_{upper} \cdot \ln \pi_{max} = 750$ Ws/g:

$$\ln \bar{\pi} = \frac{360}{750} \cdot \ln \bar{\pi}_{max} \quad (38)$$

It is $\pi \cong 5.35$. The specific compression work is $a''_{comp}=120$ Ws/g. The tfd-working fluid entering the diffusor 80 (after loosing thermal energy in the recuperator) has to be cooled, which is achieved by evaporation of the NH$_3$ component of the mfd #2 working fluid and at high velocity in the frontal portion of diffusor 80. In this case the viscous interaction is, however, weak, due to both the low densities and low fraction of NH$_3$. It will be recalled, that the mfd #2 working fluid is basically a coolant. The process in the diffusor 80 is comparable to that within a heat pipe. The range of parameters of this process has to be selected in such a manner, that the local vapor pressure of NH$_3$ and the pressure of N$_2$ equalize only after the tfd fluid velocity has been decreased substantially. Thereafter, cooling by evaporation will be replaced by cooling on wetted surfaces.

The variation of thermodynamic states of the mfd #1 fluid results from its function to be a heat storage medium; it follows:

$$\dot{m}' \cdot c'_p \cdot \Delta T' = \dot{m}'' \cdot x a_{exp}$$

$c'_p=4$ Ws/gK (specific heat at constant pressure of Li-LiNH$_2$); $\Delta T'$ (temperature range of heat storage). Under the assumptions made before $\Delta T'=38.5$ K follows.

The total efficiency of the process in the exergy transformer should be related to the conversion of the solar radiation absorbed to the electrical energy at exit of the coil system; it is defined, using (8) and with $N_{el}$ being the net electrical energy of the MHD-converter:

$$\eta_{th} = -\frac{N_{el}}{Q_{in}} = \left(\frac{N_{el}}{\dot{m} \cdot a_{net}}\right) \cdot \left(\frac{a_{net}}{\dot{m} \cdot x \cdot a_{exp}}\right) = \phi_{process} \cdot \eta_c \quad (39)$$

If the efficiency $\phi_{MHD}$ of interaction will be supplemented by considering total eigenconsumption, and if the slip s is understood to be the local slip, then the effective efficiency $\phi_{converter}$ can be defined by using the first basic condition (30) as follows:

$$\int\int a_{MHD} \cdot \phi_{MHD} \cdot df \cdot dl = -N_{el} = \phi_{converter} \int\int a_{MHD} \cdot df \cdot dl \quad (40)$$

The total efficiency $\eta_{th}$ can be deduced directly from (32), provided the second basic condition (34a+b) is actually met:

$$\eta_{th} = \phi'_{nozzle} \cdot \phi_{converter} \cdot \left(1 - \left(\frac{F_{in}}{F_{ex}}\right)^2\right) \quad (41)$$

From the data mentioned before one finds $\eta_{th}=0.288$; from this, the exergetic efficiency of the process is determined to be $\phi_{process}=0.432$ due to $\eta_c=0.666$.

It is well known that processes in MHD-systems running both on lines of constant enthalpy and on isobares, will have a total efficiency, which is—in theory—comparable to those in nuclear power stations. MHD-systems of this kind, however, have been based on a weak viscous interaction maintained within the MHD-converter proper parallel to the electro-magnetic interaction which is, therefore, also a weak one (extraction from d.c. power at $R_m<1$). These systems can hardly be operated without movable boundaries (turbines as well as compressors).

To summarize and conclude: The substantial improvement of the present MHD-process within the exergy transformer expressed by the high total efficiency if compared to the well known MHD-processes with condensation of the tfd-working fluid and recirculation by the ram jet principle, is achieved by utilizing the residual kinetic energy of both fluids. In addition, recuperation takes place independent from the expansion in the nozzles. It is important to note, that the electro-magnetic interaction includes separation of the two working fluids, and that this interaction takes place at high velocities and with high frequencies based on a free flying jet. The increase of the magnetic Reynolds-number $R_m$ up to 25 by ferromagnetic components of the mfd-working fluid #1 helps to solve the (old) problem of adapting the thermodynamic acceleration of the tfd-working fluid to the energy extraction in the MHD-converter, which was solved in all known liquid-metal-MHD-systems only by tolerating very large losses of exergy. It should be noted at last, that the exergy transformer will be operated in a technical most feasible relatively low range of temperatures which so far as not attainable to the systems mentioned before with both a strong viscous and electromagnetic interaction.

$\eta_{th}$ according to (41) is not the total efficiency of the exergy transformer, or, in other words, is not the efficiency of the storage of solar exergy in form of free enthalpy of the chemical compounds (OH)$_2$ and (NH$_2$)$_2$. Rather, $\eta_{th}$ is a very good approximation due to the fact, that the (exergetic) efficiency of chemical reactions is quite high in general; the internal, eigenconsumption of exergy is low. It seems to be not of major importance, that this eigenconsumption of the chemical reactions is not included in $\eta_{th}$. The $(OH)_2$-synthesis was found to reach technical efficiencies up to 90%; the last step of $(NH_2)_2$-synthesis (electrolysis of Li-$NH_2$), however, needs only about 25% of the total electrical energy; even if the efficiency of this process (not known so far) is much lower, its influence on the total efficiency is softened due to the low weight. A compensation of losses seems to be possible utilizing by parts energy of the field $\vec{B}_{eigen}$ carried along with the free jet for the Li-amide-electrolysis; normally this energy is lost.

On the basis of the foregoing detailed explanation it will readily be understood that the peroxide synthesis can be carried out quite analogously and is run on a simplified basis because the coil-core-liquid system does not have to operate on the basis of thermo-fluid dynamic acceleration of the working fluid (though it could) but a pump (187—FIG. 8) is used instead. Also, the electrical energy is applied externally, namely from the MHD converter of the hydrazine and solar exergy exploiting system. The a.c. electrolysis is, therefore, used by interaction between coils and a watery solution of KOH used as circulating working fluid here, with metallic particles, preferably iron, but possibly Cu or Al being interspersed for the same reason, namely to establish conductivity in the otherwise poorly conductive electrolyte. The voltage needed here for electrolysis is also the result of the effect as expressed Maxwell (vector) equation $\vec{B}+curl\ \vec{E}=0$, and integration of E along a closed electric field line, looping around the axis of fluid flow, yields the voltage U (not a potential difference in a potential field, there is none) which is directly effective on electrons to move them from $OH^-$ to $K^+$.

In the following, it shall be described how the hydrazine and the generation of $H_2$ (needed for the hydrazine synthesis) with concurring production of $(OH_2)_2$ can be carried out by one basic fluid circulating system. For this I turn to FIG. 42. In toto, this system is more economical (fewer parts, no $H_2$ storage, no electric transmission). The system is based on the (justified) assumption that as intermediate products M-$NH_2$ and M-OH can be used with M standing for the same metal, particularly the same alkalimetal. The system, furthermore is based on the "compromise" that only one of these intermediate products is synthesized electrolytically, the other one chemically.

The box 308 in FIG. 42 depicts the flow chart of this combination synthesis. Reflector 289 is the same as before and the same is true for the accumulation and extraction facilities 302, 286, and 279. A circulation 290 in unit 308 is now a circulation of M and M-OH, M being for example Li or K. Block 291 denotes the heating of that fluid by solar energy and block 292 denotes the adding of hydrogen and nitrogen to that liquid so that functionally M-$NH_2$ is generated in block 293. This will be a catalytic reaction with iron for example serving as catalyst. Please note, that this amid-formation is not linked to the use of lithium but works with other alkali-metals as well.

Thus far the situation is very similar to the function and steps as was explained above with reference to FIG. 8. However, the liquid now continuing to circulate is M, MOH and M-$NH_2$. At point 295 and 281, water is added to the circulation. This is actually the entrance to the accelerator nozzles such as 45, supra. Thus, water is used here as the tfd fluid. The water evaporates and expands along 296 and accelerates the working liquid as before. However additionally, the water reacts with the M-$NH_2$ and forms $MOH+(NH_2)_2+H_2$. In other words, the hydrazine is the product of a chemical reaction of metal-amid and water under formation of $H_2$ and hydrazine. Additionally, the residual metal is also converted into $MOH+H_2$.

Following the acceleration, the liquid phase consists essentially of MOH and M while hydrazine and hydrogen accompany the tfd gas (namely $H_2O$) in the liquid gas separation process. Please note, that more water is added at 295 than can react with the M-$NH_2$ and the metal so that all of the M-$NH_2$ decomposes under formation of hydrazine while excess water (steam) serves as the tfd gas performing the acceleration producing work on the liquid phase.

The steam and $H_2$ are separated at 297 analogous to the gas—liquid separation as described above. The gas includes also hydrazine which is precipitated by cooling in 301 because hydrazine has a higher boiling point than water. The water—$H_2$ mixture (gaseous) is extracted as tfd fluid and subjected to recuperative heat exchange in 304 with isothermic compression (and condensation of the water) in 305 which is simplified in FIG. 42 but may well be constructed analogous to the detailed arrangement of FIG. 8. However, a mere recompression under cooling by air may suffice.

The cooled and recompressed $H_2$ and water is recirculated and heated in the recuperative heat exchanger. In view of the high pressure, the water remains in liquidous form so that the $H_2$ can readily be separated therefrom in 282 for separate injection into the liquid fluid circulation respectively at 292 and 295.

As far as the metal-hydroxide is concerned, it is subjected to mechanical and/or electromagnetic focussing at 298 (please note that iron particles are dispersed in this liquid), and in 284 the MHD conversion process takes place whereby substantially all electrical energy is consumed to obtain electrolysis M-$(OH)_2$. The $(OH)_2$ is flushed out at 285 and the tfd cushioning gas is also separated from the liquid phase at that point. Please note that the $(OH)_2$ is produced as a vapor that separates readily from the MOH—M jet and will be condensated for extraction.

The block 303 denotes jet capture and to kinetic energy-to-pressure conversion for obtaining a return flow of the mixture of metal and metal—OH to the solar heat exchange and collector 291.

The righthand portion of the drawing shows basically a flow path for air, 275, sucked into the system for cooling (heat exchange 305), separation of water 278 and extraction of nitrogen, 277. Reference numeral 276 refers to a blower which sucks the air. That blowr may have to be run by electrical energy from converter 284. That, however, is a very small load and will not interfere with the operation of the MHD generator.

It can thus be seen that the MHD conversion process is used only for $(OH)_2$ generation. As far as the hydrazine generation is concerned, the essential functions performed by the MHD process is the reconstitution of the metal so that the solar energy can generate M-$NH_2$ which subsequently reacts with water to obtain MOH and $(NH_2)_2$ as well as $H_2$ to be used in the synthesis of M-$NH_2$.

I claim:

1. A system for converting thermal energy into different forms of energy including electrical energy, comprising:

first means for providing a first circulation of a liquidous medium, the first circulation including means for heating the liquidous medium;

second means for providing a second circulation of a different gaseous medium, including means (a) for mixing it with the heated liquidous medium, thereby combining the first and second circulations; means (b) for causing the gaseous medium as mixed to expand, thereby accelerating the liquidous medium; and means (c) for separating the gaseous medium to continue separately in the second circulation;

means included in the first circulation for extracting energy from the accelerated liquid, the liquid being returned to the means for heating pursuant to said first circulation;

third means included in the second circulation to provide for recuperative heat exchange of the gaseous medium with itself, whereby the gaseous medium discharging thermal energy is taken from the means for separating, the gaseous medium receiving thermal energy being fed to the means for mixing; and a thermocompressor included in the second circulation and including a diffusion for compressing the gaseous medium having discharged thermal energy in the third means at a low constant temperature and feeding the gaseous medium following the compressing to the third means to receive therein discharged thermal energy from the gaseous medium taken from the means for separating.

2. A system as in claim 1, including diffusor means for the gaseous medium as taken from the means for separating, for pressurizing the medium to some extent, for driving it through the heat exchange; and nozzle means for accelerating the latter gaseous medium following the discharging of thermal energy but immediately preceding the compressing in the thermocompressor.

3. A system as in claim 1 and including means for providing for a third circulation of a coolant and connected to the thermocompressor to obtain heat exchange between said coolant and said gaseous medium as compressed.

4. A system as in claim 3, wherein the coolant is temporarily mixed with the gaseous medium to obtain evaporative cooling, the means for the third circulation including means for separating the gaseous medium from the coolant by condensing the latter.

5. A system as in claim 4, said thermocompressor including a diffusor with a porous wall for discharge of the coolant into flowing gaseous medium.

6. A system as in claim 4, said means for separating coolant including a layer of porous material.

7. A system as in claim 4 and including means for providing a forth circulation of a second coolant to obtain the condensation of the first coolant.

8. A system as in claim 7, wherein at least one of the coolant is a magneto fluid dynamic liquid being moved by means of an MHD pump.

9. A system as in claim 7, and including means to obtain air cooling of the second coolant.

10. A system as in claim 4, including means in the third circulation for capturing residue of the liquidous medium that was carried over by the gaseous means in spite of the separation.

11. A system as in claim 1, said means for accelerating including plural nozzles directing expanding gas flow and liquid droplets towards a common axis.

12. A system as in claim 11, including means for forming a liquidous film by capturing the accelerated droplets and means for guiding the film to converge to a compact jet.

13. A system as in claim 1, said thermocompressor including a diffusor; and baffle means for maximizing conversion of kinetic energy of the gaseous medium into pressure by the thermocompressor.

14. A system as in claim 1, said means for extracting being an MHD generator.

15. A system for converting thermal energy into different forms of energy including electrical energy, comprising:

means for providing a heated magneto-fluid-dynamical liquid and mixing it with a different, presurized gas;

a plurality of nozzles for expanding the mixed gas to obtain atomization acceleration of the resulting liquid droplets toward a common axis;

an electric coil system, having interior space on said axis for being passed through by the accelerated liquid, whereby a magnetic field is set up by the coils to obtain an electric field in the liquid;

means disposed for separating the gas from the liquid, and substantially already prior to passage of the liquid through the coil system;

means for capturing the liquid; and means disposed for closing the circulation of the liquid and of the gas, including repressurization of the expanded gas prior to mixing with the heated liquid.

16. A system as in claim 15, wherein said coil system includes a plurality of annular coils arranged concentric to and along said axis.

17. A system as in claim 16, said coils being disposed in comb like cores arranged around said axis and having radially extending prongs separating the coils.

18. A system as in claim 16, the liquid flow being contained in a tube, the coils being disposed outside of the tube.

19. A system as in claim 18, wherein said tube has slightly tapered configuration in the direction of flow of the liquid.

20. A system as in claim 15, wherein said coil system is connected to capacitors constituting therewith an electrical, oscillating system.

21. A system as in claim 19, wherein coils located downstream are connected for 180° phase shift as compared with coils located more upstream.

22. A system as in claim 15, wherein a part of the pressurized gas is directed for cooling the coil system and for hydrodynamic stabilization of the jet.

23. A system as in claim 15 and including mechanical focussing means for obtaining a narrow liquid jet through said coils.

24. A system as in claim 5 and including electromagnetic means in front of the coil system for focussing the liquid to flow in a jet along said axis.

25. A system for converting thermal energy into different forms of energy including electrical energy comprising a plurality of tubes extending parallel to each other and arranged around a central axis and extending from a first end to a second end, parallel to the axis;

partition plates connected to and traversed by said tubes to establish therewith an elongated frame;

envelope means of elongated construction, mounted on said partitioning plates and around said tubes of the plurality;

an MHD converter with accelerator nozzles, jet forming and guiding and jet capture means disposed in the radially central space along said axis and between said tubes, particular ones of said tubes provided to run pressurized gas to the nozzles along the MHD converter;

a low temperature, isothermic compressor disposed in axial alignment with said space and coaxial with said central axis for receiving gas and having an exit chamber communicating with said particular tubes to feed repressurized gas thereto; and a heat exchanger and liquid reservoir positioned adjacent to said first end, feeding hot liquid to said converter for mixture with said pressurized gas, and receiving liquid through other ones of said tubes from a chamber between the entrance to the compressor and the jet capture means.

26. A system as in claim 25, wherein first sections of a central tubing are included for containing the MHD generator, another section of the central tubing serving as the reservoir for the liquid, a third section of the central tubing containing a heat exchanger in said exit chamber, the thermocompressor being coaxial with said central tubing, the central tubing being mounted in apertures of said partitioning sheets and in coaxial relation to each other.

27. A system as in claim 25, said envelope means including two skins separated from each other and containing vacuum adjacent said MHD converter, but circulating a heat exchange liquid adjacent said reservoir.

28. A system as in claim 27 and including corrugated sheething between said skins.

29. A system as in claim 27, one end of the envelope constructed for length compensation as to differences in thermal expansion of the skin.

30. A system as in claim 24, wherein partitions are used additionally to establish chambers for communicating with portions of the gap between said skins.

31. A system as in claim 25, said second ends constructed as heat exchanges with ambient air.

32. A system as in claim 25 and including a recuperative heat exchange chamber disposed between said MHD generator and said compressor, and in the central space and being constructed for diverting the pressurized gas from the said tubes into the central space and returning it to said tubes, while said gas as leaving the MHD generator flows through said space in opposite directions to the entrance of the thermocompressor.

33. A system as in claim 32, wherein sections others of said tubes in the heat exchange chambers are provided to obtain condensation of reaction products drawn from the MHD generator.

34. A system as in claim 32, wherein the space around the MHD generator as well as around the respective adjacent tubes is provided for running gas from the separator chamber towards the thermocompressor, the central space adjacent the jet capture and liquid return being constructed as diffusor to drive the gas through the said heat exchanger.

35. A system as in claim 25 and including plug elements in the tubes to obtain flow space for different portions of the tubes.

36. A system as in claim 25 and including radially positions fluid transfer means between central tubing and the tubes of the plurality.

37. A system as in claim 25, wherein said partitions are of hexagonal shape, the plurality being six.

38. A system as in claim 25 and including a mirror for focussing solar radiation onto the envelope adjacent said heat exchanger chamber.

39. A system as in claim 38, said mirror having a hollow interior, at least part thereof being filled with a light gas to obtain buoyancy in air.

* * * * *